US007187467B2

(12) United States Patent
Takahashi et al.

(10) Patent No.: US 7,187,467 B2
(45) Date of Patent: Mar. 6, 2007

(54) IMAGE SUPPLY APPARATUS, IMAGE OUTPUT APPARATUS, CONTROL APPARATUS THEREFOR, AND IMAGE FORMING APPARATUS INCORPORATING THEM

(75) Inventors: Kazuyoshi Takahashi, Kawasaki (JP); Takashi Watanabe, Yokohama (JP); Toshiyuki Yanaka, Tokyo (JP); Hideyuki Tanaami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/244,570

(22) Filed: Sep. 17, 2002

(65) Prior Publication Data

US 2003/0016379 A1    Jan. 23, 2003

Related U.S. Application Data

(62) Division of application No. 08/738,331, filed on Oct. 25, 1996, now Pat. No. 6,486,966, which is a division of application No. 08/021,104, filed on Feb. 23, 1993, now Pat. No. 6,359,695.

(30) Foreign Application Priority Data

| Feb. 26, 1992 | (JP) | ................... | 4-039167 |
| May 25, 1992 | (JP) | ................... | 4-132793 |
| Jul. 28, 1992 | (JP) | ................... | 4-201621 |

(51) Int. Cl.
 *G06F 15/00* (2006.01)
 *G06K 15/00* (2006.01)
(52) U.S. Cl. .................... 358/1.18; 358/1.12
(58) Field of Classification Search ............ 358/1.1, 358/1.8, 1.9, 1.5, 1.12, 1.14, 1.18, 452, 453, 358/518, 502, 520, 401, 1.2, 1.13, 1.15, 400; 382/162, 163, 164, 167, 178; 345/433, 435, 345/436
See application file for complete search history.

(56) References Cited

U.S. PATENT DOCUMENTS 4,313,124 A    1/1982   Hara ......................... 347/57

(Continued)

FOREIGN PATENT DOCUMENTS

AU         B-41183/89         3/1990

(Continued)

OTHER PUBLICATIONS

IBM Technical Disclosure Bulletin, "Algorithm for Nested Overlay Management," vol. 31, No. 9, Feb. 1989.

*Primary Examiner*—Gabriel I. Garcia
(74) *Attorney, Agent, or Firm*—Fitzpatrick, Cella, Harper & Scinto

(57) ABSTRACT

An ink jet printer for forming an ink jet printed long strip of cloth includes a design image generation unit, a receiving unit, a generating unit and a synthesizing unit. The design image generation unit generates design image data representing a design image repeatedly using a basic pattern. The receiving unit receives first designation data regarding a logotype mark, while the generating unit repeatedly generates logotype mark image data representing the logotype mark repeatedly using a logotype pattern independently from the repeated using of the basic pattern, in accordance with the first designation data received by the receiving unit. The synthesizing unit repeatedly synthesizes the design image data and the logotype mark image data in a fixed repetitive pattern and supplies the synthesized design and logotype mark image data to an ink jet head, so that an image including the design image and plural repetitive patterns of the logotype mark is printed onto the long strip of cloth along an elongated direction thereof by using the ink jet head.

26 Claims, 56 Drawing Sheets

U.S. PATENT DOCUMENTS

| | | | |
|---|---|---|---|
| 4,345,262 A | 8/1982 | Shirato et al. | 347/10 |
| 4,459,600 A | 7/1984 | Sato et al. | 347/407 |
| 4,463,359 A | 7/1984 | Ayata et al. | 347/56 |
| 4,558,333 A | 12/1985 | Sugitani et al. | 347/65 |
| 4,640,529 A | 2/1987 | Katz | 281/5 |
| 4,723,129 A | 2/1988 | Endo et al. | 347/56 |
| 4,725,849 A | 2/1988 | Koike et al. | 347/106 |
| 4,740,796 A | 4/1988 | Endo et al. | 347/56 |
| 4,852,485 A | 8/1989 | Brunner | 101/211 |
| 4,969,951 A | 11/1990 | Koike et al. | 347/100 |
| 5,016,183 A | 5/1991 | Shyong | 700/131 |
| 5,045,967 A | 9/1991 | Igarashi | 345/584 |
| 5,050,101 A | 9/1991 | Kiuchi et al. | 358/1.18 |
| 5,058,035 A | 10/1991 | Nagata et al. | 715/726 |
| 5,095,511 A | 3/1992 | Okazaki | 382/144 |
| 5,123,960 A | 6/1992 | Shirota et al. | 106/31.46 |
| 5,124,799 A | 6/1992 | Tsuboi et al. | 358/296 |
| 5,132,711 A | 7/1992 | Shinada et al. | 347/6 |
| 5,132,787 A | 7/1992 | Omi et al. | 358/524 |
| 5,144,452 A | 9/1992 | Abuyama | 358/296 |
| 5,172,223 A | 12/1992 | Suzuki et al. | 358/529 |
| 5,179,640 A | 1/1993 | Duffy | 345/596 |
| 5,182,638 A | 1/1993 | Tsuboi et al. | 358/518 |
| 5,223,853 A | 6/1993 | Wysocki et al. | 347/14 |
| 5,255,350 A | 10/1993 | Hermann et al. | 358/1.9 |
| 5,291,282 A | 3/1994 | Nakagawa et al. | 375/240.23 |
| 5,414,807 A | 5/1995 | Seki et al. | 345/442 |
| 5,450,533 A | 9/1995 | Takahashi et al. | 358/1.18 |
| 5,475,496 A | 12/1995 | Kumada | 358/2.99 |
| 5,831,642 A | 11/1998 | Matsubara et al. | 347/9 |
| 6,053,595 A | 4/2000 | Otsuka et al. | 347/9 |
| 6,116,728 A | 9/2000 | Miyake et al. | 347/102 |
| 6,456,729 B1 * | 9/2002 | Moore | 382/103 |

FOREIGN PATENT DOCUMENTS

| | | |
|---|---|---|
| EP | 0 116 699 | 8/1984 |
| EP | 0 358 174 | 3/1990 |
| EP | 0 469 882 | 2/1992 |
| GB | 2 219 114 | 11/1989 |
| JP | 54-56847 | 5/1979 |
| JP | 59-123670 | 7/1984 |
| JP | 59-138461 | 8/1984 |
| JP | 60-49953 | 3/1985 |
| JP | 60-71260 | 4/1985 |
| JP | 1-267048 | 10/1989 |
| JP | 2-187343 | 7/1990 |
| JP | 3-46589 | 2/1991 |
| JP | 4-18358 | 1/1992 |
| WO | WO 89/12552 | 12/1989 |

* cited by examiner

FIG. 5

CASE OF THAT ONLY C M Y ARE USED

| PALLET DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 255 | 0 | 0 | 0 | 0 | 0 | 0 | 0 |
| 2 | 0 | 255 | 0 | 0 | 0 | 0 | 0 | 0 |
| ...... | ...... | ...... | ...... | ...... | ...... | ...... | ...... | ...... |
| 255 | 0 | 255 | 255 | 0 | 0 | 0 | 0 | 0 |

FIG. 6

CASE OF THAT ONLY C M Y BK ARE USED

| PALLET DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 0 | 0 | 0 | 255 | 0 | 0 | 0 | 0 |
| ⋯⋯ | ⋯⋯ | ⋯⋯ | ⋯⋯ | ⋯⋯ | ⋯⋯ | ⋯⋯ | ⋯⋯ | ⋯⋯ |
| 255 | 0 | 255 | 0 | 0 | 0 | 0 | 0 | 0 |

FIG. 7

CASE OF THAT ONLY C M Y S1 S2 ARE USED

| PALLET DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 255 | 0 | 0 | 0 |
| 1 | 0 | 0 | 0 | 0 | 0 | 255 | 0 | 0 |
| 2 | 0 | 0 | 0 | 0 | 0 | 0 | 0 | 0 |
| ...... | ...... | ...... | ...... | ...... | ...... | ...... | ...... | ...... |
| 255 | 0 | 0 | 255 | 0 | 0 | 255 | 0 | 0 |

FIG. 8

CASE OF THAT ONLY C M Y S1 S2 S3 S4 ARE USED

| PALLET DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 255 | 0 |
| 1 | 0 | 0 | 0 | 0 | 0 | 0 | 0 | 255 |
| 2 | 0 | 0 | 255 | 0 | 255 | 0 | 0 | 0 |
| ........ | ........ | ........ | ........ | ........ | ........ | ........ | ........ | ........ |
| 254 | 0 | 0 | 0 | 255 | 0 | 0 | 255 | 0 |
| 255 | 0 | 0 | 0 | 0 | 0 | 255 | 0 | 255 |

FIG. 20

| PALLET DATA | CYAN | MAGENTA | YELLOW | BLACK | S1 | ... | S4 |
|---|---|---|---|---|---|---|---|
| 0 | 0 | 0 | 0 | 0 | 0 | ... | 0 |
| 1 | 0 | 0 | 0 | 0 | 0 | ... | 0 |
| 2 | 0 | 0 | 0 | 0 | 0 | ... | 0 |
| 3 | 0 | 0 | 0 | 0 | 0 | ... | 0 |
| 4 | 0 | 0 | 0 | 0 | 0 | ... | 0 |
| 5 | 0 | 0 | 0 | 0 | 0 | ... | 0 |
| 6 | 0 | 0 | 0 | 0 | 0 | ... | 0 |
| ⋮ | ⋮ | ⋮ | ⋮ | ⋮ | ⋮ | ⋮ | ⋮ |
| 254 | 0 | 0 | 0 | 0 | 0 | ... | 0 |
| 255 | 0 | 0 | 0 | 0 | 0 | ... | 0 |

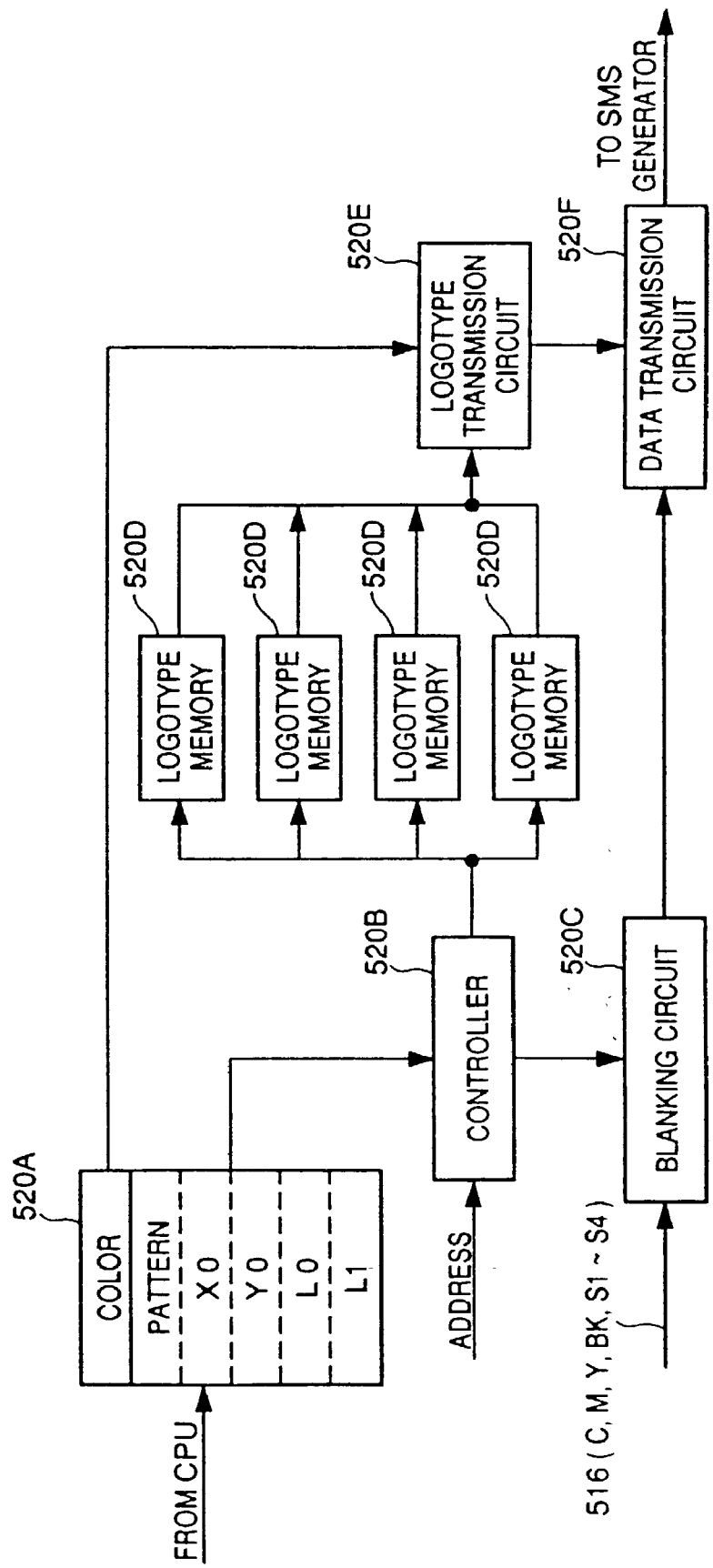

FIG. 22A
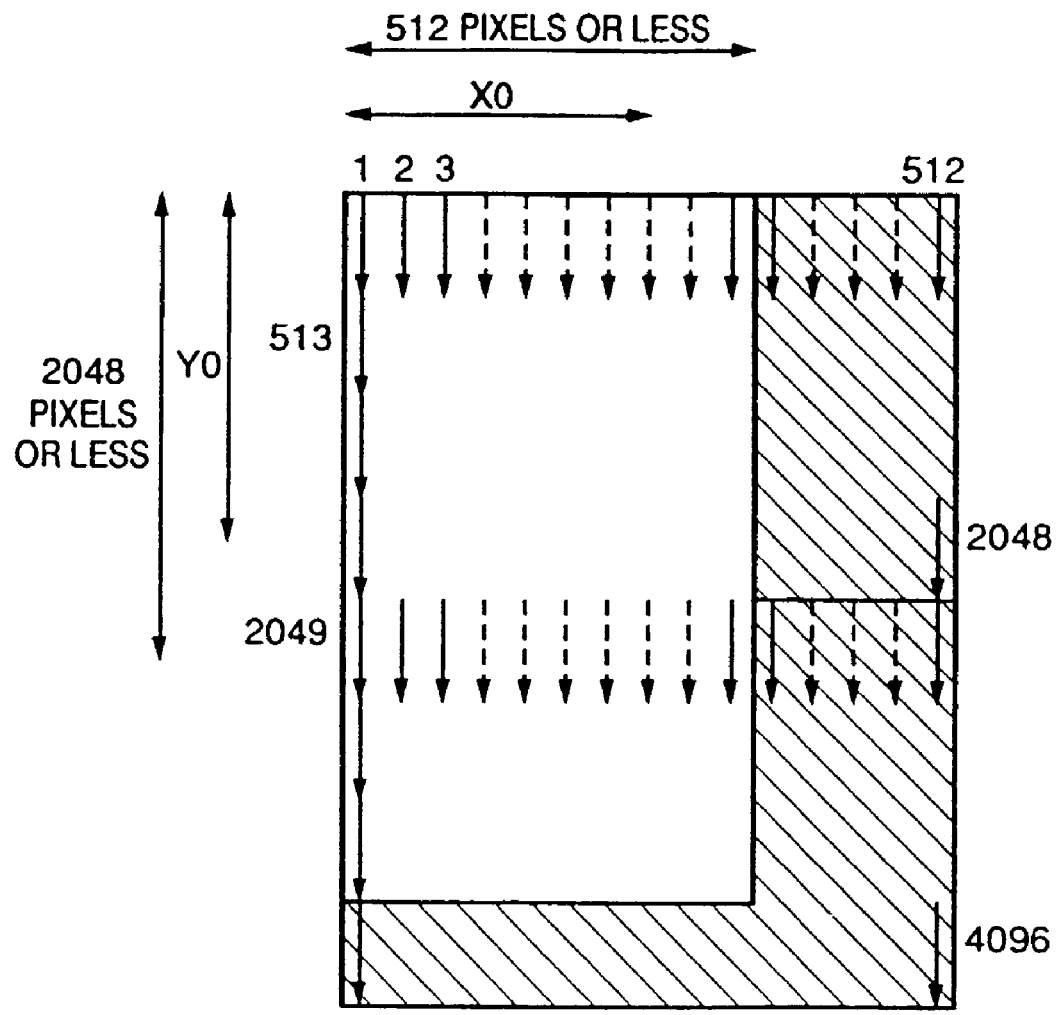
: DATA FOR ONE HEAD IS SHOWN ( 256 PIXELS )
FIGURE STANDS FOR OUTPUT ORDER
( HOWEVER AREA ▨ IS NOT OUTPUTTED )

STRUCTURE OF DATA FOR ONE PIXEL

FIG. 52B

BOUNDARY LINE

| 160 | 170 | 180 | 190 | 175 | 165 | 155 | 145 |
|-----|-----|-----|-----|-----|-----|-----|-----|
| 155 | 165 | 175 | 185 | 170 | 160 | 150 | 140 |
| 150 | 160 | 170 | 180 | 165 | 155 | 145 | 135 |
| 145 | 155 | 165 | 175 | 160 | 150 | 140 | 130 |
| 140 | 150 | 160 | 170 | 155 | 145 | 135 | 125 |
| 135 | 145 | 155 | 165 | 150 | 140 | 130 | 120 |
| 130 | 140 | 150 | 160 | 145 | 135 | 125 | 115 |
| 125 | 135 | 145 | 155 | 140 | 130 | 120 | 110 |

REGION 300A | REGION 300B

FIG. 52C

|  |  |  |  | X - 0 | 13/25 | 26/35 | 39/45 |
|-----|-----|-----|-----|-----|-----|-----|-----|
| 160 | 170 | 180 | 190 | 190 | 177 | 164 | 151 |
| 155 | 165 | 175 | 185 | 185 | 172 | 159 | 146 |
| 150 | 160 | 170 | 180 | 180 | 167 | 154 | 141 |
| 145 | 155 | 165 | 175 | 175 | 162 | 149 | 136 |
| 140 | 150 | 160 | 170 | 170 | 157 | 144 | 131 |
| 135 | 145 | 155 | 165 | 165 | 152 | 139 | 126 |
| 130 | 140 | 150 | 160 | 160 | 147 | 134 | 121 |
| 125 | 135 | 145 | 155 | 155 | 142 | 129 | 116 |

IMAGE SUPPLY APPARATUS, IMAGE OUTPUT APPARATUS, CONTROL APPARATUS THEREFOR, AND IMAGE FORMING APPARATUS INCORPORATING THEM

This application is a division of application Ser. No. 08/738,331 filed Oct. 25, 1996, now U.S. Pat. No. 6,486,966 issued Nov. 26, 2002 which is a division of application Ser. No. 08/021,104 filed Feb. 23, 1993, now U.S. Pat. No. 6,359,695 issued Mar. 19, 2002.

BACKGROUND OF THE INVENTION

1. Field of the Invention

The present invention relates to an image supply apparatus for supplying image data relating to recording, an image output apparatus which receives supplied image data to output a color image to a recording medium and an image forming system having the foregoing apparatuses. More particularly, the present invention relates to a printing system for printing an image on a recording medium such as a cloth. Furthermore, the present invention relates to an image output apparatus having an image repeating function for repeatedly recording the same image.

2. Description of the Related Art

When an image is outputted, there is sometimes desired to record an objective image on a recording medium in such a manner that another image data item is superposed on the objective image (first image data) which is the subject of the recording operation. In a cloth printing field, for example, in which an image is printed on a cloth, a brand (logotype) of a manufacturer or a designer is printed repeatedly at an end portion of a cloth.

Some conventional image output apparatuses such as printers have an arrangement that image data supplied from an external equipment, such as a host computer, is outputted as it is or temporarily stored in an incorporated buffer memory before the image data is outputted as an image. The image output apparatus having the buffer memory uses the buffer memory in order to establish consistency between the data transmission speed from the host computer and the image output speed of the printer. Furthermore, a printer apparatus, i.e., a page printer such as a laser beam, having an image memory capable of storing developed pixel data for one or more pages has been widely used because print data expressed in a page description language is developed into pixel data (bit map data).

Recently, a special image output is sometimes made to realize a geometrical image by repeatedly outputting a certain basic image. If a wide area image composed of repeated images, such as wall paper or a cloth, is printed by a printer of the aforesaid type, the printer must perform the following process: data about the whole image, in which the geometrical image is formed, is made by the host computer and the data having an excessively large capacity is transmitted from the host computer to the printer. If the printer apparatus has no buffer memory for the received image data, the correspondence between the image data transmission speed from the host computer and the printing speed of the printer apparatus must be held by the following adjustment methods: the calculation of the large quantity of image data is completed faster than the printing speed of the printer apparatus; the calculation is performed in advance; and the printing speed of the printer is conformed to the data transmission speed from the host computer.

An image forming apparatus having an image repeating function with which the same image can be repeatedly printed can be available. The image repeating function provided for the aforesaid apparatus will now be described with reference to FIGS. 55 and 56. Referring to FIG. 55, reference numeral 761 represents an original having an image to be repeatedly recorded. In this example, the image of symbol "A" in an area 711 is repeatedly formed. FIGS. 56A–56C illustrate examples in which the image in the area 711 of the original 761 is repeatedly printed. FIG. 56A illustrates a state where the image of the area 711 shown in FIG. 55 is read and the image is printed on an area 712 of a recording medium 771. After the area 712 has been printed, the printer does not advance the paper, but again reads the area 711 of the original 761 so as to print it on the area 713 of a recording medium 771 as shown in FIG. 56B. After the area 713 has been printed, the printer does not further advance the paper, but reads the area 711 of the original 761 so as to print it onto the area 714 of the recording medium 771 as shown in FIG. 56C. As a result of the aforesaid operation, an image as shown in FIG. 56C is formed by performing the operation of recording the same image three times. By reading the same area plural times and printing onto different positions of a medium, the image repetition function is realized.

When recording is performed while superposing image data, such as logotype, on the original image data, it might be considered that a superposed image data that the image data is previously superposed on the original image data is recorded. However, a predetermined image process, such as a head shading correction, γ-correction and UCR conversion process, performed prior to recording the superposed image data will also affect the image data other than the original image data. Therefore, the image data cannot be recorded as desired. If the image data is, for example, character image data there is a fear that it cannot be clearly recorded.

If there is a desire that basic image is repeatedly printed on the recording medium while being formed into various shapes (it is an ordinary case for the cloth printing field), the position at which other image data (logotype mark) is printed is limited by the repeated pattern of the basic image. As a result, the other image such as the logotype mark cannot, sometimes, be printed at the desired position.

If a large quantity of image data is transmitted to a printer from a host computer, it takes a long time to transmit the image data. Therefore, the host computer inevitably takes a long time to complete the process for printing. Another problem takes place in that an excessively long time is required to obtain the final output image. If the large quantity of image data is stored in the buffer memory of the printer, there arises a problem in that the buffer memory must have an excessively large capacity. If the geometrically repeated image data is generated by an external equipment such as the host computer, a long time is required to generate the image data.

In addition, the conventional image repeating function is a function for simply repeating the operation of printing the same image. Therefore, the repeated image pattern cannot be varied.

SUMMARY OF THE INVENTION

An object of the present invention is to overcome the aforesaid problems.

Another object of the present invention is to enable desired second image data to be recorded at a desired position on the recording medium on which the first image data which is the subject of recording is recorded.

Another object of the present invention is to enable second image data to be recorded as desired while freed from an influence of the image process to which the first image data is subjected.

Accordingly, the present invention is related to an image supply apparatus for supplying image data to an image output apparatus which records an image on a recording medium, the image supply apparatus comprising: designation means for making a designation about second image data which is different from first image data which is the subject of the recording operation in order to cause the second image to be recorded on a recording medium on which the first image data is recorded.

The designation means may designate at least anyone of the pattern, the size, the recording position and recording color of the second image data. The second image data may be logotype mark.

A control apparatus according to the present invention for an image output apparatus, comprises: first control means provided for an image output apparatus, which records an image on a recording medium, and arranged to cause a recording head of the image output apparatus to record an image in accordance with supply of the first image data supplied from the foregoing image supply apparatus; and second control means which receives the instruction about the second image data and causes the recording head to record the second image data in accordance with the received instruction on a recording medium on which the first image data is recorded.

The first control means has means for subjecting the first image data to an image process prior to transmitting the first image data to the recording head, and the second control means receives the first image data subjected to the image process and supplies the first image data to the recording head while adding the second image data in accordance with the instruction. Furthermore, the second control means has means for making the first image data to be blank in a portion in which the second image data is superposed.

An image output apparatus according to the present invention comprises: the aforesaid control apparatus; and recording head for recording an image on a recording medium.

A plurality of the recording heads may be provided to correspond to recording agents having different colors.

The recording head may be an ink jet printing head which uses ink as the printing agent and which emits ink. Furthermore, the ink jet printing head may have an element which generates heat energy which causes ink to generate film boiling as energy to be utilized to emit ink.

An image forming system according to the present invention comprises: the image supply apparatus; and the image output apparatus.

The system may be a printing system for printing an image on a cloth.

According to the present invention, the image supply apparatus has the means for designating the pattern, size, recording position, the color relating as the second image data such as a logotype mark. On the other hand, the control apparatus of the image output apparatus has a second control means for receiving the designation and controlling the operation of recording the first image data individually from the first control means for controlling the operation of recording the first image data. That is, since the second image data is independently controlled from the first image data, the second image data can be inserted as desired at a desired cycle by an operator regardless of the repetition cycle and the type of the repetition of the first image data. Furthermore, a designated area in which the second image data is inserted, is to be made blank immediately before the first image data is transmitted to the recording head, that is, after a desired image process has been completed. Therefore, the second image data can be printed as desired (for) example, clearly) while being freed from influences of the process of various conversions.

Another object of the present invention is to provide an image output method and apparatus capable of efficiently outputting a geometrical repeated image data.

Another object of the present invention is to provide an image output method and apparatus which is capable of outputting image data of a large capacity using a small capacity of memory and with which the amount of image data process to be performed by the external equipment which generates the image data, can be reduced.

In order to achieve the aforesaid objects, an image output apparatus according to the present invention receives image data supplied from an external equipment and outputs the image data, the image output apparatus comprising: storage means for storing the image data supplied from the external equipment; designation means for designating an output format of the image data stored by the storage means; and control means for repeatedly outputting the image data stored by the storage means in accordance with the output format designated by the designating means.

In order to achieve the aforesaid objects, an image output method according to the present invention receives image data supplied from an external equipment and outputs the image data, the image output method comprising the steps of: receiving image data supplied from the external equipment and storing the image data; designating an output format of the stored image data; and repeatedly outputting the stored image data in accordance with the output format.

The image data supplied from the external equipment is stored into the storage means, and the image data stored by the storage means can be repeatedly outputted in accordance with an output format when the output format of the image data stored by the storage means is designated.

Another object of the present invention is to provide an image forming apparatus capable of varying an image by, for example, rotation when the same image is repeatedly recorded in an image repeat method.

In order to achieve the aforesaid object, an image forming apparatus according to the present invention has an image repetition function for repeatedly recording an image that is contained in a designated area, on a predetermined position of a recording medium, the image output apparatus comprising: image storage means for storing image data; address generating means for generating an address for reading designated area of the image data stored by the image storage means, so as to be converted in a manner of rotation or a manner for forming a mirror image; and reading means for reading the image data from the image storage means in accordance with the address generated by the address generating means.

Furthermore, the addresses are so generated that a designated area of the image data stored by the image storage means is read from the image storage means. Furthermore, the addresses for reading the image data in the designated area are subjected to a predetermined process so that the image data in the designated area is converted, for example, rotated or formed into a mirror image.

Other and further objects, features and advantages of the invention will be appear more fully from the following description.

BRIEF DESCRIPTION OF THE DRAWINGS

FIG. 5 illustrates an example of a pallet conversion table made in accordance with the process shown in FIG. 4;

FIG. 6 illustrates an example of a pallet conversion table made in accordance with the process shown in FIG. 4;

FIG. 7 illustrates an example of a pallet conversion table made in accordance with the process shown in FIG. 4;

FIG. 8 illustrates an example of a pallet conversion table made in accordance with the process shown in FIG. 4;

FIG. 20 illustrates data to be set to each memory in order to prevent an abnormal output until a conversion parameter is inputted;

FIG. 21 is a block diagram which illustrates an example of the structure of the logotype input portion shown in FIG. 19;

FIGS. 22A and 22B illustrate an example of the correspondence between a logotype image output area and the space of a logotype memory;

FIGS. 52A to 52C illustrate examples of a color deviation modifying process included by the modifying process;

DETAILED DESCRIPTION OF THE PREFERRED EMBODIMENTS

First Embodiment

A first embodiment of the present invention will now be described in detail with reference to the drawings.

Figure 1:
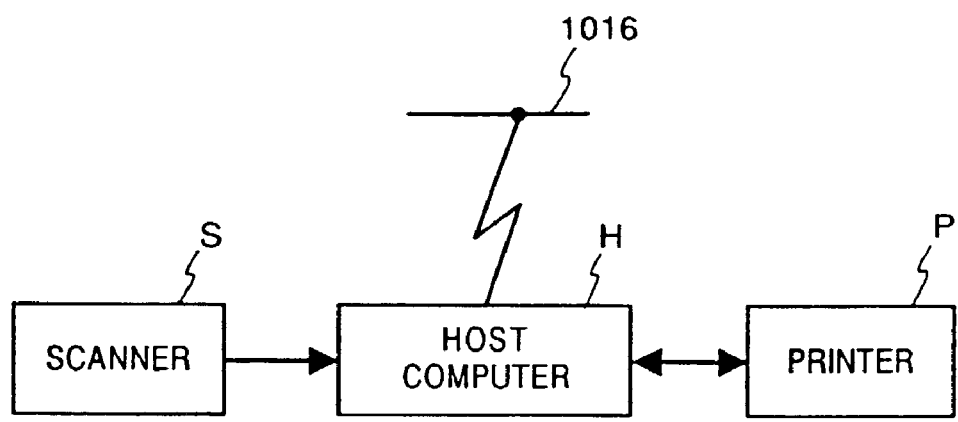
FIG. 1 is a block diagram which illustrates the overall structure of a printing system according to an embodiment of the present invention.
Figure 2:
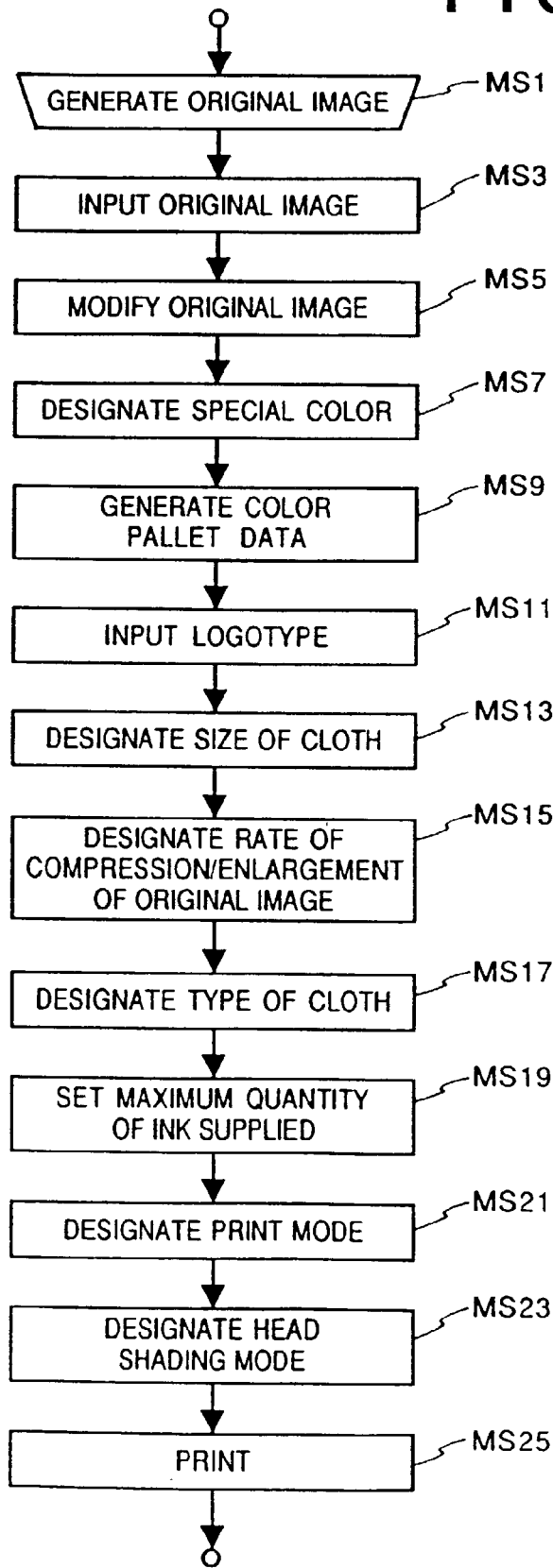
FIG. 2 is a flow chart which schematically illustrates the printing process.

The description will made about the preferred embodiment of the printing system in the following sequential order:

(1) The overall structure of the system (FIGS. 1 and 2)

(2) Host computer (FIGS. 3 to 12)
   (2.1) Structure
   (2.2) Operation (3) Printer (FIGS. 13 to 30)
   (3.1) Printing mechanism
   (3.2) Structure of the apparatus
   (3.3) Printing pattern of basic image
   (3.4) Down load of conversion data and parameter (4) Other structure (FIGS. 31 to 35)

(5) Residual structure (1) The overall structure of the system

FIG. 1 illustrates the overall structure of a printing system according to an embodiment of the present invention. A host computer H serves as a data supply apparatus for supplying data about an original image, to be printed, to a printer P which performs recording (hereinafter sometimes called "printing") the image on a recording medium such as a cloth, the data supply apparatus being arranged to also supply other control commands. By using the host computer H, the original image designed by a designer or read by a scanner S can be modified as desired, and desired parameters are set to the printer P to cause the printer to perform the printing operation. The host computer H can be connected to a LAN (Local Area Network) 1016 such as Ethernet (provided by Xerox) to establish a communication with another system. Furthermore, the state of the printer P is notified to the host computer H. The detailed description about the host computer H will be made later with reference to FIG. 3, while that about the printer P will be made later with reference to FIG. 13 and so forth.

FIG. 2 illustrates an example of a printing process which can be performed by using the system according to the present invention. The printing process comprises the following steps for example.

Original Image Generating Step MS1

In this step, an original image, that is, a basic image serving as a basic unit of an image to be repeatedly recorded on a cloth which is the recording medium, is generated by a designer with an adequate means. In this step, a required section of the host computer to be described later with reference to FIG. 3, for example, an input means and a display means and the like can be used.

Original Image Input Step MS3

In this step, the original image generated in the original image generating step MS1 is received by the host computer H by using the scanner S. The host computer can read the original image stored in an external storage unit of the host computer H or can be received through LAN 16.

Original Image Modification Step MS5

Although the printing system according to this embodiment enables a variety of repeated patterns of the basic image to be selected as described later with reference to FIG. 24, undesirable positional deviation of the image and color tone discontinuity occur at the boundary portion depending upon the selected repeated pattern. This step is a step in which the selection of the way of repeating is permissible and the occurrence of the discontinuity in the boundary portion of the repeated pattern in accordance with the selection is modified. The modification may be performed in such a manner that a designer or an operator uses an input means such as a mouse while making a reference to the image on a display of the host computer H. As an alternative to this, the modification may be automatically performed by the image processing function incorporated in the host computer H.

Special Color Designation Step MS7

The printer P according to this embodiment performs the printing operation by using yellow (Y), magenta (M) and cyan (C) and black (BK) in principle. However, use of metallic colors such as gold and silver, and clear colors such as red (R), green (G) and blue (B) is sometimes desired to perform the printing process. Accordingly, the printer P according to this embodiment is able to print an image by using the foregoing special colors, and the special colors are designated in this step.

Color Pallet Data Generating Step MS9

The designer draws the original image while selecting colors from a standard color patch. The reproducibility of the selected color at the time of the printing operation considerably affects the productivity of the printing system. Accordingly, data is generated to determine the mixture ratio of Y, M, C or the special color, in order to satisfactorily reproduce the selected standard color.

Logotype Input Step MS11

A logotype of a designer or a brand of the manufacturer is usually printed at an end of dry goods. In this step, the subject logotype, the color, the size and the position and the like are designated.

Cloth Size Designation Step MS13

The width and the length and the like of the cloth to be printed are designated. As a result, the quantity of scanning performed by the recording head of the printer P in the main scanning direction and the sub-scanning direction, and the number of repetitions of the original image are determined.

Original Image Compression/Enlargement Rate Setting Step MS15

The rate of compression/enlargement to the original image (for example, 100%, 200%, or 400% and so on) at the printing operation is set.

Cloth Type Designation Step MS17

Cloths are categorized as natural fiber such as cotton, silk and wool, and synthetic fiber such as nylon, polyester and acryl fiber, each having different characteristics relating to the printing process. Furthermore, generation of lines in the boundary portion becomes different at each printing in main scanning direction even if the quantity of feed of a cloth is the same in each printing. This would be due to the difference in the elongation and contraction of the cloths. Hence, the type of the cloth to be printed is inputted in this step to set a proper quantity of feed in the printer P.

Maximum Supplied Ink Quantity Setting Step MS19

Even if ink of the same quantity is emitted to the cloth, the density of the image reproduced on the cloth becomes different depending upon the type of the cloth. Furthermore, the quantity of ink which can be emitted becomes different depending upon the structure of the fixing system in the printer P and the like. Accordingly, in this step, the maximum quantity of ink to be emitted is designated in accordance with the type of the cloth and the structure of the fixing system in the printer P.

Printing Mode Designating Step M521

Whether the printer P prints at high speed or ordinary speed and whether the head of the printer P emits ink one time or plural times to form one dot are designated. Furthermore, after the printing operation was interrupted whether next printing is started so as to continue the printed pattern or started regardless of the continuity of the printed pattern is designated.

Head Shading Mode Designation Step MS23

If the printer P comprises a recording head having a plurality of emitting ports, the quantity of discharged ink to be emitted or the direction to be emitted may be varied for each emitting port of the recording head depending upon the dispersion due to the manufacturing process and/or the way of use. In order to correct the foregoing variation, a process (head shading) is sometimes performed in which a drive signal for each emitting port is corrected to make the emitting quantity to be constant. In this step, the timing and the like of the head shading operation can be designated.

Printing Step MS25

In accordance with the designations thus made, the printing operation is executed by the printer P.

If any of the aforesaid designations is not required, the step may be eliminated or skipped. If necessary, a step in which another designation and the like is made may be added.

(2) Host Computer (2.1) Structure

Figure 3:
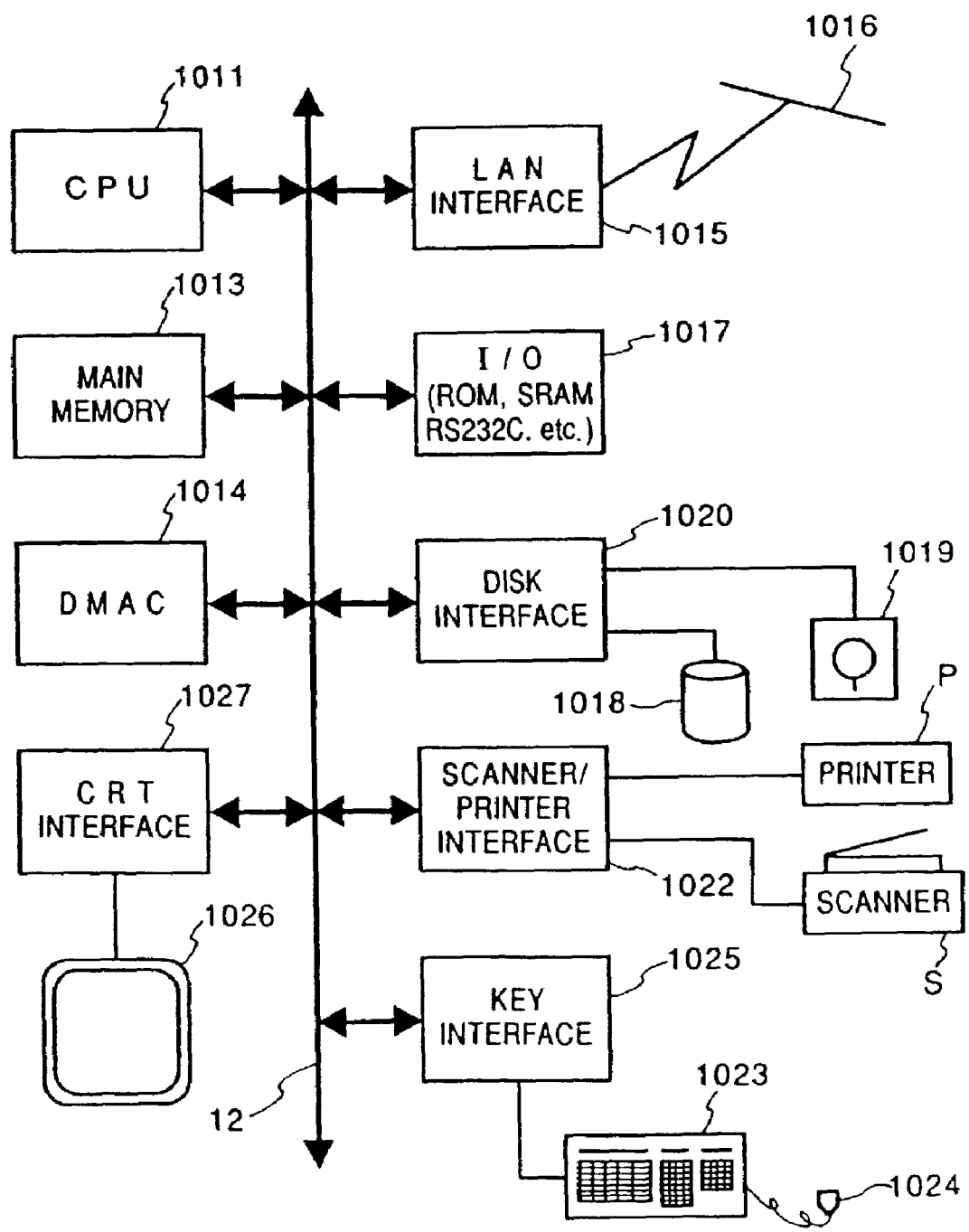
FIG. 3 is a block diagram which illustrates a system while highlighting the structure of a host computer according to an embodiment of the present invention.

FIG. 3 is a block diagram which illustrates the overall system according to this embodiment of the present invention while highlighting the structure of the host computer.

Referring to FIG. 3, reference numeral loll represents a CPU for totally controlling the information processing system, numeral 1013 represents a main memory for storing a program to be executed by the CPU 1011 and for use as a working area at the time of the execution of the program, and numeral 1014 represents a DMA controller (Direct Memory Access Controller, hereinafter called a "DMAC") for transferring data between the main memory 1013 and various equipment constituting this system while omitting passing through the CPU 1011. Reference numeral 1015 represents a LAN interface between a LAN 1016 and this system, and numeral 1017 represents an input/output device (hereinafter called an "I/O") comprising a ROM, SRAM, and RS232C interface. A variety of external equipment devices can be connected to the I/O 1017. Reference numerals 1018 and 1019 respectively represent a hard disk device and a floppy disk device each serving as an external storage device. Reference numeral 1020 represents a disk interface for communicating signals between the hard disk device 1018 or the floppy disk device 1019 and this system. Reference numeral 1022 represents a scanner/printer interface for communicating signals between the printer P/the scanner S and the host computer H. The scanner/printer interface may be a GPIB interface. Reference numeral 1023 represents a keyboard for inputting a variety of character information items and control information items, numeral 1024 represents a mouse serving as a pointing device, numeral 1025 represents an interface for communicating signals between the keyboard 1023/the mouse 1024 and this system. Reference numeral 1026 represents a display device such as a CRT, the display of which is controlled by the interface 1027. Reference numeral 1012 represents a system bus composed of a data bus, a control bus and an address bus for connecting signals between various equipment devices.

(2.2) Operation

With the system constituted by connecting the foregoing equipment devices, the designer or the operator performs operations while corresponding to various information items displayed on the CRT 1026. That is, the following information items are displayed on the CRT 1026: character and/or image information supplied from the LAN 1016, or external devices connected I/O 1017, the hard disk 1018, the floppy disk 1019, the scanner S, the keyboard 1023 and the mouse 1024; and operation information stored by the main memory 1013 and relating to the system operation. The designer or the operator issues a designation of a variety of information items and issues an instruction to the system while observing the foregoing display.

Some of the processes relating to the essential portion of this embodiment to be performed by using the system shown in FIG. 3 will now be described among the various steps shown in FIG. 2.

Figure 4:
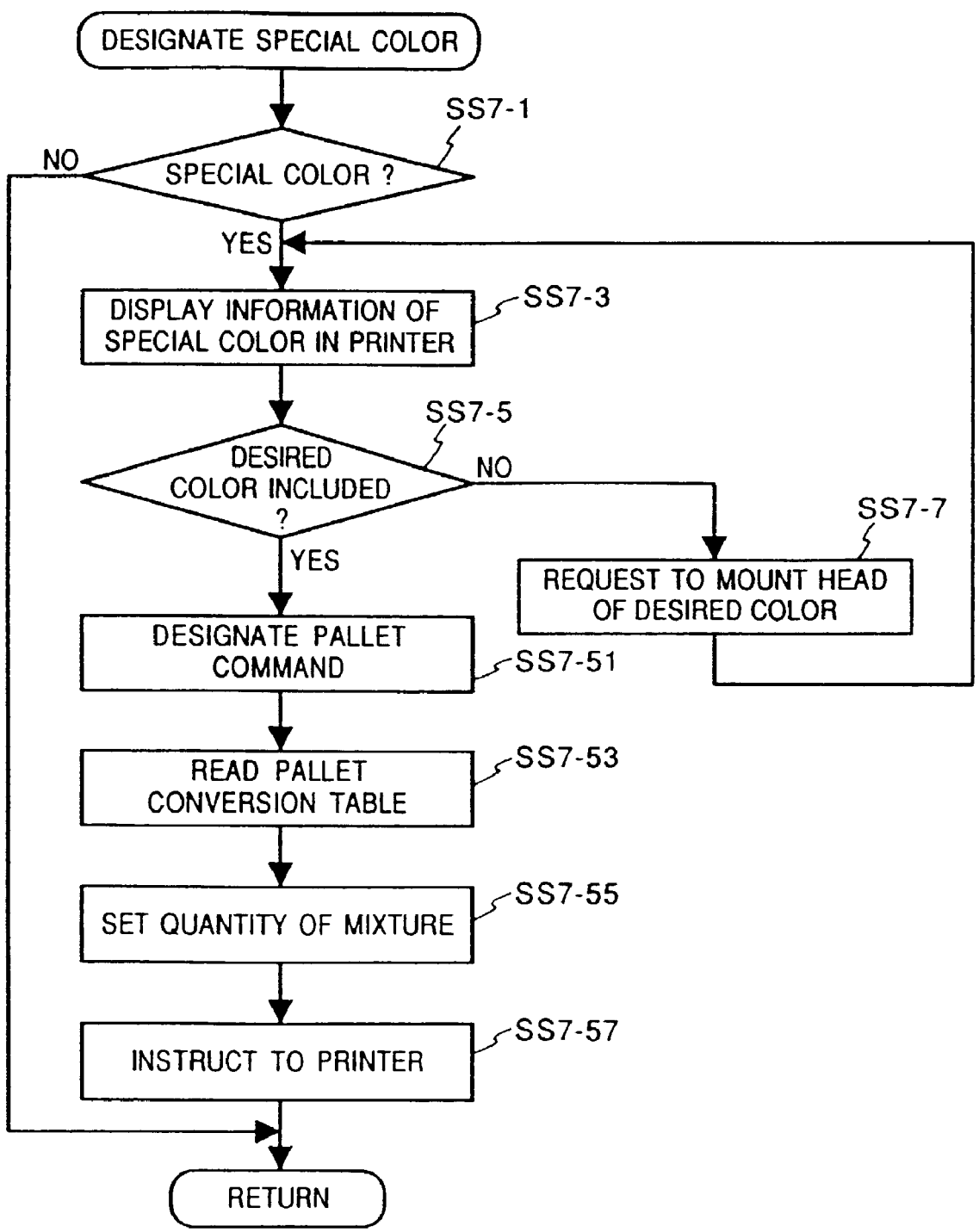
FIG. 4 is a flow chart which illustrates an example of a special color instructing process shown in FIG. 2.

FIG. 4 illustrates an example of the special color designation process shown in FIG. 2. In this process, a pallet conversion table (a table indicating the mixture ratio of colors Y, M, C, Bk and a special color) made by the host computer H is outputted to the printer P, the table is used to convert pallet data transmitted from the host computer H. When this process is commenced, a discrimination is made in step SS7-1 as to whether or not use of the special color has been designated. If it is negated, this process is completed here. If an affirmative discrimination is made, the flow proceeds to step SS7-3 in which information about the current special color in the printer P is displayed on the CRT 1026. The foregoing process may by performed by using the invention disclosed in Japanese Patent Laid-Open No. 2-187343 by the applicant of the present invention, the invention comprising a printer having a printing head which has a means (pattern cutting) for presenting information about the head whereby the printer is able to recognize the information due to the foregoing means. The information presentation means may comprise an EPROM or a DIP switch. In order to be adapted to this embodiment, the information is made to be the color of the ink for use by the recording head, and the printer P reads the information to notify it to the CPU 1011 of the host computer H. The operator observes the information displayed on the CRT 1026 to recognize whether or not the printing head for the special color is used and what color is used as the special color. Then, the operator is able to designate using a key or the like whether or not a desired special color is included (that is, whether or not the present state is allowed) in step SS7-5. If the operator determines that the desired special color is not mounted in the printer P, the process proceeds to Step SS7-9. In Step SS7-9, a message which prompts to mount a printing head having the desired special color is displayed on the CRT 1026, when the printing head is mounted, the process goes to Step SS7-3.

If a determination to allow the printing head, which is being used by the printer P, is made in step SS7-5, a pallet command for determining the color combination is designated in step SS7-51. This process can be performed in such a manner that a case where three colors C, M and Y are used at the printing operation, a case where BK is further added, a case where special colors S1 and S2 are added in addition to C, M and Y, and a case where special colors S3 and S4 are further added, are respectively designated by using FIGS. "3", "4", "6" or "8".

In accordance with this designation, the pallet conversion table previously stored in, for example, the storage device (the main memory 1013 or the external storage device 1018 or 1109) is read out in step SS7-53. The operator modifies the table data if necessary to set the quantity of mixture of the colors (step SS7-55), and transmits the table data together with the pallet command to the printer P (step SS7-57). Examples of the pallet conversion table are shown in FIGS. 5 to 8.

The processing circuit employed in the printer P may be a circuit to be described later with reference to FIGS. 15 to 19.

Figure 9:
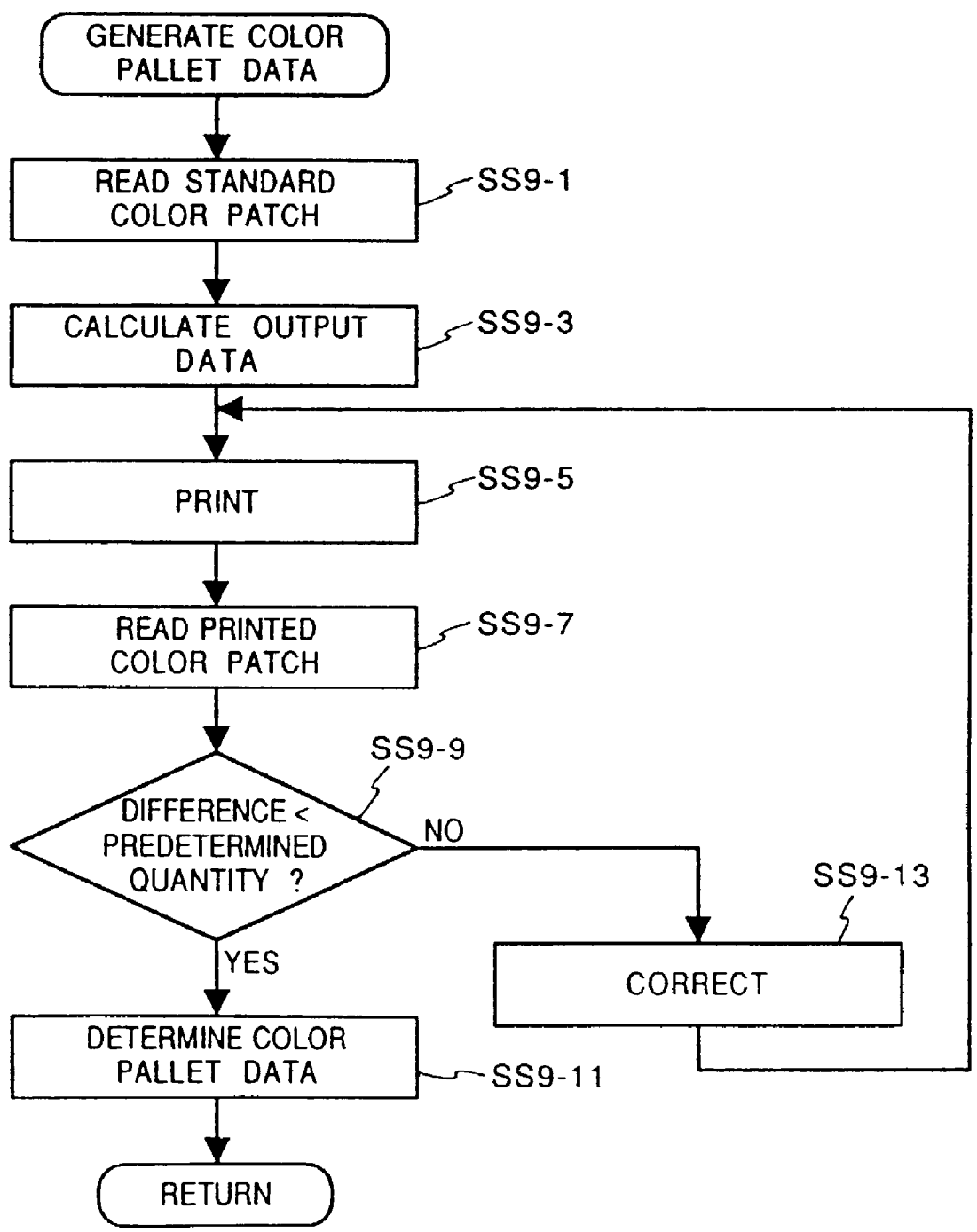
FIG. 9 is a flow chart which illustrates an example of a color pallet data generating process shown in FIG. 2.

FIG. 9 illustrates an example of a detailed process to be performed in the color pallet data generating step MS9 shown in FIG. 2.

In this process, the standard color patch of the color selected by the designer is read in step SS9-1. In order to read it, the scanner S may be used or a reading means to be described later and provided for the printer P may be used. In next step SS9-3, pallet conversion data including the special color is calculated from the pallet conversion table so previously set to be adaptable to the printer P in accordance with the codes corresponding to the standard color patch. Then, an image is formed in accordance with the calculated data including the special color, and it is printed in the form of a color patch in step SS9-5.

Then, the color patch printed by the printer P is read in step SS9-7, and color data thus obtained is subjected to a comparison with the color data obtained in step SS9-1. If the difference between the two data items is less than a predetermined value, the calculated color pallet conversion data is employed to be set to the printer P in step SS9-11. If the difference exceeds the predetermined value, the calculated pallet data is corrected in accordance with the foregoing difference in step SS9-13, and the flow returns to in step SS9-5. Then, the process is repeated until an affirmative discrimination is made in step SS9-9. Although the description about the special color process shown in FIG. 4 is made to use the special colors S1, S2, S3 and S4, the pallet conversion table for each of the cases, in which S1, S2, S3 and S4 are respectively used, processed by the operator can be modified in accordance with the data obtained in this process. According to this embodiment, the combination of a plurality of color inks including the special color and corresponding to the color code selected by the designer can be properly selected from the color code.

Figure 10:
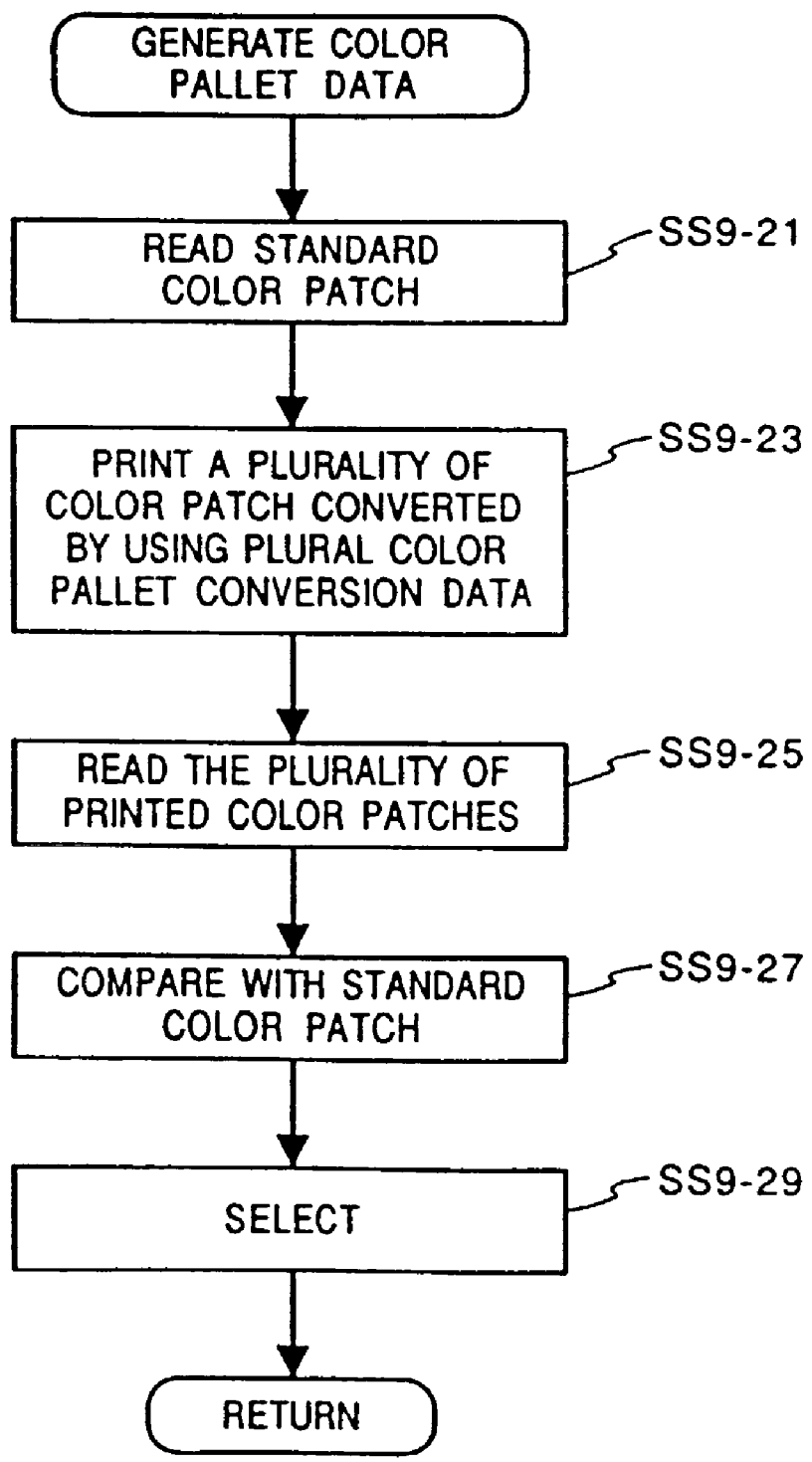
FIG. 10 is a flow chart which illustrates another example.

FIG. 10 illustrates another example of the detailed process to be performed in the color pallet data generating step.

Also in this process, the standard color patch is read in step SS9-21 which is arranged similarly to step SS9-1. Then, plural types of color pallet conversion data are prepared in step SS9-23, and the read color data is converted to the plurality of color patches using the plural types of color pallet conversion data, and the plurality of color patches are printed. Then, the plurality of the color patches are read in step SS9-25, and color data obtained from this is, in step SS9-27, subjected to a comparison with the standard color data obtained in step SS9-21. In step SS9-29, the color data which approximates the standard color data, that is, the color pallet conversion data having the most excellent color producibility, is selected, and is set to the printer P.

A plurality of types of color pallet conversion data prepared in steps SS9-23 may be data which is arranged to change the ink mixture quantity by a predetermined quantity for all color printing heads. As an alternative to this, the data may be arranged to slightly change the ink mixture quantity in a predetermined range selected relative to data obtained in step SS9-21 or data set by the operator in the process shown in FIG. 4. Since this process enables the correction and re-printing processes to be omitted as compared with the process shown in FIG. 9, the color pallet conversion data can be determined at high speed.

Figure 11:
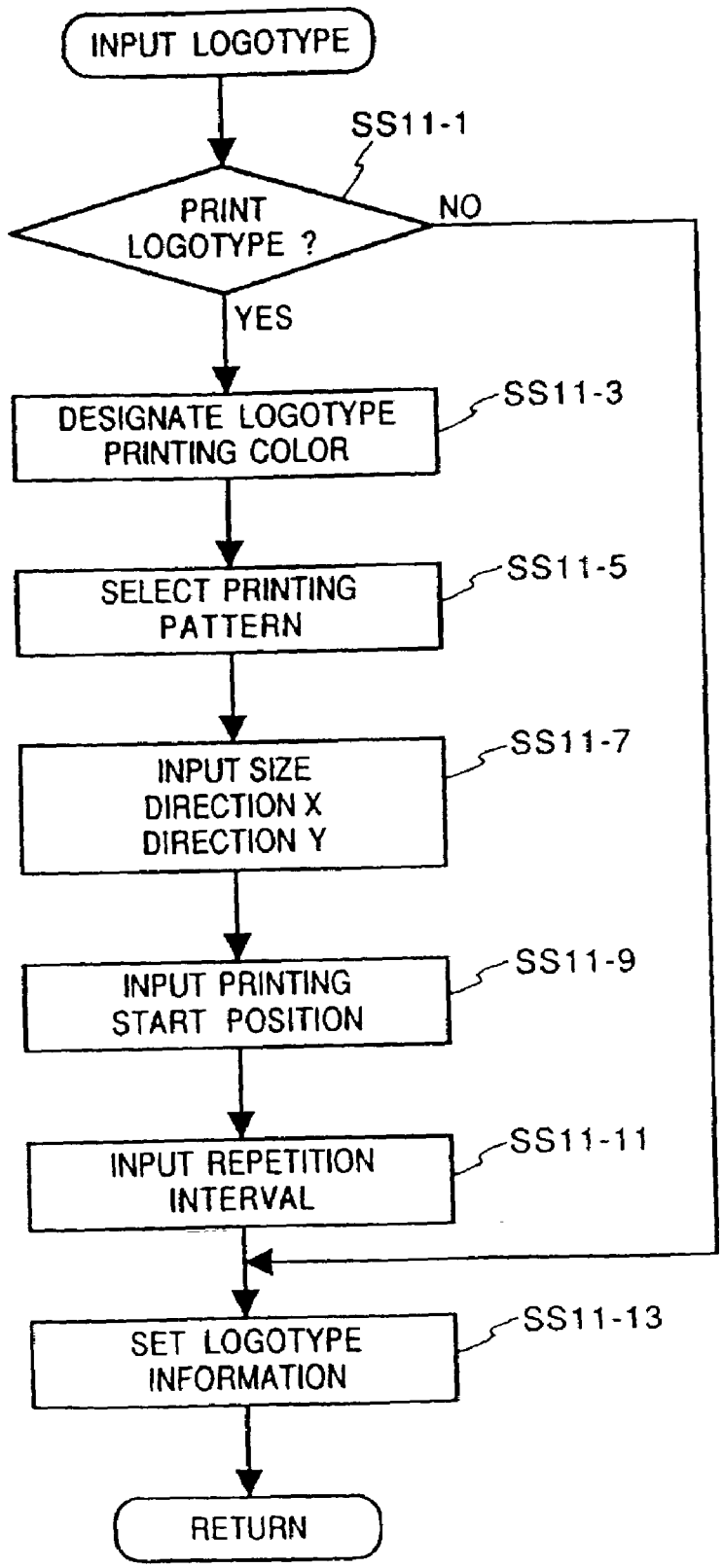
FIG. 11 is a flow chart which illustrates an example of a logotype input process shown in FIG. 2.

FIG. 11 illustrates an example of the logotype input process shown in FIG. 2.

In this process, an inquiry whether or not a logotype is inputted is made to the operator in step SS11-1. If an affirmative discrimination is made, the color of the logotype to be printed is designated in step SS11-3. The color may be selected from a group consisting of eight colors; C, M, Y, BK, special colors S1, S2, S3 and S4.

In next step SS11-5, a logotype is selected from a plurality of logotypes prepared in the printer P to be described later. This operation may be performed in such a manner that one logotype may be selected from four logotypes.

In step SS11-7, the size of the logotype to be printed in the main scanning direction (a direction X) and the sub-scanning direction (a direction Y) in the printing process is designated. The size designation may be performed in such a manner that 512 pixels or less can be designated in the direction X and the 8 bands or less can be designated in the direction Y while letting the recording width (band) of one main scanning operation performed by the printing head be a unit.

In step SS11-9, the position at which the logotype printing is commenced in the main scanning direction (the direction X) is designated. In this case, 512 pixels or less can be designated while letting one pixel be a unit for example.

In step SS11-11, the position at which the logotype printing is commenced in the sub-scanning direction (the direction Y) is designated in such a manner that, for example, the pitch (interval of repetition) between logotypes is instructed. In this process, 256 bands or less can be designated while letting one band be a unit. It should be noted that information may be presented to the operator in order to notify that the designated value should not be less than the Y-directional size designated in step SS11-7.

Figure 12:
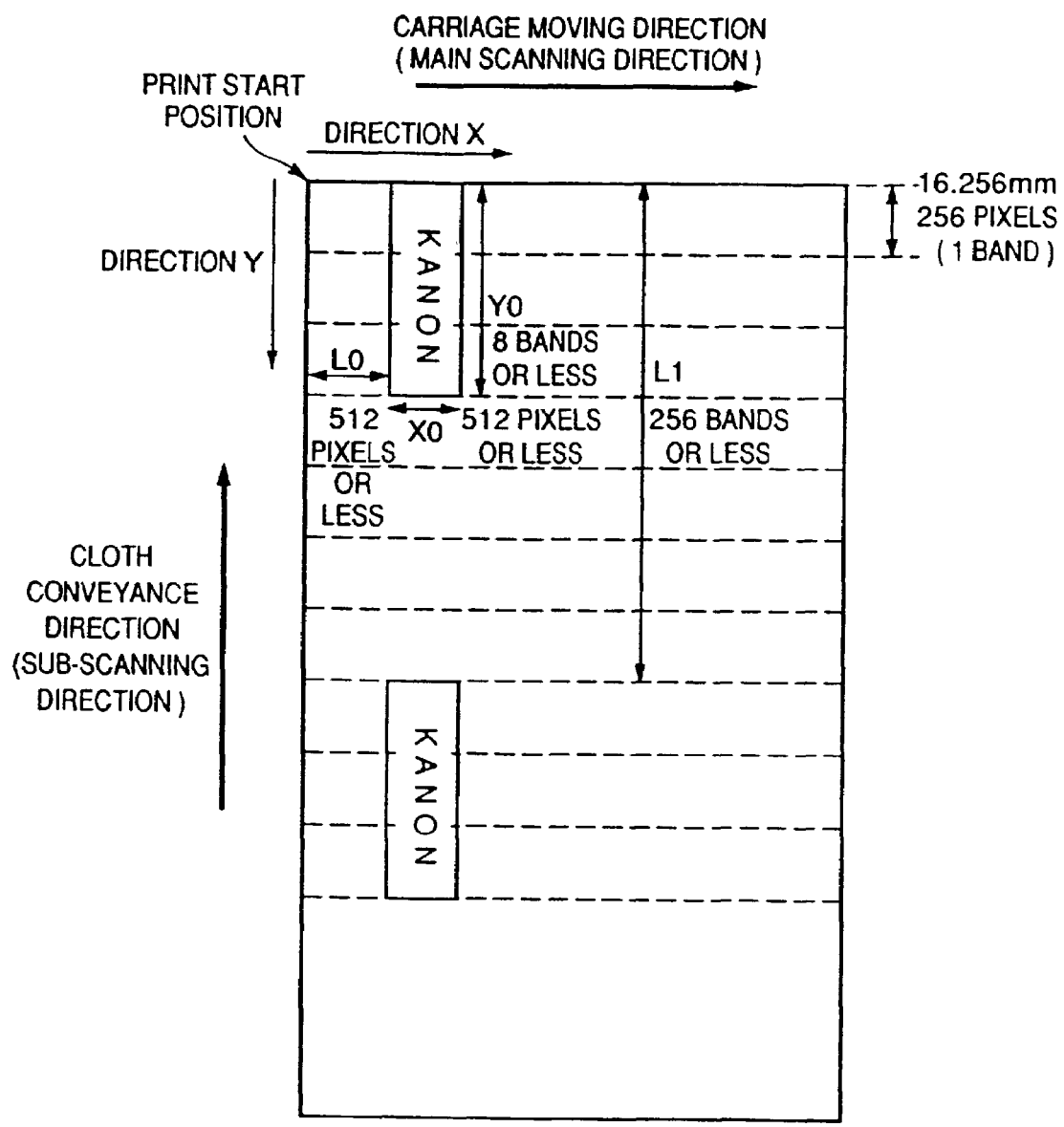
FIG. 12 illustrates the correspondence between data and logotype print format designated in FIG. 11.

In accordance with the foregoing designations, the host computer H sets information of logotype to the printer P in step SS11-13. The data format may be used, for example, "<WLOGO>, <color>, <pattern>, <X0>, <Y0>, <L0>, and <L1>". The format <WLOGO> is an identification code for causing the printer P to recognize a fact that the ensuing data is logotype information. The format <color> is data for setting colors and may be a 1-byte signal capable of allocating 1 bit to each of the 8 colors and outputting/masking the subject color by turning on/off the 1 bit. The format <pattern> is data for setting the logotype pattern and may be 2-bit signal for selecting one type of four types. The formats <X0>, <Y0>, <L0>, and <L1> are data for respectively setting the X-directional size of the logotype, the Y-directional size of the same, the X-directional position at which the logotype printing operation is started and the Y-directional repetition interval of printing the logotype. The relationship between these data and the output form of logotype is shown in FIG. 12.

Figure 24A:
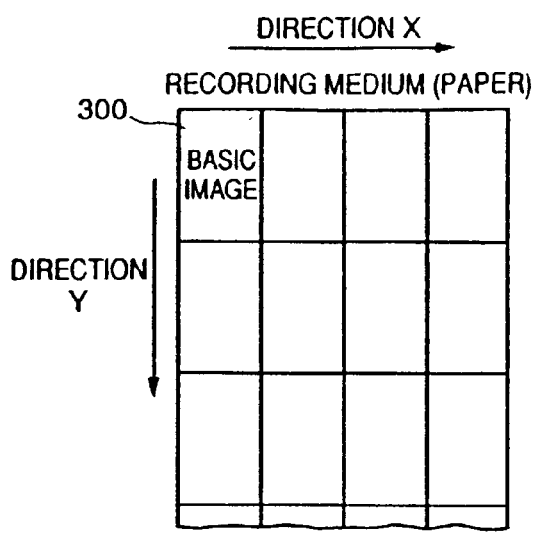
FIGS. 24A to 24E illustrate examples of format pattern of the basic image with respect to a recording medium.
Figure 24B:
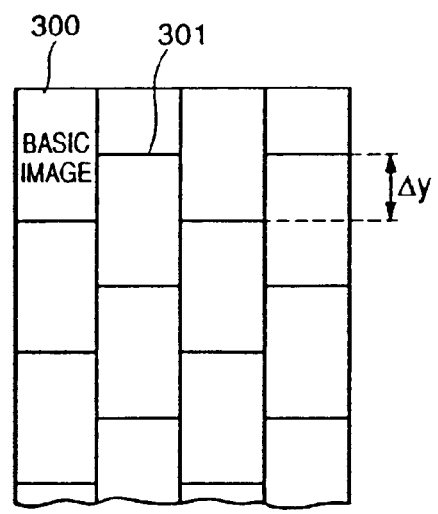
Figure 46:
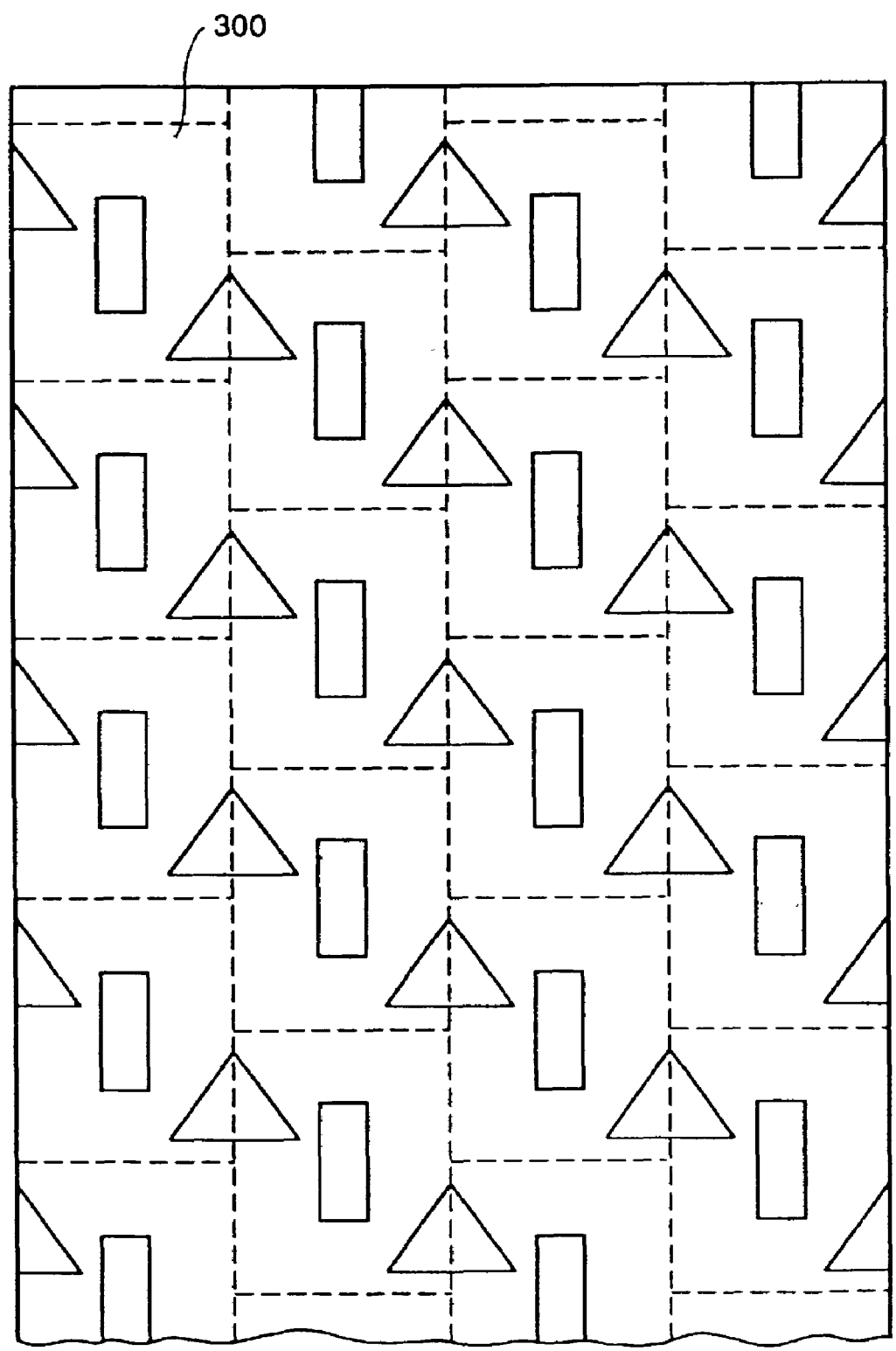
FIG. 46 illustrates an example of an image formed by employing one of basic image repetition patterns.

The description will be made about an example in which a repetition pattern of a basic image 300 shown in FIG. 24B is selected and a pattern as shown in FIG. 46 is printed on a cloth. Referring to FIG. 46, a portion surrounded by a dashed line is the basic image 300.

Figure 47A:
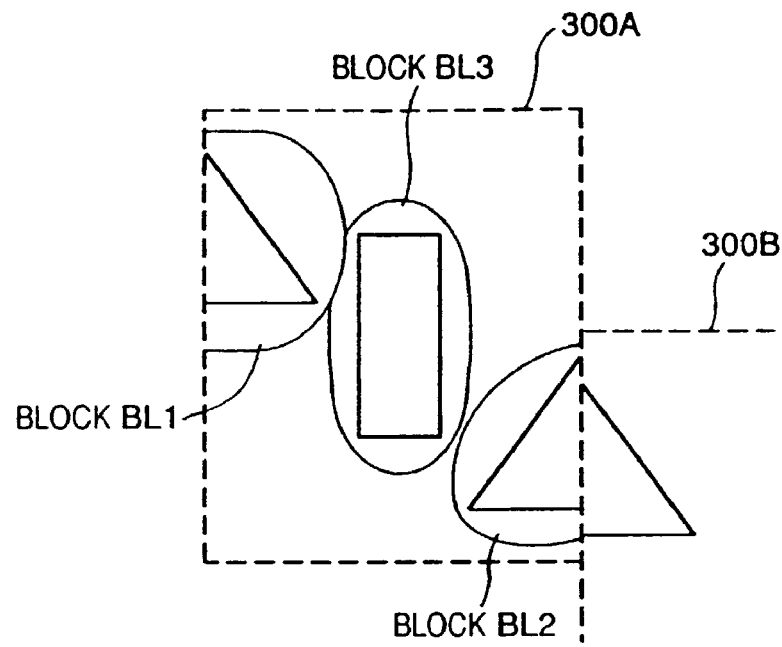
FIGS. 47A and 47B illustrate examples of a basic image position deviation modifying process included by a modifying process.
Figure 47B:
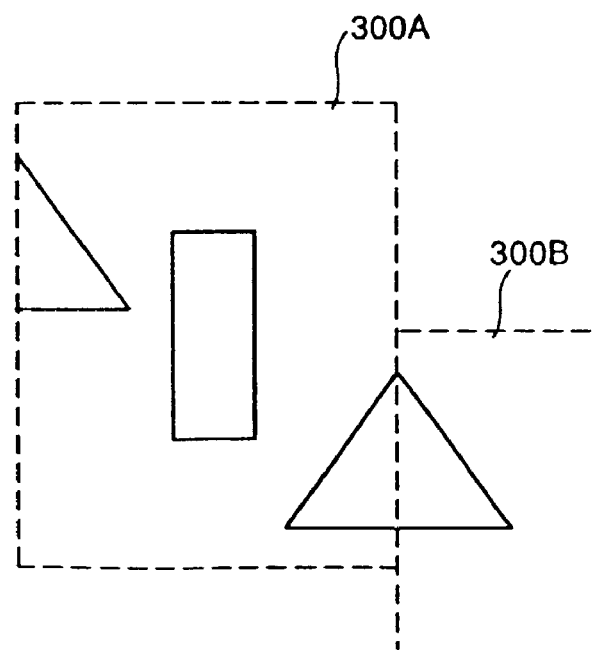

If one basic image 300A and a succeeding basic image 300b are deviated from each other in terms of the pattern continuity as shown in FIG. 47A, a process to be performed as follows will now be described: the pattern on the basic image 300A is divided into a certain number of blocks (in this embodiment, BL1 to BL3), that is, it is divided into a plurality of image elements to be processed, and a movement for each block is performed (in this case, movement to the block BL2 is performed) so that the pattern continuity is kept as shown in FIG. 47B.

Figure 48:
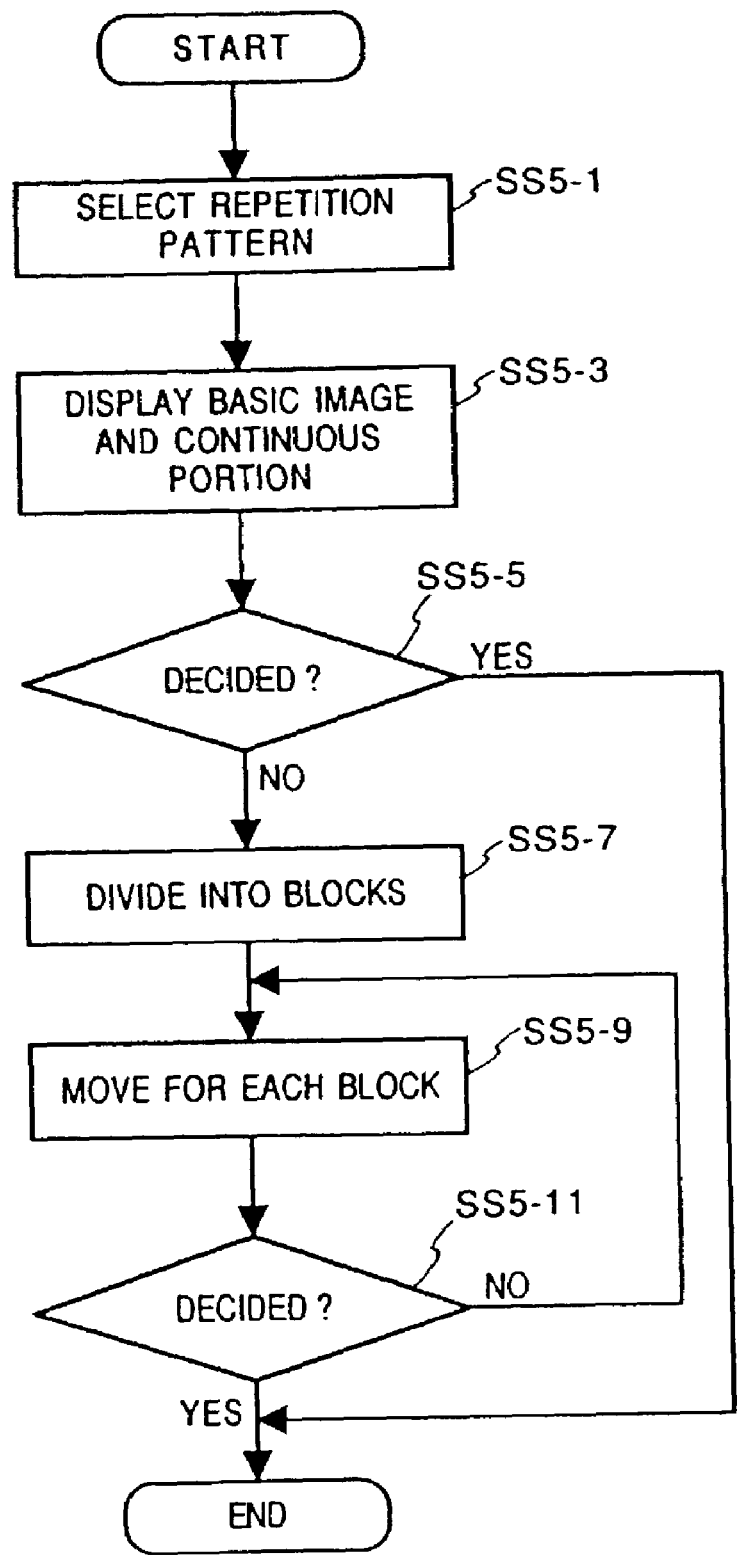
FIG. 48 is a flow chart which illustrates an example of the modifying process.

FIG. 48 illustrates an example of the process performed in such a manner that a designer or an operator performs by using an input means such as the mouse 1024 or the like while making a reference to a screen of the display 1026.

In step SS5-1, a selection, as shown in FIGS. 24A–24E, of the repeated pattern of the original image (the basic image) input in step MS3 in FIG. 2, is received. In step SS5-3, the basic image 300A and the succeeding basic image portion are displayed in step SS5-3 in accordance with the repeated pattern. In this embodiment, a display as shown in FIG. 47A is made in accordance with the selection of the repeated pattern as shown in FIG. 24B.

In next step SS5-5, the process is completed here if an input is made by the operator who has observed the display to designate to allow the present state because of, for example, the pattern continuity having been established. If it has been negated, the process proceeds to step SS5-7 in which the basic image is divided into plural blocks in order to easily modify the deviation. The division may be performed in such a manner that the operator, for example, so collects each pattern element as to modify the deviation in the easiest manner while making a reference to the display 1026. In next step SS5-9, the block which has encountered the discontinuity (block BL2 in the case shown in FIG. 47A), is subjected to the movement process. If the operator determines that all blocks have been processed and the continuity has been kept as shown in FIG. 47B, then the operator inputs a designation to allow the present state in step SS5-11 and the process is completed.

The modifying process may be performed automatically by the host computer H as well as the modifying operation performed by the operator while making a reference to the screen. In this case, the processes following step SS5-7 shown in FIG. 48 are rewritten as shown in FIG. 49.

Figure 49:
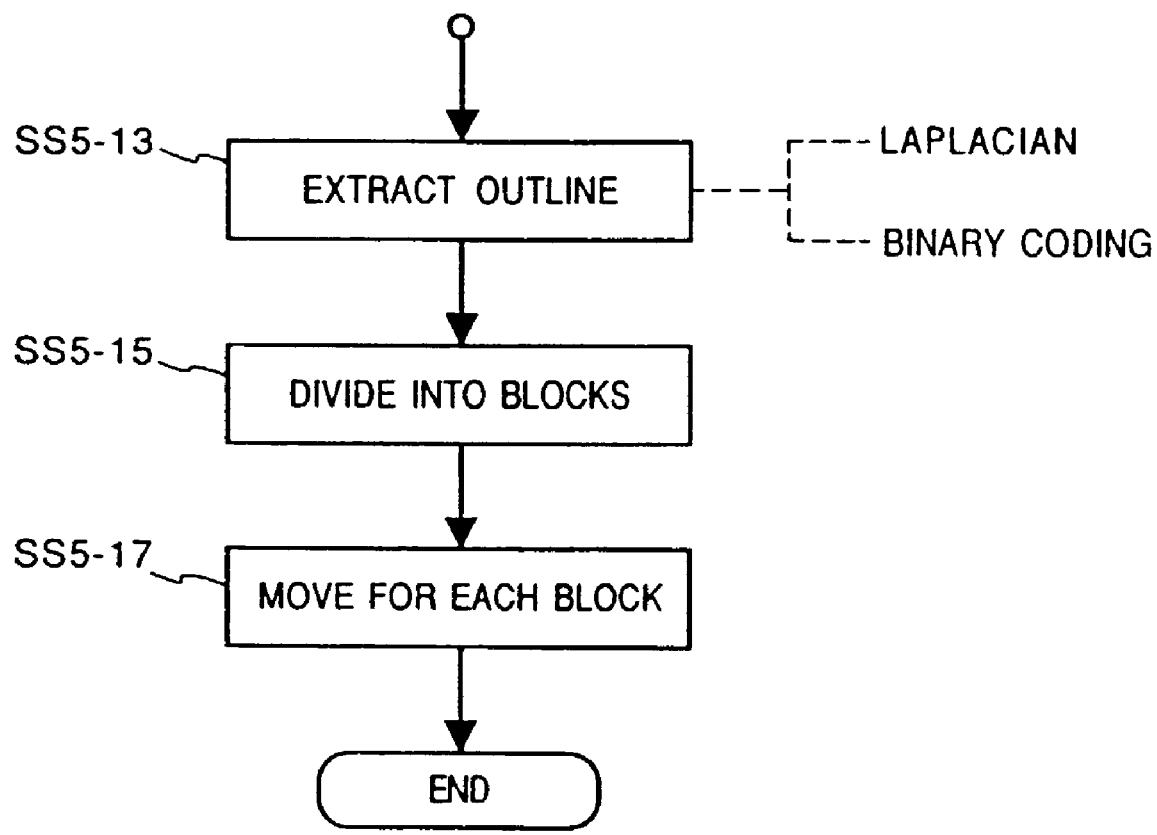
FIG. 49 is a flow chart which illustrates another example of the modifying process.

Referring to FIG. 49, step SS5-15 is a step in which the outline of the pattern of the basic image is extracted. The outline is detected by a known image processing method such as a Laplacian method or a gradient method and may include a process of binary-coding the obtained data.

In next step SS5-15, area in which the pattern is continued is discriminated in accordance with the obtained outline data, and block division operation is performed. In step SS5-17, the movement and correction of each block are performed in accordance with data of the outline.

Figure 50A:
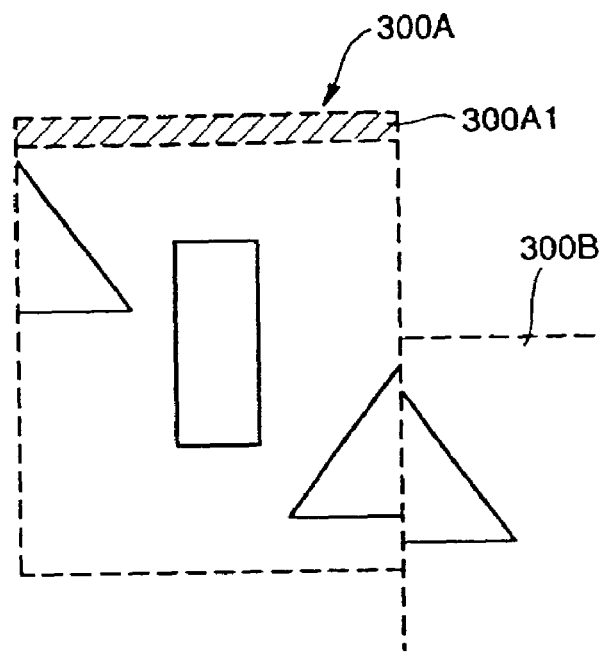
FIGS. 50A and 50B illustrate another example of the position deviation process.
Figure 50B:
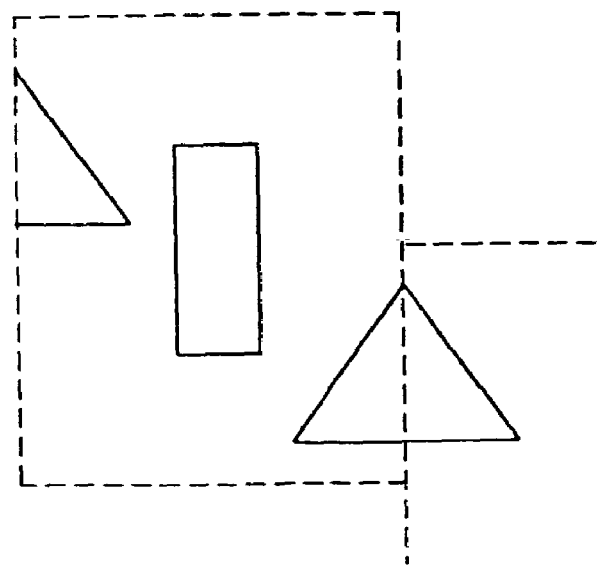

In order to correct the position deviation of the pattern in the boundary portion of the repeated basic images, a portion 300A1 of the basic image 300A may be eliminated as shown in FIGS. 50A and 50B as well as the division into blocks and the movement for each block. In this case, the processes following step SS5-7 shown in FIG. 48 are rewritten as shown in FIG. 51A or 51B.

Figure 51A:
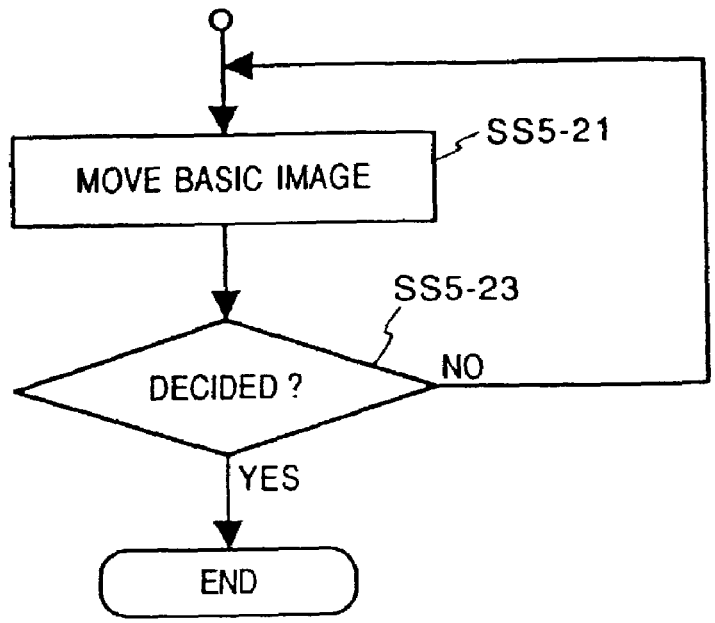
FIGS. 51A and 51B are flow charts which illustrate two examples of the position deviation process.
Figure 51B:
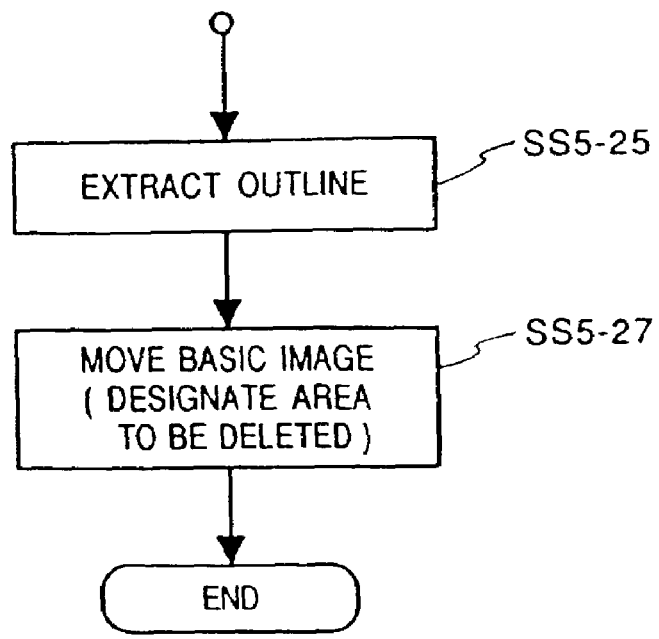

That is, in the process in which the operator performs the operation as shown in FIG. 51A, the overall of the basic image is moved to a position at which the quantity of the deviation is permitted while observing the continuity of the pattern in step SS5-21. In step SS5-23, input of the decision is waited for, and the unnecessary area is eliminated. In the process in which the automatic operation is performed by the host computer H as shown in FIG. 51B, the outline is extracted in step SS5-25 similarly to step SS5-13 shown in FIG. 49. Then, the overall of the basic image is moved in accordance with the outline data until the quantity of the deviation is smaller than a predetermined value to eliminate the unnecessary area.

The modification of the position deviation of the pattern may be performed by varying the magnification to enlarge or reduce the size for each pattern element (or the block) or by performing a one-side magnification variation as well as by the block movement and by the movement of the overall body of the basic image. Furthermore, an arrangement may be employed in which any one of the aforesaid modifying methods may be selected if necessary in place of a predetermined method and performed. In addition, the mode in which the operator performs the operation or the mode in which the computer performs the automatic modification may be selected.

Figure 52A:
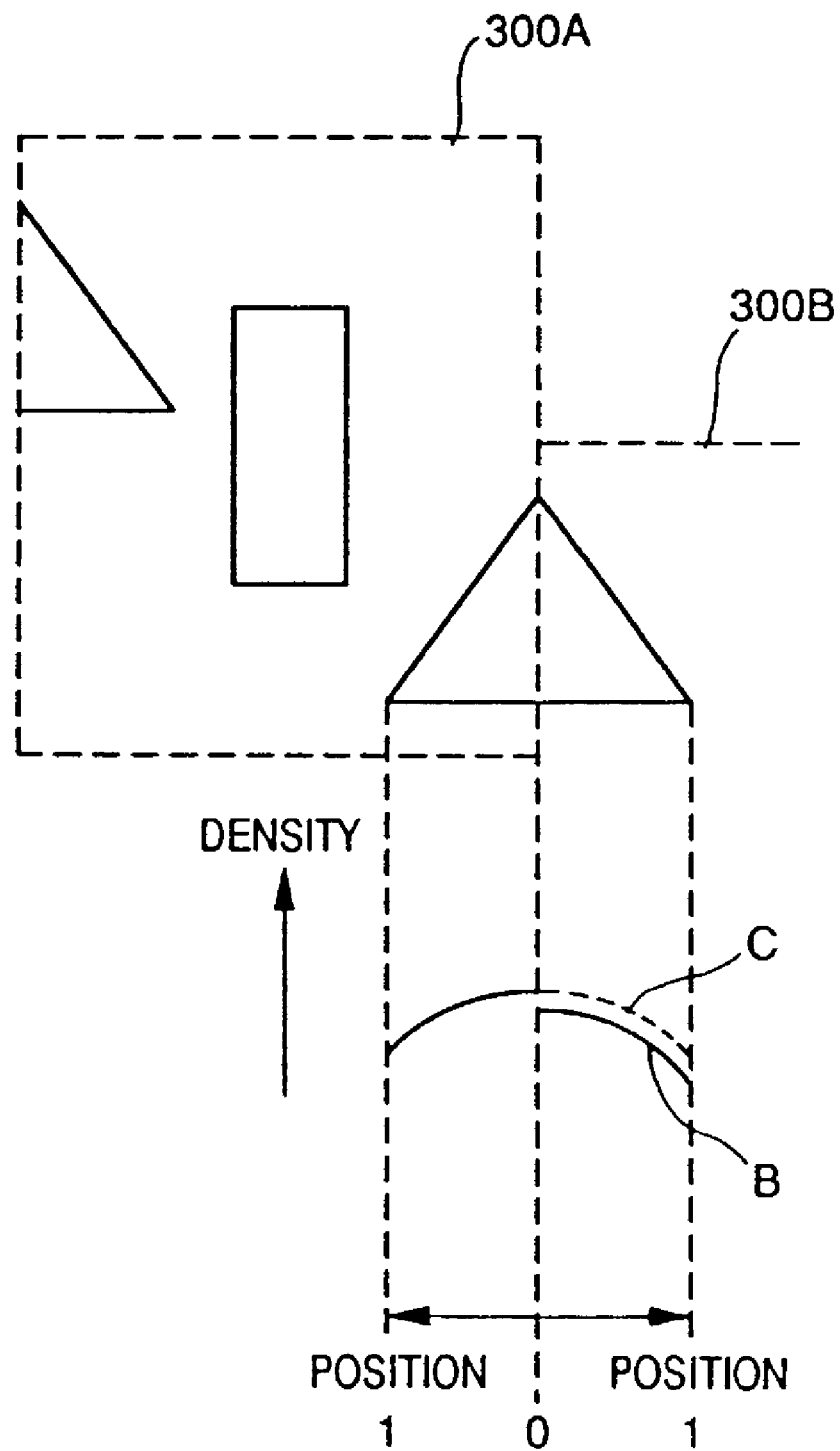

A correction process to be performed if the color tone deviates at the boundary portion of the repeated basic image will now be described. This process is a process in which the color tone deviation as shown by a solid line B and in FIG. 52B with respect to the pattern of the basic images 300A and 300B shown in FIG. 52A is modified by giving gradation as designated by a dashed line C and in FIG. 52C.

Figure 53:
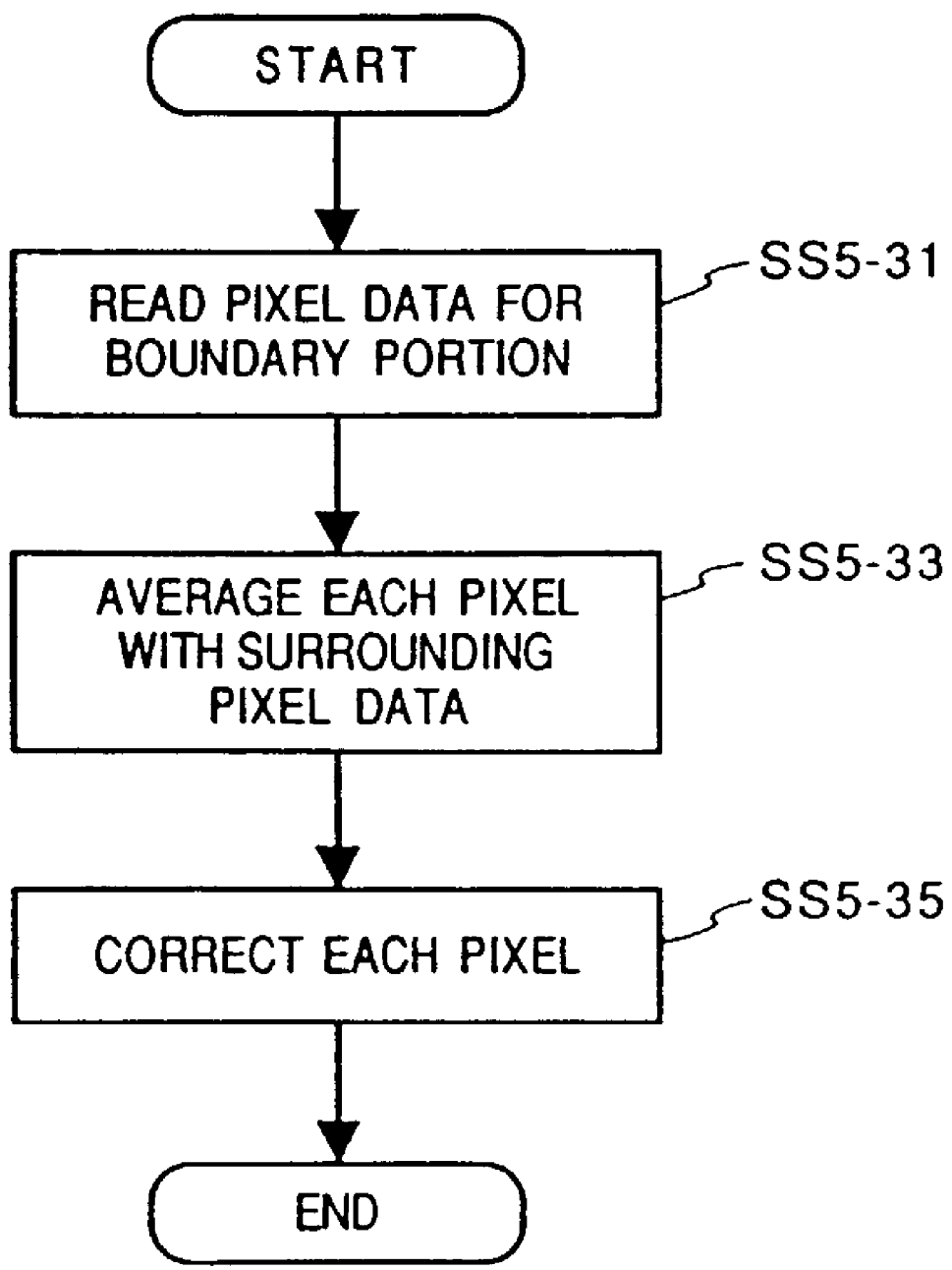
FIG. 53 is a flow chart which illustrates an example of the color deviation modifying process.

FIG. 53 illustrates an example of the foregoing modification process. In this process, the pixel data group for the boundary portion is read in step SS5-31, and each pixel is averaged in step SS5-33. That is, the subject pixel data and data about eight surrounding pixels are added, and the result of the addition is divided by the number (i.e., 9) of the pixels. The obtained mean value is set to the value of the subject pixel. An assumption is made here that the obtained pixel data group is shown in FIG. 52B.

Then, the pixel data of the basic image 300B are replaced while being given gradation, so that the pixel data are corrected. The foregoing process can be performed in accordance with the following equation:

$$Bnm = \{Anm/Bnm + (1 - Anm/Bnm) \times X\} \times Bnm$$

where Bnm and Anm respectively are pixel data of the basic image 300B to be processed and pixel data corresponding to the boundary portion of the basic image 300A, X is a numeral for giving the gradation and may be a value which is increased from "0" to "1" by each "0.2". As a result, the pixel group becomes as shown in FIG. 52C and the color tone deviation is corrected as designated by dashed line C shown in FIG. 52A.

This process may be started only when the color tone deviation between the pixels of the basic images 300A and 300B at the boundary portion is larger than a predetermined value, that is, only when the color tone deviation occurred excessively.

The color tone deviation occurs in cut/pasted portions if the designer cuts/pastes the pattern to make the basic image, as well as the boundary portion of the basic image. The color tone deviation of the foregoing type is read as a black line or a gray area (the portion in which the values of the red, gray and blue signals are substantially the same).

Figure 54:
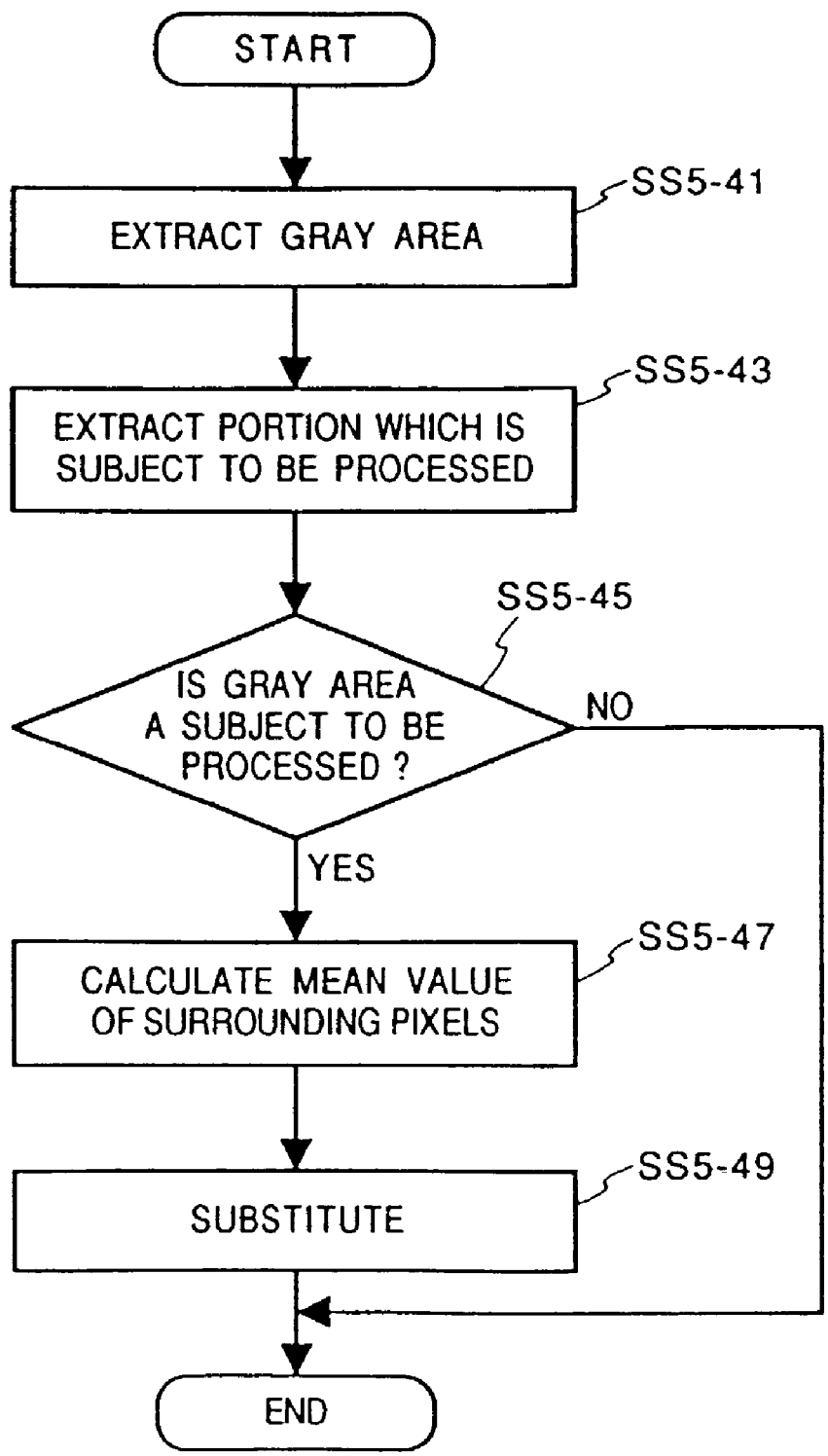
FIG. 54 is a flow chart which illustrates an example of a gray area modifying process included by the modifying process.
Figure 55:
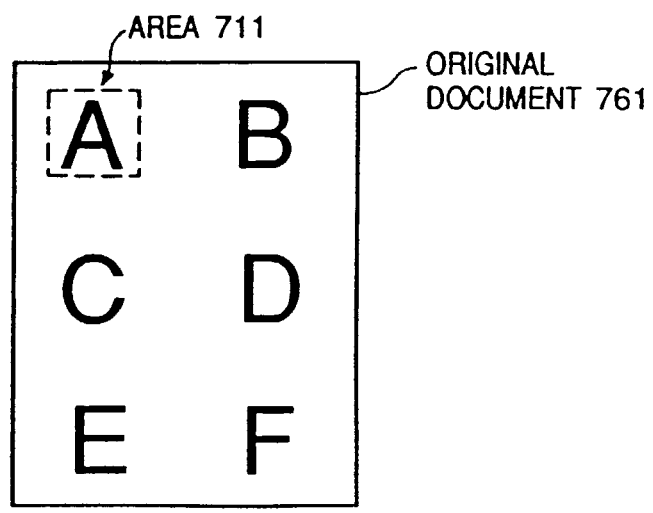
FIG. 55 illustrates a state where an image area to be repeated is instructed.
Figure 56A:
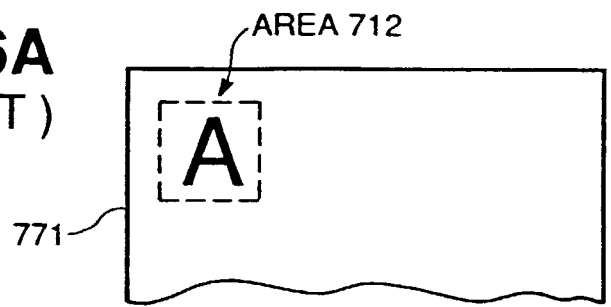
FIGS. 56A to 56C illustrate states where image repetition is executed by the conventional structure.
Figure 56B:
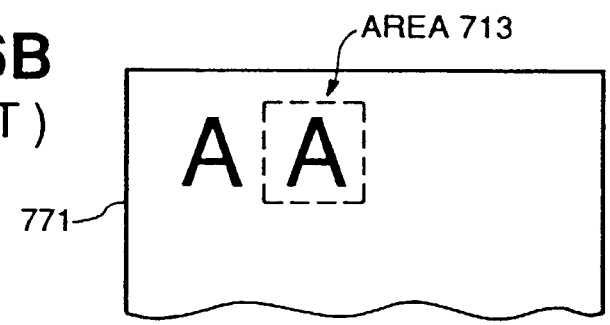
Figure 56C:
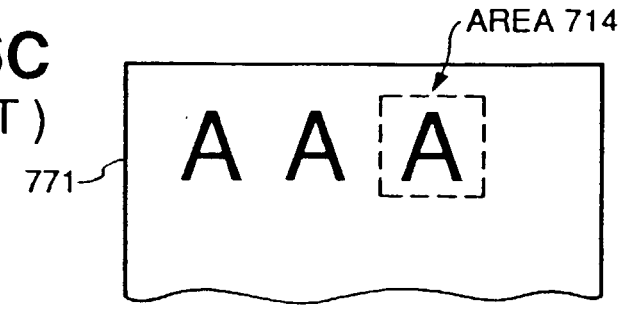

FIG. 54 illustrates an example of a process of modifying the aforesaid gray area. In this process, the gray area is extracted from the read image data in step SS5-41. In next step SS5-43, a portion which is the subject of this process is extracted. The aforesaid extraction operation may be performed in accordance with a selection from the basic image performed by the operator. That is, the portion, which is not the inherent designed portion, is designated.

In next step SS5-45, whether or not the extracted gray area includes the subject portion to be processed is determined. If an affirmative discrimination is made, the flow proceeds to step SS5-4 in which the subject pixel data and surrounding data in the gray area are averaged. In step SS5-49, the subject pixel data is replaced by the mean value.

This process is not limited to modify the gray area. The boundary portion of the basic image may be subjected to the foregoing process. In this case, the aforesaid boundary portion is, as the subject to be processed, extracted in step SS5-43. Furthermore, the boundary portion may be subjected to the process in step SS5-47 and succeeding steps. Furthermore, the process to be performed in step SS5-49 may be subjected to a correction in which gradation is given as shown in FIG. 53. If the position deviation between pixel occurred due to cutting/pasting, the process shown in FIG. 48 may be employed to modify the deviation.

The aforesaid processes for modifying the position deviation, the color tone deviation and the gray area are described as examples. Therefore, other processes may be added if necessary. In addition, unnecessary processes may, of course, be skipped or omitted.

Although the description is made about the case in which the repetition of the basic image as shown in FIG. 24B is modified, it may, of course, be applied to the other type repeated patterns, for example those shown in FIGS. 24A, 24C to 24E.

The structure of the portion including the printer P for performing the aforesaid process will be described later with reference to FIG. 21.

(3) Printer (3.1) Printing Mechanism

Figure 13:
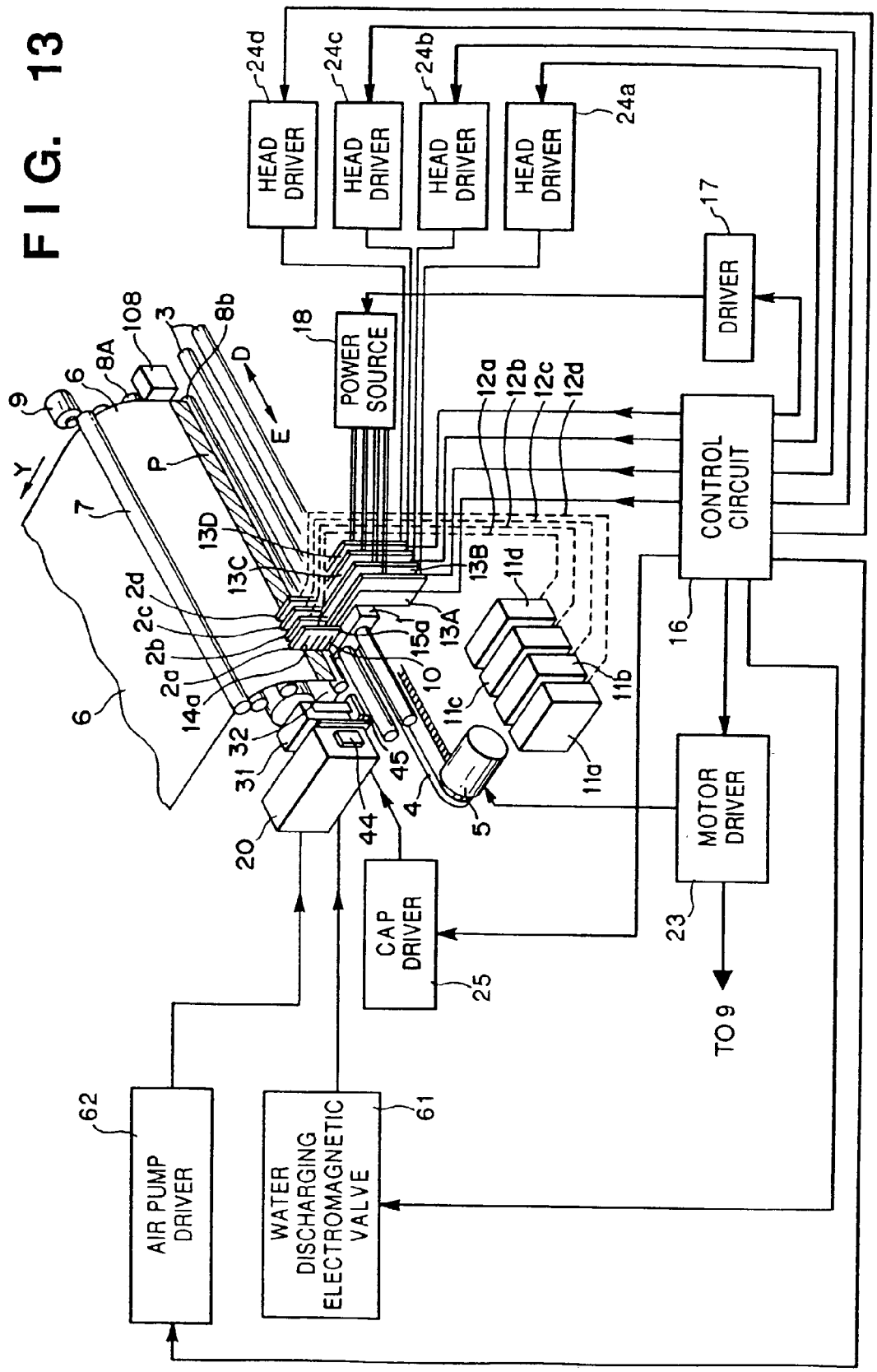
FIG. 13 is a perspective view which schematically illustrates the mechanical structure of a printer adapted to the embodiment of the present invention.

Referring to FIG. 13, the operation of a serial type ink jet recording apparatus employed as the printer P adaptable to the present invention will now be described.

Referring to FIG. 13, a carriage 1 has color printing heads 2a, 2b, 2c and 2d mounted thereon which are respectively capable of emitting cyan (C), magenta (M), yellow (Y) and black (BK). A guide shaft 3 supports the movement of the carriage 1 by guiding it. Although omitted from the illustration to simply describe the structure, the carriage according to this embodiment is able to have four special color heads mounted thereon. Furthermore, mechanisms relating to the special color heads are provided for the structure. Each of the heads can be attached/detached from the carriage 1 individually or in units of several heads.

A belt, which is an endless belt, is fixed and connected to the carriage 1 at a portion thereof, and is arranged to a gear fastened to a drive shaft of a carriage driving motor 5 (to be driven by a motor driver 23) which is a pulse motor. Therefore, when the carriage driving motor 23 is rotated, the belt 4 fastened to the drive shaft is moved, causing the carriage 1 to scan and move along the recording surface of a recording medium 6 (recording paper or a cloth). The printer P further comprises a conveyance roller 7 for conveying the recording medium 6, guide rollers 8A and 8B for guiding the recording medium 6, and a recording medium conveyance motor 9.

Each of the printing heads 2a, 2b, 2c, 2d and the special color printing heads has 256 outlet ports at a density of, for example, 400 DPI (dot/inch) for emitting ink droplets to the recording medium 6. Each of the printing heads 2a, 2b, 2c and 2d (and the special color printing heads) is supplied with ink from each of corresponding ink tanks 11a, 11b, 11c and 11d (and the special color ink tank) through each of supply tubes 12a, 12b, 12c and 12d (and special color ink supply tube). Furthermore, energy generating means (omitted from illustration) disposed in the liquid passages led to each outlet port are selectively supplied with ink emitting signals from head drivers 24a, 24b, 24c and 24d (and a special color driver) through flexible cables 13a, 13b, 13c and 13d (and special color flexible cable).

Each of the printing heads 2a, 2b, 2c and 2d and so forth has each of corresponding head heaters 14a, 14b, 14c and 14d (14b, 14c and 14d and so forth are omitted from illustration) respectively and each of temperature detection means 15a, 15b, 15c and 15d (15b, 15c and 15d and so forth are omitted from illustration) respectively. Detection signals supplied from the temperature detection means 15a, 15b, 15c, 15d and so forth are supplied to a control circuit 16 having a CPU. The control circuit 16 controls the operation of heating performed by the head heaters 14a, 14b, 14c and 14d and so forth via a driver 17 and a power source 18 in response to the detection signals.

A capping means 20 comes in contact with the outlet port surface of each of the printing heads 2a, 2b, 2c and 2d when the printing operation is not performed. As a result, the problem that the outlet port is dried and an undesirable mixture of foreign matters is prevented and the mixed foreign matters are removed. Specifically, the printing heads 2a, 2b, 2c and 2d are moved to positions at which they face the capping means 20 when the printing operation is not performed. The capping means 20 is driven forwards by a capping driver 25 to cause an elastic member 44 to press the outlet port surface to perform the capping action. Although omitted from the illustration, a capping means for the special color head may, of course, be provided.

A clog prevention means 31 receives emitted ink when the printing heads 2a, 2b, 2c and 2d perform idle emitting operations. The clog prevention means 31 has a liquid receiving member 32 which faces the printing heads 2a, 2b, 2c and 2d to absorb and receive the ink emitted in the idle emitting, the clog prevention means 31 being disposed between the capping means 20 and the recording start position. As a preferable material for the liquid receiving member 45, sponge porous material or a plastic sintered member can be used.

A water emitting electromagnetic value 61 and an air pump driver 62 are connected to the capping means 20 to actuate water emitting for washing an air jetting nozzle which is disposed in the capping means 20, under control of a control circuit 16.

Figure 14:
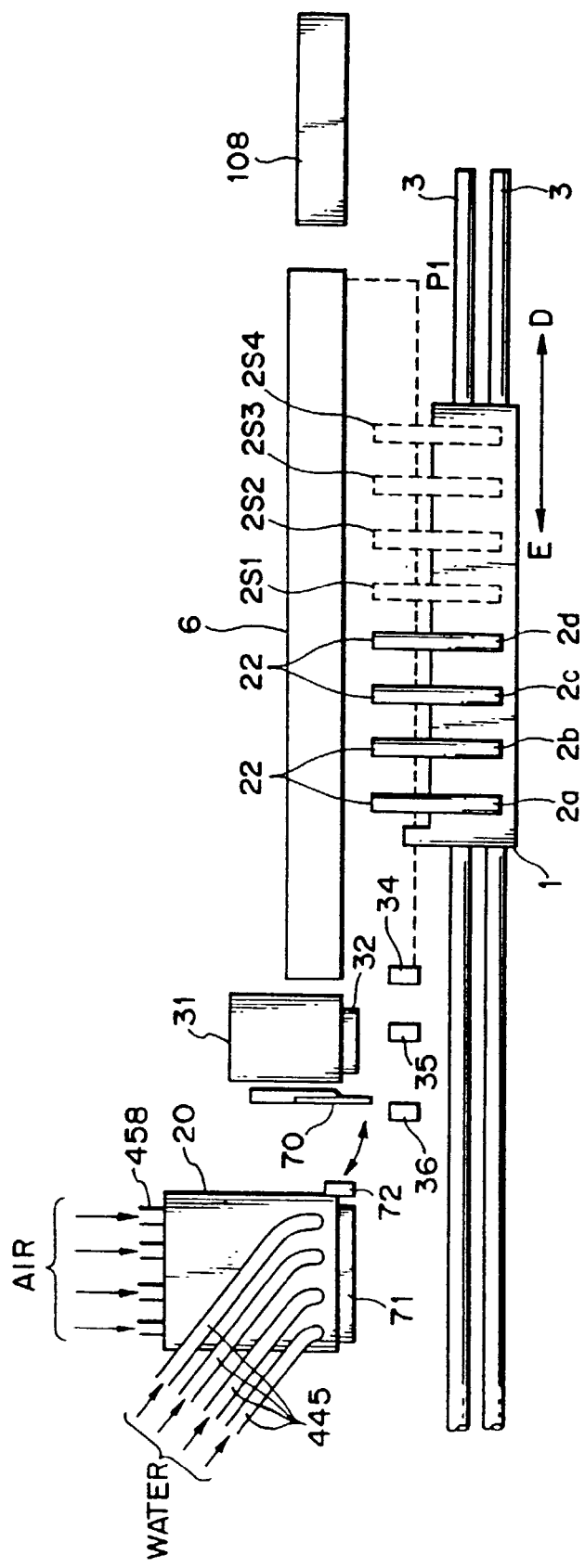
FIG. 14 is a plan view of the printer shown in FIG. 13.

FIG. 14 is a plan view which illustrates the operation of the printing head according to the present invention, where the same elements as those shown in FIG. 13 are given the same reference numerals and their descriptions are omitted here. Also in FIG. 14, the structures relating to the special color heads 2S1 to 2S4 are omitted from the illustration.

Referring to FIG. 14, a detection sensor 34 of a print starting position and a capping means detection sensor 36 respectively detect the positions of the printing heads 2a, 2b, 2c and 2d. A detection sensor 35 of an idle emitting position detects the standard position for the idle emitting operation performed by the printing heads 2a, 2b, 2c and 2d while moving in the scanning direction.

Reference numeral 108 represents a head characteristics measuring means for use in a head shading process (step MS23 shown in FIG. 2) and also for use to generate the color pallet data (step MS9). The head characteristics measuring means 108 comprises a conveyance means for conveying a recording medium or the like on which the head shading test pattern and the color pallet are printed by the heads, and a reading means for reading information about the test pattern and color pallet. The head characteristics measuring means 108 may be a means shown in FIG. 31 of Japanese Patent Laid-Open No. 4-18358 applied by the applicant of the present invention.

The ink jet recording operation will now be described.

In the waiting process, the printing heads 2a, 2b, 2c and 2d are capped by the capping means 20. When a printing signal is supplied to the control circuit 16, the motor 5 is rotated by the motor driver 23 to cause the carriage 1 to start the movement. When the detection sensor 35 detects that printing head has reached the idle emitting position 35, the printing heads 2a, 2b, 2c and 2d perform idle ink emitting for a predetermined time period to the clogging prevention means 31. Then, the carriage 1 is again moved in a direction designated by an arrow D. When the moved carriage 1 is detected by the recording start detection sensor 34, the outlet ports of the printing heads 2a, 2b, 2c and 2d are selected operated. As a result, an ink droplet is emitted so that an image is recorded on the recording medium 6 to form a dot matrix pattern. After printing for a predetermined width (which is determined depending upon the intervals of nozzles disposed in the longitudinal direction of the printing head and upon the number of the nozzles) has been completed, the carriage 1 is conveyed to the right end in the drawing (it can be detected by counting the number of pulses supplied to the motor 5). After the carriage 1 has been detected, pulses for the width in which the printing heads are disposed are supplied to cause the printing head 2a that is the leftmost head of the printing heads to arrive at the rightmost printing area. Then, the carriage 1 is moved in a direction designated by an arrow E to be returned to the idle emitting position. Furthermore, the recording medium 6 is conveyed by a quantity of the width of the recording width or larger, and the foregoing operations are repeated.

(3.2) Structure of Apparatus

Figure 15:
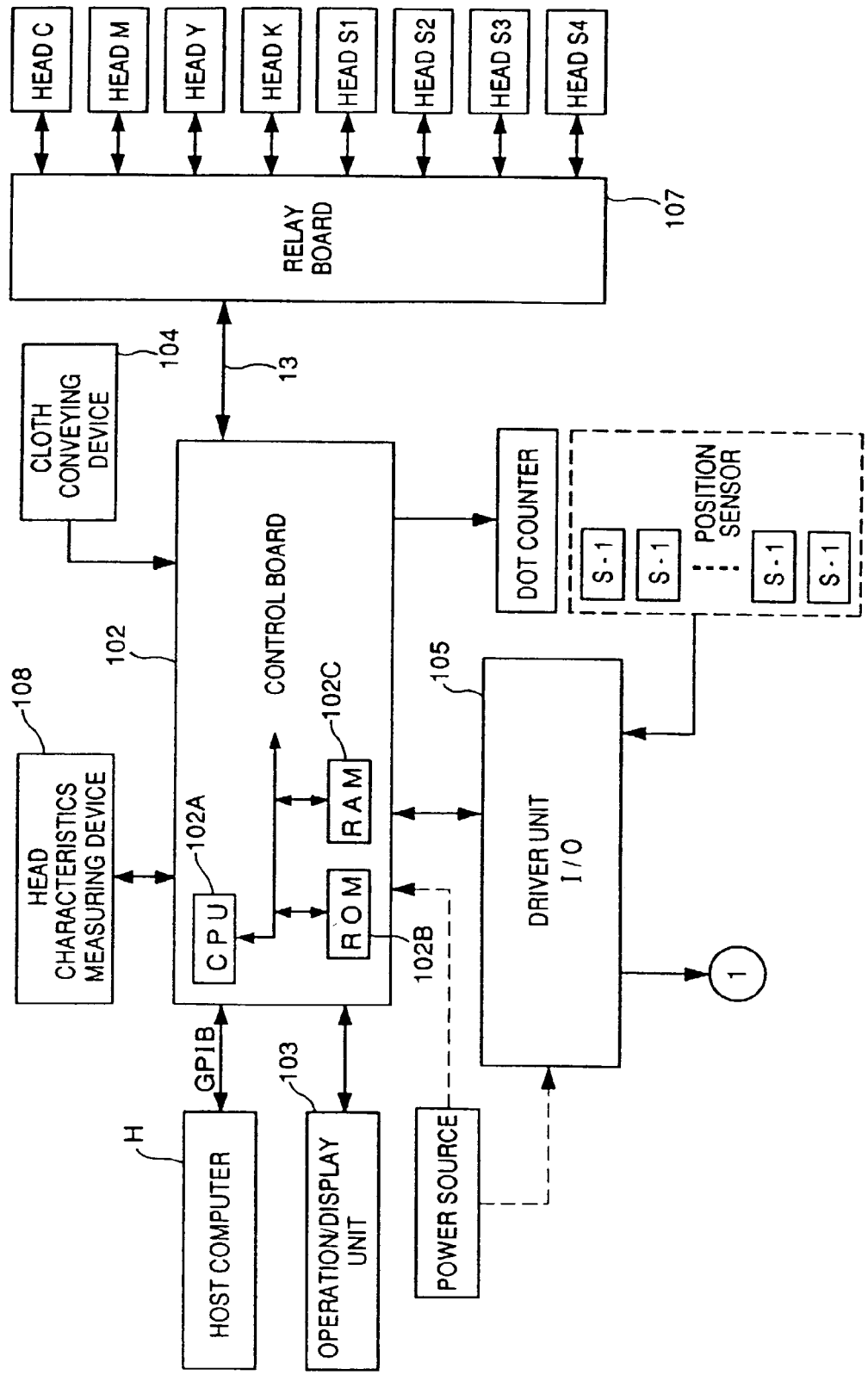
FIG. 15 is a block diagram which schematically illustrates the electrical structure of the printer shown in FIG. 13.
Figure 16:
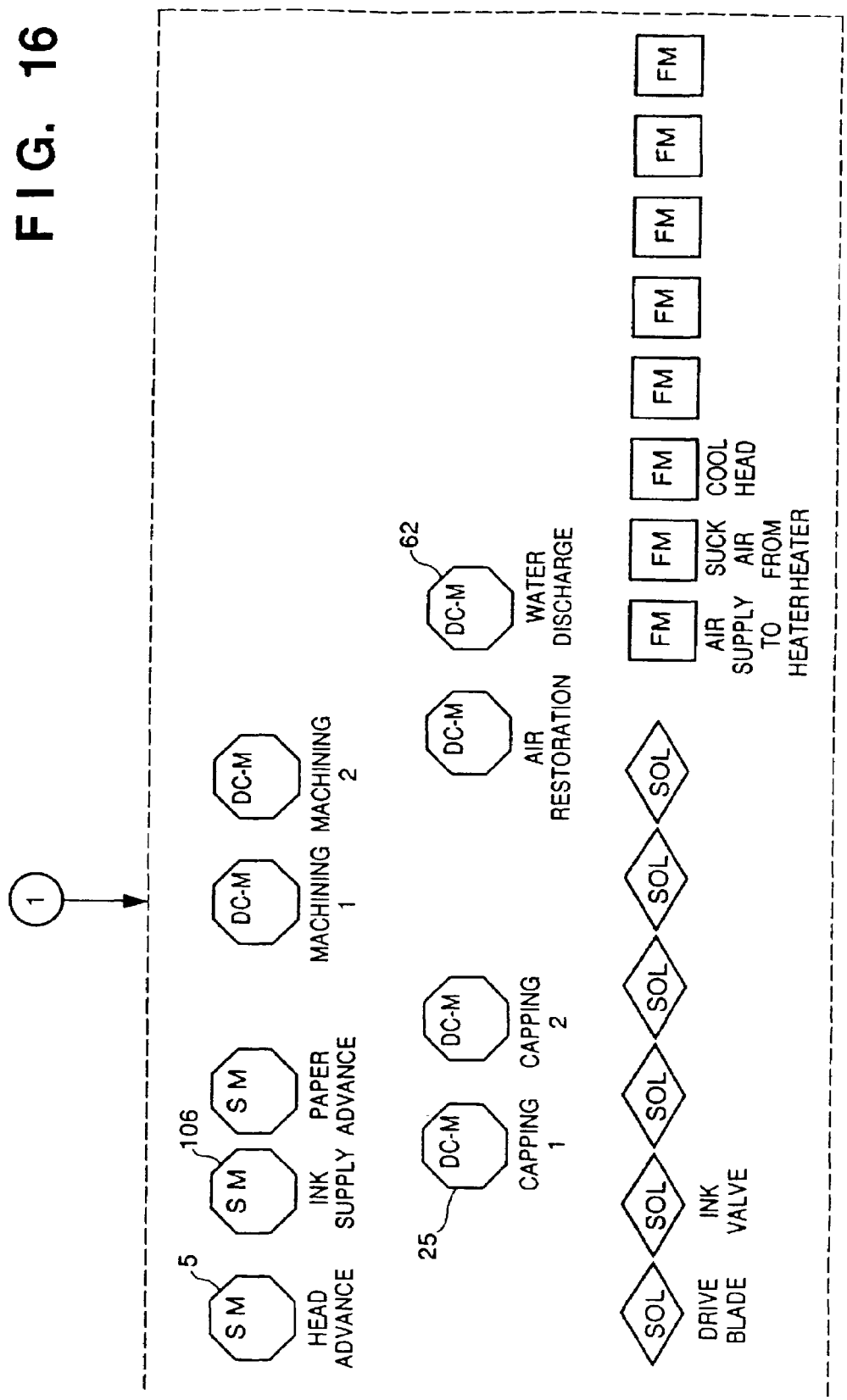
FIG. 16 is a block diagram.
Figure 17:
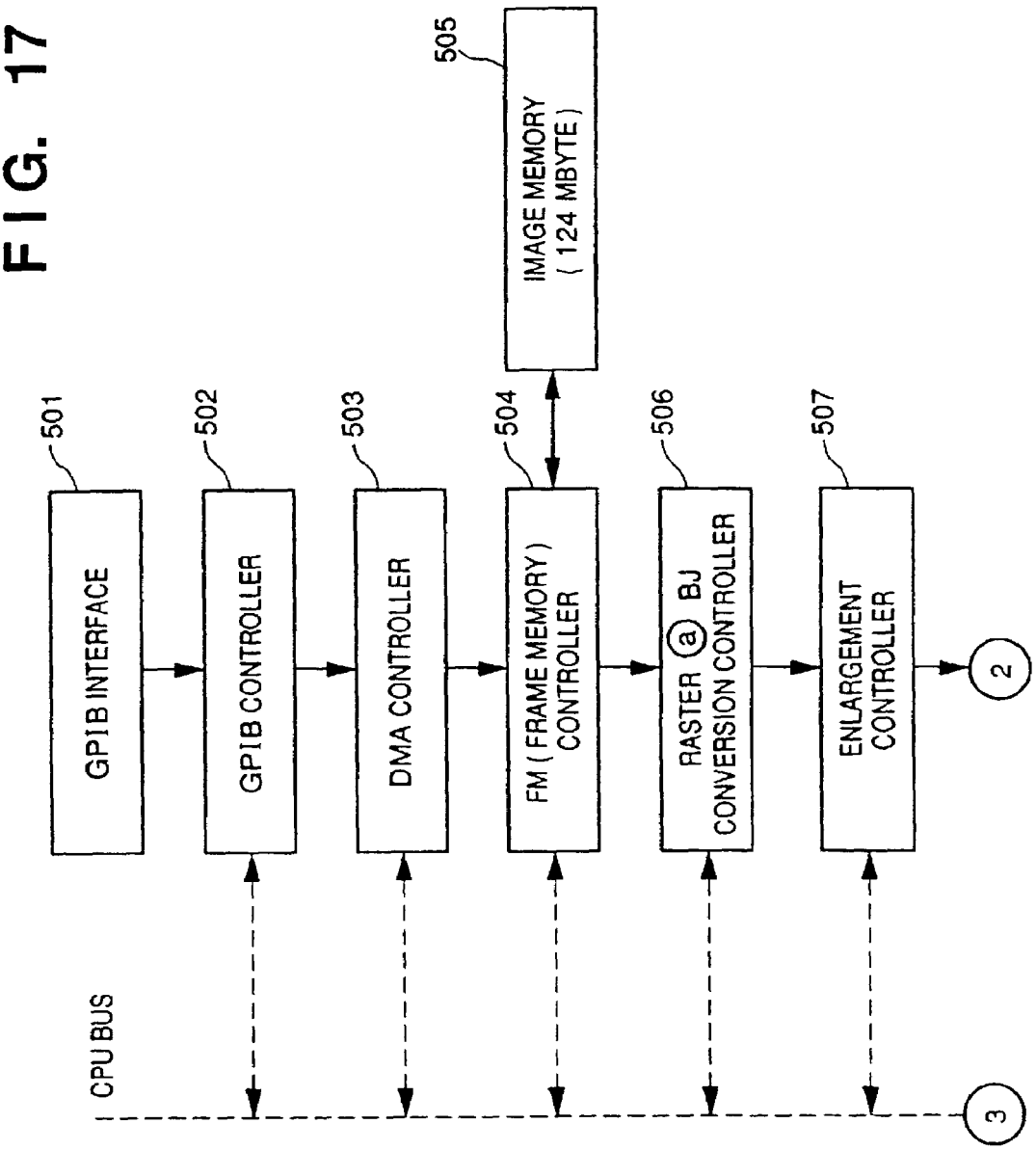
FIG. 17 is a block diagram which illustrates a portion of the internal structure of the control board shown in FIG. 15 while highlighting the flow of data.
Figure 18:
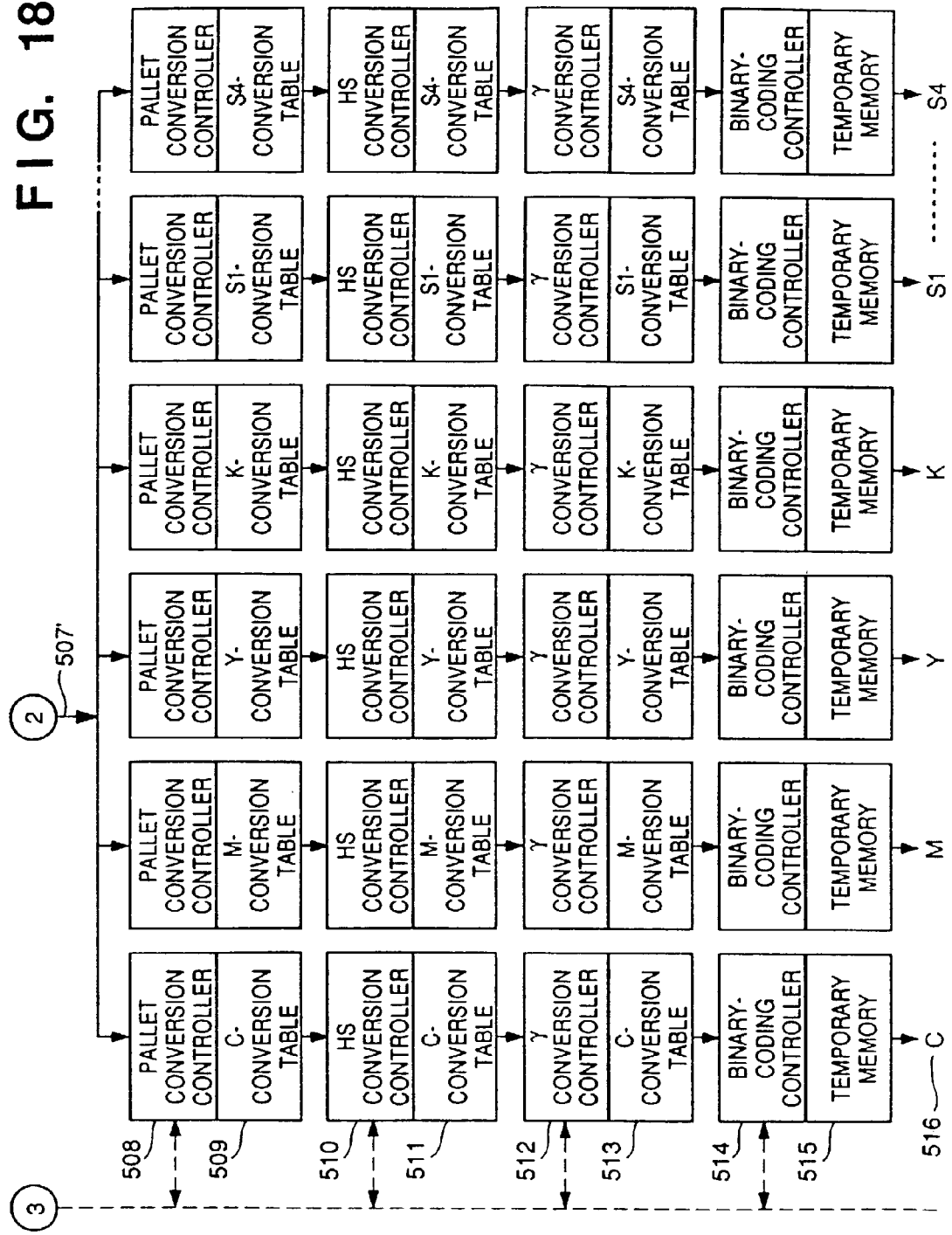
FIG. 18 is a block diagram.
Figure 19:
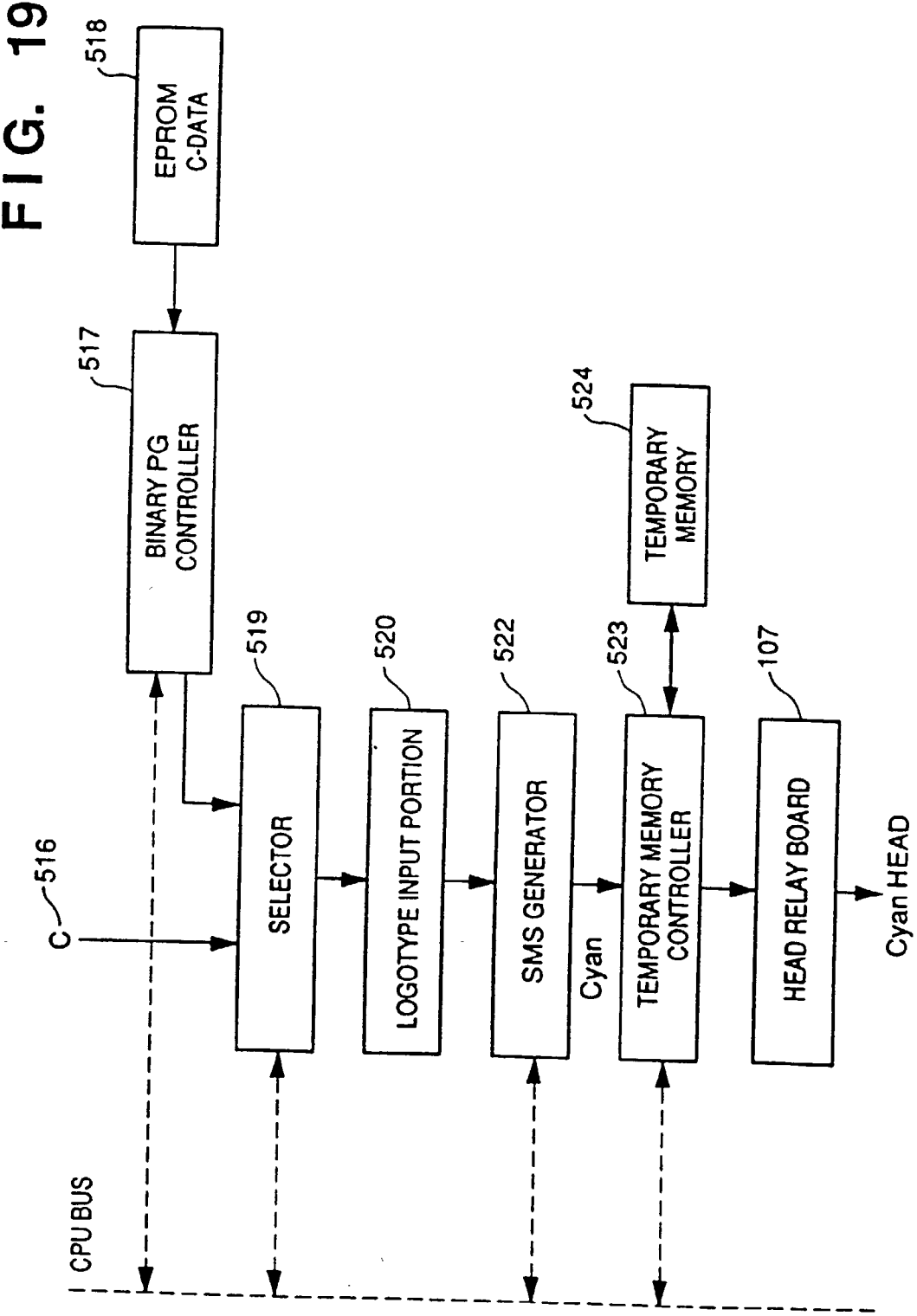
FIG. 19 is a block diagram.

The structure of the apparatus will now be described. FIGS. 15 and 16 illustrate examples of the structure of the ink jet printer according to this embodiment and an example of the structure of an operation portion therefor. FIGS. 17 to 19 schematically illustrate examples of the internal structure of a control board 102 shown in FIG. 15 in the sequential order of the data flow.

Printing image data is supplied from the host computer H to a control board 102 having the control circuit 16 and so forth shown in FIG. 13 via an interface (GPIB in the structure according to this embodiment). The apparatus for supplying the image data is not limited particularly and the data transmission may be performed by using a network or in an off-line manner via a magnet tape or the like. The control board 102 comprises a ROM 102B which stores a variety of programs, a RAM 102C having various register regions and working regions and other sections shown in FIGS. 17 to 19 and so forth to totally control the apparatus. Reference numeral 103 represents an operation/display unit having an operation panel with which the operator inputs a predetermined instruction to the printer P and a display for displaying messages and the like to the operator. Reference numeral 104 represents a cloth conveyer comprising a motor and so forth for conveying the recording medium such as a cloth to be printed. Reference numeral 105 represents a driver unit input/output port for rotating the various motors (denoted with "M" appended to the trailing end thereof) and actuating solenoids (denoted by "SOL") shown in FIG. 16. Reference numeral 107 represents a relay board for supplying the drive signal to each printing head and receiving information (information about whether or not the installation has been made and that about the color presented by the head) relating to each printing head to supply it to the control board 102. The information relating printing head is transmitted to the host computer H as described above.

When information about data of image to be printed and supplied from the host computer H is received, the information is stored in an image memory 505 via a GPIB interface 501 and a frame memory controller 504 (see FIG. 17). The image memory 505 according to this embodiment has a capacity of 124 Mbytes is arranged in such a manner that A1-size data is constituted in an 8-bit pallet data format. That is, 8 bits are assigned to one pixel. Reference numeral 503 represents a DMA controller for raising the data transmission speed between memories. When the data transmission from the host computer has been completed, a predetermined process is performed and the printing operation can be started.

Although the describing order is inverted, the host computer connected to the printing apparatus transfers image data as a raster image. Since each printing head has a plurality of ink emitting nozzles arranged in the longitudinal direction, the arrangement of image data items must be converted to be adaptable to the arrangement of nozzles. The data conversion is performed by a raster @ BJ conversion controller 506. Data converted by the raster @ BJ conversion controller 506 is supplied to a pallet conversion controller 508 (see FIG. 18) after it has been subjected to an enlargement function of an enlargement controller 507 for varying the size of the image data. Data used in the enlargement controller 507 or the former process is supplied from the host computer; the data is an 8-bit pallet data according to this embodiment. The pallet data (8-bit) is commonly supplied to the processing units (to be described later) for the corresponding printing heads and is processed in the units.

An assumption is made here that 8 printing heads for storing yellow, magenta, cyan, black and special colors S1 to S4 are provided.

The pallet conversion controller 508 supplies the pallet data supplied from the host computer H or due to the process shown in FIG. 4, or 9 or 10 and corresponding color conversion table to a conversion table memory 509.

If an 8-bit pallet data is used, 256 colors from 0 to 255 can be reproduced. For example, tables shown in FIGS. 5 to 8 are developed in the table memory 509 corresponding to the subject colors.

A specific circuit structure will now be described. The pallet conversion table memory 509 performs the function thereof by writing conversion data at the address position for the pallet data. If the pallet data is actually supplied as the address, the memory is accessed in the reading mode. It should be noted that the pallet conversion controller 508 controls the pallet conversion table memory 509 and establishes an interface between the control board 102 and the pallet conversion table memory 509. As for the special colors, a circuit for setting a quantity of mixing the special color (a circuit for multiplying the output in a range from 0 to 1 time) is interposed between the pallet conversion table memory 509 and a succeeding HS system composed of an HS conversion controller 510 and an HS conversion table memory 511 to enable the quantity of setting to be varied. In this case, data is transmitted as shown in FIGS. 5 to 8, and then data with which the quantity is varied is transmitted to be set to the circuits.

The HS conversion controller 510 and the HS conversion table memory 511 correct the deviation of the printing densities or the emitting directions of the outlet ports (nozzles) in each printing head in accordance with data measured by the head characteristics measuring means 108. For example, data for an outlet port which emits lean (small quantity) ink is converted to raise the density. Data for an outlet port which emits dense (a large quantity) ink is converted to lower the density, and data for an outlet port which emits intermediate density ink is supplied as it is.

A γ conversion controller 512 and γ conversion table memory 513 perform table conversions for raising or lowering the overall density for each color. For example, if no operation is performed, a linear table as follows is used:

data (0) outputs when data (0) is input
data (100) outputs when data (100) is input
data (210) outputs when data (210) is input
data (255) outputs when data (255) is input A succeeding binary-coding controller 514 has a pseudo gradation function and receives 8-bit gradation data and outputs binary-coded 1-bit pseudo gradation data. Multi-value data is converted into binary data by a dither matrix method and an error diffusion method and the like. This embodiment employs anyone of the foregoing method. Although their descriptions about them are omitted here, the method must express the gradation by means of the number of dots per unit area.

Binary-coded data is stored in a temporary memory 515, and is used to operate each printing head. Binary data transmitted from each temporary memory is transmitted as C, M, Y, BK, and S1 to S4. Since the binary-coded signals for the corresponding colors are subjected to the same process, binary data C will now be described with reference to FIG. 21. FIG. 21 illustrates a structure for processing cyan to be recorded, and a similar structure for each color is provided. FIG. 19 is a block diagram which illustrates the circuit structure following the temporary memory 515 shown in FIGS. 17 and 18.

A binary-coded signal C is transmitted to a sequential multi-scan generator (hereinafter called an "SMS generator") 522. However, the signal C is first supplied to a selector 519 because a test printing operation for the sole apparatus is sometimes performed by pattern generators 517 and 518. The selection of the selector 519 is, of course, controlled by the CPU of the control board 102. If the operator performs a predetermined operation with the control unit 103 (see FIG. 15), data from the binary pattern generator 517 is selected to perform the test printing operation. Data from the binary controller 514 (the temporary memory 516) is ordinarily selected.

It should be noted that the SMS generator 522 is used to prevent the dispersion of the irregular density of the image due to the dispersion of the quantities of the emitting and/or the emitting directions for each nozzle. The temporary memory 524 is a buffer memory for correcting the physical position of the interval between the heads and arranged to temporarily receive image data and to transmit it at timing corresponding to the physical position of the head. Therefore, each of the temporary memories 524 has a different capacity for the corresponding color to be recorded. Furthermore, it can be designated in step MS21 shown in FIG. 2 that an image quality is given priority by causing a plurality of the outlet ports to emit ink to form one pixel or high speed operation is given priority without the aforesaid multi-scan operation.

After the aforesaid data process has been completed, data is supplied to the head via a head relay board 107.

Hitherto, data for the pallet conversion, the HS conversion and the γ conversion is fixedly held by the memory provided with a main body of the apparatus. Therefore, there has sometimes occurred a problem in that the data is not adaptable to the image data to be transmitted and a satisfactory image quality cannot be obtained. Accordingly, this embodiment has an arrangement that the data for the conversion can be inputted from outside of the apparatus and it is stored in each conversion table memory. For example, pallet conversion data as shown in FIGS. 5 to 8 is loaded down to the conversion table memory 509. That is, the conversion table memories 509, 511 and 513 according to this embodiment are constituted by RAMs. The data for the pallet conversion and the γ conversion is transmitted from the host computer H. The data for the HS conversion is inputted through the external head characteristics measuring device 108 (see FIG. 15) to always obtain data corresponding to the state of the head. In order to obtain the head characteristics for each recording color by the head characteristics measuring device 108, the test printing operation (recording of a uniform and predetermined half tone image) is performed by each printing head, and the density distribution corresponding to the width to be recorded is measured. The aforesaid "state of the head" means dispersion of the emitting states realized by a plurality of nozzles included by the head or the degree of the difference between the density of the image printed by the head and a desired density.

This embodiment has an arrangement that the output is made to be zero even if data is supplied as shown in FIG. 20 and the printing operation is inhibited in order to prevent an abnormal output until the parameter for the conversion is inputted. Also the γ conversion and the like are performed similarly.

FIG. 21 illustrates an example of the structure of a logotype input portion 520 shown in FIG. 19 and adapted to the process to be performed by the host computer H and shown in FIG. 11.

Data <color>, <pattern>, <X0>, <Y0>, <L0> and <L1> are set to a register 520A by a CPU 102A included by the control board 102 of the printer P. The controller 520B is constituted by a counter and so forth and arranged to receive signals (for example, address signals) for controlling the main-scanning directional (X-directional) movement of the printing head and the sub-scanning directional (Y-directional) movement of the cloth 6. As a result, the logotype is formed at a position determined by L0 and L1 (see FIG. 12). Furthermore, the controller 520B controls a blanking circuit 520C for making the binary-coded image data to be blank in order to make the area from the subject position and determined by X0 and Y0 stored by the register 520A, that is, the logotype printing range to be blank. The blanking circuit 520C receives the aforesaid control signal to delete the image data 516 for the subject area.

The controller 520B designates a logotype memory 520D which stores the logotype to be printed in accordance with the "pattern" stored by the register 520A. This embodiment has four type of logotype patterns, that is, four logotype memories are provided. Each logotype memory 520D is constituted by using two 4M-bit ROMs to cover the maximum size determined by the maximum X0 value (for 512 pixels) and the maximum Y0 value (the number of the outlet ports 256 of the printing head: 256×8 bands=2048 pixels).

Figure 22B:
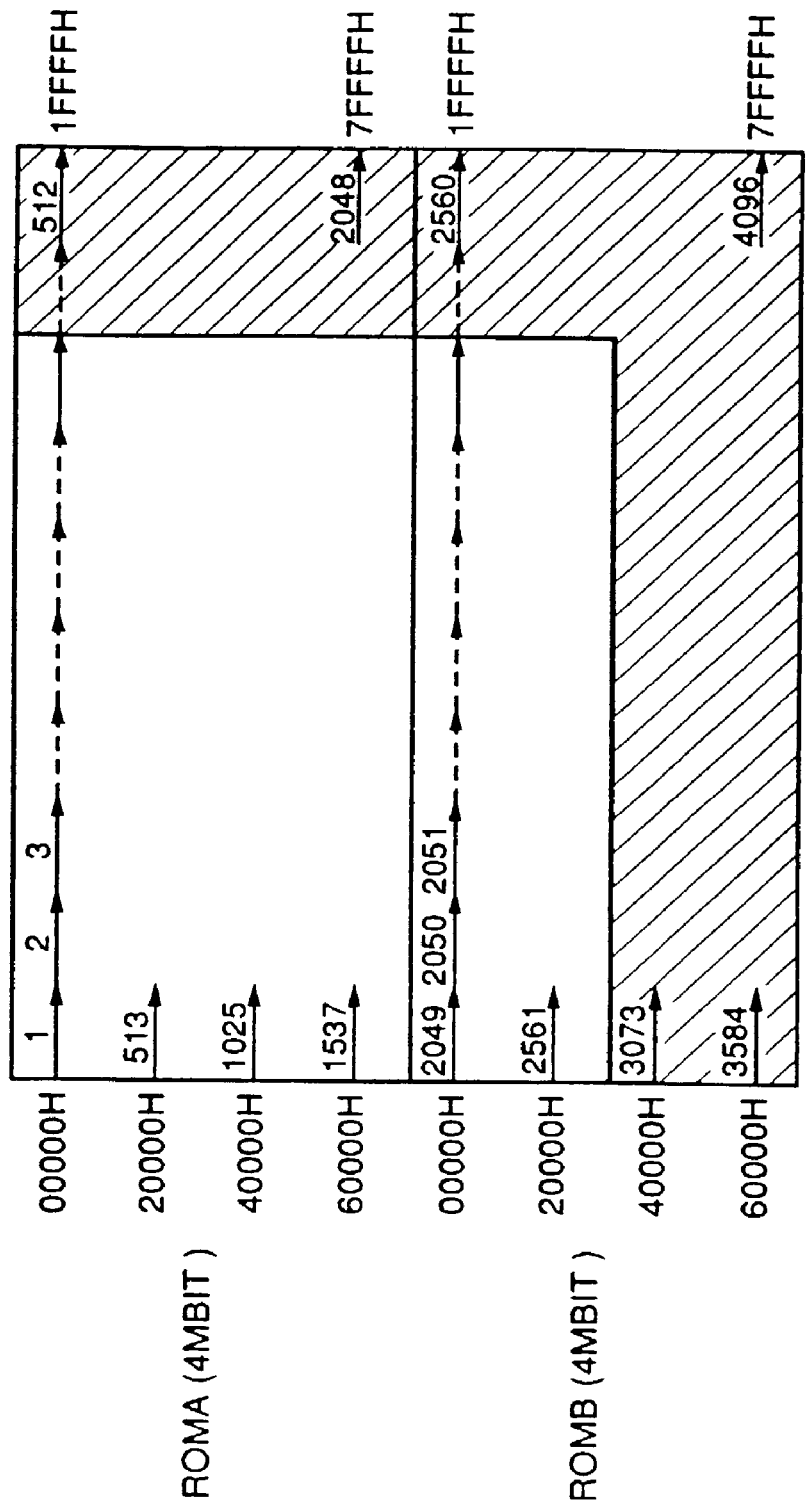

FIGS. 22A and 22B illustrate the correspondence between the logotype image output area and the data of the two ROMs (ROMA and ROMB) of the logotype memory. Referring to the drawings, the hatching section denotes a portion which is not outputted because the value is larger than designated values X0 and Y0.

Figure 23:
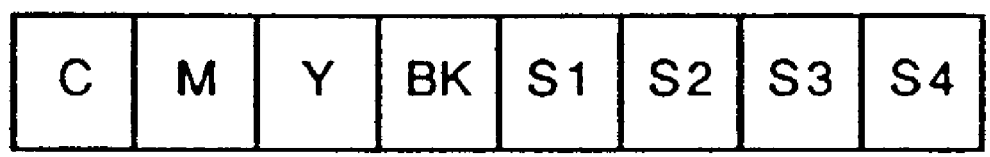
FIG. 23 illustrates an example of the structure of data with respect to one pixel in a logotype memory.

The one pixel is constituted by 8 bits as shown in FIG. 23 and ON/OFF data for each color is assigned to each bit.

Data read from the logotype memory 520D designated by the controller 520B is supplied to a logotype transmission circuit 520E. The logotype transmission circuit 520E is constituted by a selector and so forth, to make only bit (color data) among the pixel data shown in FIG. 23 to be effective, the bit is related to the color designated by logotype color designation data (color) stored in the register 520A. Then, the logotype transmission circuit 520E supplies the effective color data to a data transmission circuit 520F. The data transmission circuit 520F, which can be constituted by an OR circuit and so forth, transmits the color data for printing the logotype having a designated pattern in the designated color in the blank region. Furthermore, the data transmission circuit 520F causes the image data 516 to pass through as it is in except for logotype area, to supply it to the succeeding SMS generator.

Since the logotype data is controlled independently from the basic image data in this embodiment, a desired logotype data can be inserted at a repetition cycle desired by the operator regardless of the basic image repetition cycle and the type of the repetition pattern as shown in FIG. 24. Furthermore, the designated area is made blank immediately before the transmission of the basic image data to the head, that is, after the binary coding operation, and the logotype is inserted.

Therefore, the logotype mark can be printed as desired (for example, clearly) while being freed from influences of the various conversions. Furthermore, the 1 byte is allocated for one pixel in such a manner that each color is assigned to each bit as shown in FIG. 23. Therefore, the efficiency of using the memory can be improved.

Another structure may be employed which has an arrangement that the contents of the logotype memory are read by the CPU of the host computer H or the printer P and it can be displayed on the CRT 1026 of the host computer H or the operation/display unit 103 of the printer P.

Although this embodiment has the logotype memory comprising the ROM, it may be a PAM or an EPROM or the like to enable the contents to be loaded from the host computer H. In this case, an arrangement may be employed in which the host computer H files the logotype data and stores an external storage unit with a control number so as to be accessed if necessary. In the case where the RAM is used, a battery backup system may be employed to save the stored contents even if the power supply is turned off. Another structure may be employed which has an arrangement that the logotype data is transferred from the host computer H and developed to a memory of the printer.

The number of the logotypes, that is, the number of the logotype data patterns, of course, is not limited to the four.

With the printer P according to this embodiment, a mode in which two or more times of ink emitting for one pixel, such as the multi-scanning operation, can be selected. If the logotype does not need to have high image quality, control may be performed in such a manner that the second and succeeding emitting operations to form the foregoing logotype are inhibited. In this case, a gate circuit or the like must be added to, for example, the data transmission circuit 520F shown in FIG. 21, the gate circuit being arranged to cancel the logotype data in order to inhibit the second and succeeding emitting operations in accordance with the subject mode.

(3.3) Printing Pattern of Basic Image

When the image data of the basic image is inputted, the host computer H transmits the input image size ($X_{in}$, $Y_{in}$) in the form of the command and the parameter to the printer P. As a result, the CPU 102A of the printer P keeps an input area in the image memory 505, and causes the input image size to be stored in a parameter storage area in a RAM 102C. When the host computer H sequentially transmits the image data to the printer P, the printer P receives the image data and causes it to be stored in the image memory 505 via an FM controller 504. On the other hand, the host computer H transmits the output format of the image data to the printer P. As a result, the printer P causes the output format to be stored in a parameter storage area of the RAM 102C. According to this embodiment, an output type as shown in FIG. 24 is employed as the output format of image data.

FIGS. 24A to 24E illustrate image output formats according to this embodiment.

Figure 24C:
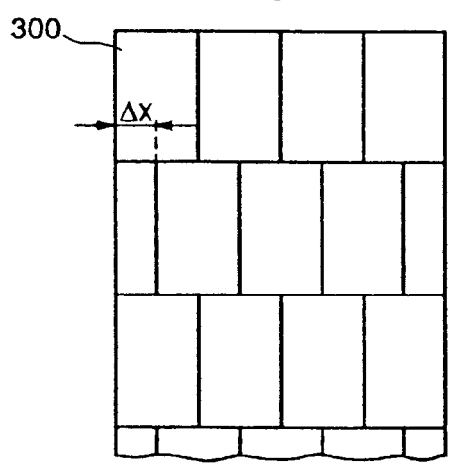
Figure 24D:
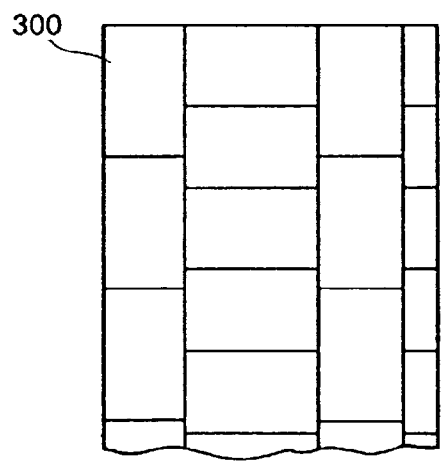
Figure 24E:
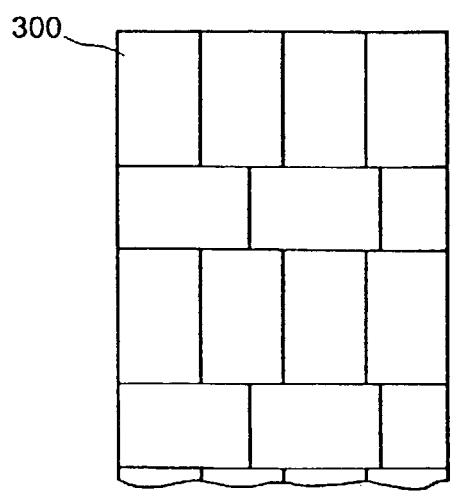

FIG. 24A illustrates a format (type 1) in which the basic image 300 is printed out as shown in FIG. 24A in such a manner that it is periodically repeated in the direction X (in the direction in which the carriage 1 is moved) and in the direction Y (in the direction in which the recording medium 6 is moved). FIG. 24B illustrate a format (type 2) in which the basic image 300 is repeatedly printed in such a manner that the basic image 300 is set off every other frame in the direction X by a predetermined offset quantity (deviation quantity) $\Delta y$ into the direction Y. FIG. 24C illustrates a format (type 3) in which the basic image 300 is printed out in such a manner that the basic image 300 is set off every other frame by a predetermined quantity $\Delta x$ into the direction X. FIG. 24D illustrates a format (type 4) in which the basic image 300 is printed out in such a manner that the basic image 300 is rotated (by 900 in the case shown in FIG. 24D) and it is set off in the direction Y by an offset quantity (offset is "0" in the case shown in FIG. 24D) similarly to type 2 (see FIG. 24B). FIG. 24E illustrates a format (type 5) in which the basic image 300 is printed out in such a manner that the basic image 300 is rotated (by 90° in the case shown in FIG. 24E) and it is set off in the direction X by an offset quantity ("0" in the case shown in FIG. 24E) similarly to type 3 shown in FIG. 24C.

As the parameter for designating the output format and being transmitted from the host computer H, the following parameters may be employed as well as the aforesaid parameter: the output types such as types 1 to 5; the size of the basic image ($X_b$, $Y_b$); the overall size of the output image ($X_{out}$, $Y_{out}$); X-directional offset quantity $\Delta x$ and Y-directional offset quantity $\Delta y$; and the quantity of rotation (it is in units of 90° here). The parameters are set under the following conditions:

$$X_{in} \times Y_{in} \leq \text{capacity of memory 505}$$

$$X_b \leq Y_{in}$$

$$X_b \leq Y_{in}$$

$$X_{out} \geq X_b$$

$Y_{out} \geq Y_b$ $\Delta_x \leq X_b$ $\Delta_y \leq Y_b$

The host computer H transmits an image data printing command in step MS25 shown in FIG. 2 to the printer P. As a result, the printer P starts the printing operation.

Specifically, the CPU 102A controls the timing of reading the memory 505 in the address control portion provided for the FM controller 504, the timing of starting the motor driver 23 and the timing of starting the head driver 24. As a result, the CPU 102A controls the timing of printing an image on the cloth 28 which is the recording medium. The address control portion sequentially reads image data from the memory 505 in accordance with the parameter set to the parameter storage area to transmit it to the head driver 24. As a result, the head driver 24 generates driving signals for the printing heads 2a to 2d and the special color heads in accordance with the image data, to transmit the driving signals to the printing heads. Thus, each of the printing heads is operated by the drive signal. As a result, an ink droplet is emitted to the cloth 6 so that an image corresponding to the image data is printed.

On the other hand, the motor driver 23 rotates the conveyance motor 9 to advance the cloth 6 to a position at which it can be printed. Then, the carriage motor 5 is rotated in a predetermined direction to perform recording while moving the carriage 1 in direction D (see FIG. 13). When printing for one scanning has been completed as described above, the carriage motor 5 is rotated inversely to move the carriage 1 in direction E to return to the home position. Then, the cloth 6 is advanced by rotating the conveyance motor 9, in the direction Y by a quantity corresponding to the recorded width of one scanning in the direction Y or a quantity smaller than the printed width in a case of the multi-scanning operation. The aforesaid timing is so arranged that one reciprocation of the carriage 1 is made to be the basic cycle and the printing speed of the printing head is the standard of the printing timing.

When the printer P has printed the image of the size designated by the overall size ($X_{OUT}$, $Y_{OUT}$) of the image to be outputted by repeating the aforesaid operations, it stops the operations of the motor driver, the head driver, and the FM controller and the like to complete the printing mode. Then, the printer P waits for an input from the host computer H and the operation/display unit 103.

Figure 25:
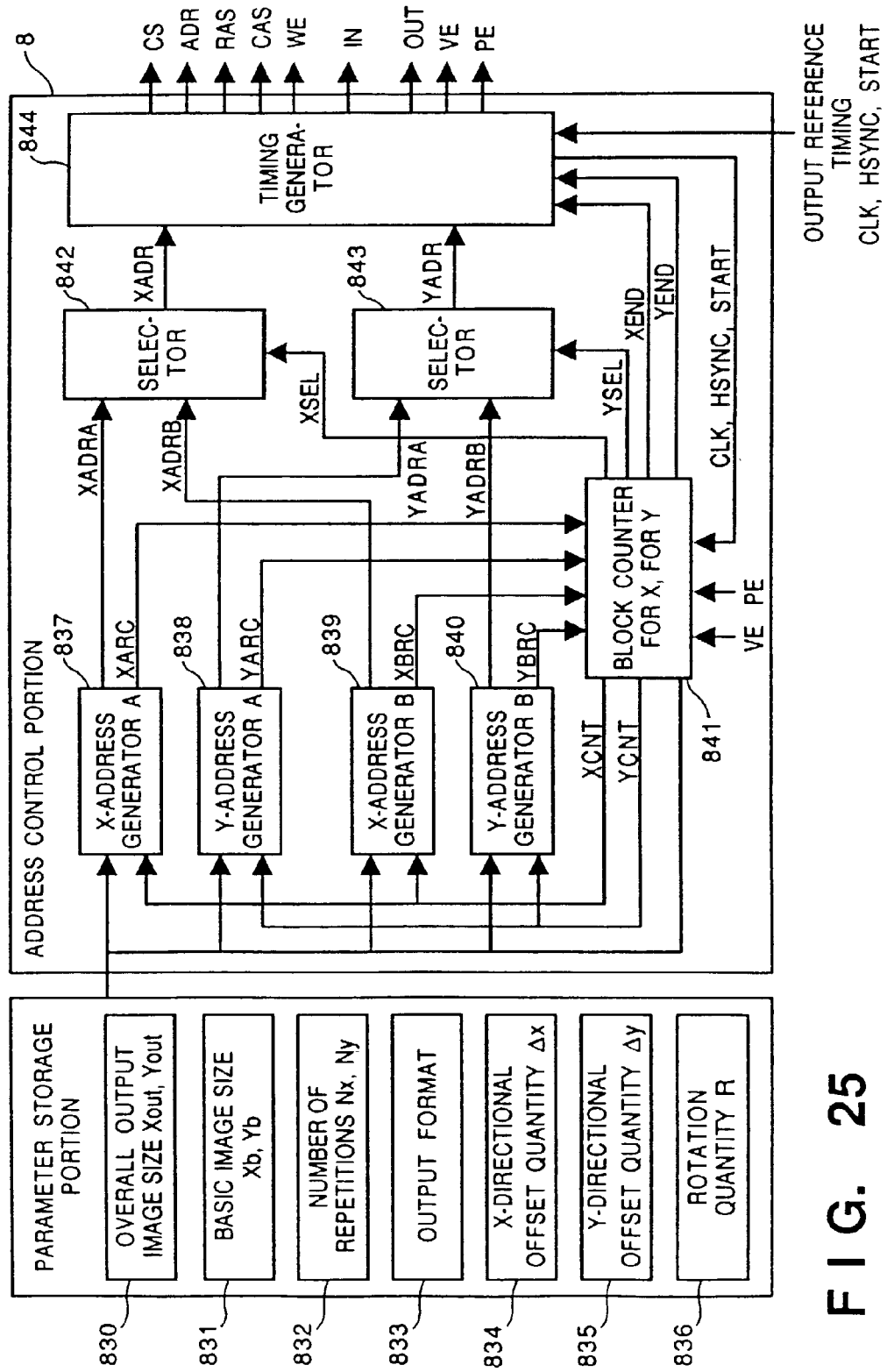
FIG. 25 is a block diagram which illustrates an example of the structure of a parameter storage portion and an address control portion.

FIG. 25 is a block diagram which illustrates an example of the internal structure of the parameter storage portion and the address control portion according to this embodiment.

Referring to FIG. 25, reference numerals 830 to 836 respectively represent storage portions such as registers in the parameter storage portion. The register 830 stores the overall size ($X_{OUT}$, $Y_{OUT}$) of the output image, the register 831 stores the basic image size ($X_b$, $X_b$), the register 832 stores the number of repetitions of outputs of the basic image in the directions X and Y ($N_x$, $N_y$), the register 833 stores the type of the output, the register 834 stores the X-directional offset quantity $\Delta x$, the register 835 stores the Y-directional offset quantity $\Delta y$ and the register 836 stores the rotation quantity R.

Here, $N_x$=INT ($X_{OUT}/X_B$) $N_y$=INT ($Y_{OUT}/X_b$), where INT (a) means an operation in which, if numeral a is a decimal, the tenth's position of the decimal a is deleted and the unit position raised to the next higher value, for example, INT (1.2)=2.

The aforesaid registers are connected to the corresponding portions of the address control portion in accordance with the output format of the received image data (specifically, they are used as the reference values of comparators to be described later).

Referring to FIG. 25, reference numeral 837 represents an X-address generator A for counting the X-directional address (XADRA) of the basic image 300. Reference numeral 838 represents a Y-address generator for counting the Y-directional address (YADRA) of the basic image 300. Reference numerals 839 and 840 respectively represent an X-address generator B and a Y-address generator B for counting the X-directional address (XADRB) and the Y-directional address (YADRB) of the basic image 300 shifted in the direction X or Y likely the aforesaid image output types 2 and 3 (see FIGS. 24B and 24C). Each of the address generators 837 to 840 is composed of a counter for actually outputting the address and a comparator for performing a comparison to determine whether or not the address exceeds the size of the basic image or the size of the overall output image.

Reference numeral 841 represents a block counter for counting the number of repetitions of the basic image 300 in the directions X and Y, the block counter 841 comprising a counter and a comparator. Reference numeral 842 represents a selector for selecting the X-directional address (XADRA) or the X-address (XADRB) shifted in the direction X. Reference numeral 843 represents another selector for selecting the Y-directional address (YADRA) or the Y-address (YADRB) shifted in the direction Y. Reference numeral 844 represents a timing generator for transmitting various reading signals (CS, ADR, RAS, CAS, WE and the like) for reading the image memory 505 and a variety of timing signals (IN, OUT, VE, PE and the like) in accordance with the address (XADR) and address (YADR) supplied from the selectors 842 and 843.

The image memory 505 according to this embodiment is constituted by using one or more D-RAM (Dynamic RAM) on the market. In the reading signals for reading the image memory 505, signal CS represents a chip select signal for selecting the module, ADR represents a signal for, in terms of time, allocating the line address (YADR) and the column address (XADR), RAS represents a line address strobe signal, CAS represents a column address strobe signal, and WE represents a write-enable signal. The timing of each of the aforesaid signals is shown in FIG. 26 in detail.

Figure 26:
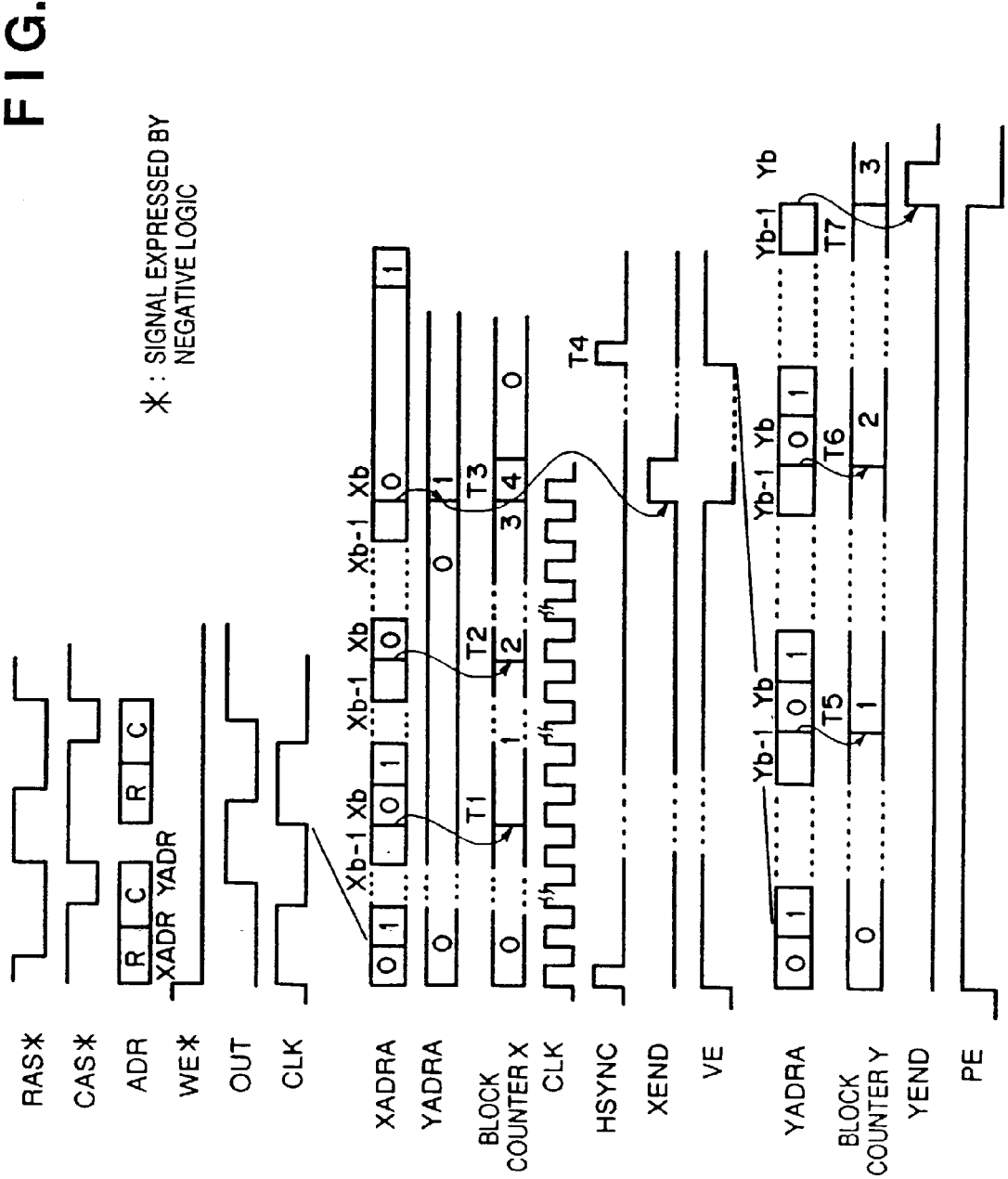
FIG. 26 is a timing chart which illustrates output timing of each signal in a memory control portion when an image output (type 1) is made by the printer according to the embodiment of the present invention.
Figure 27:
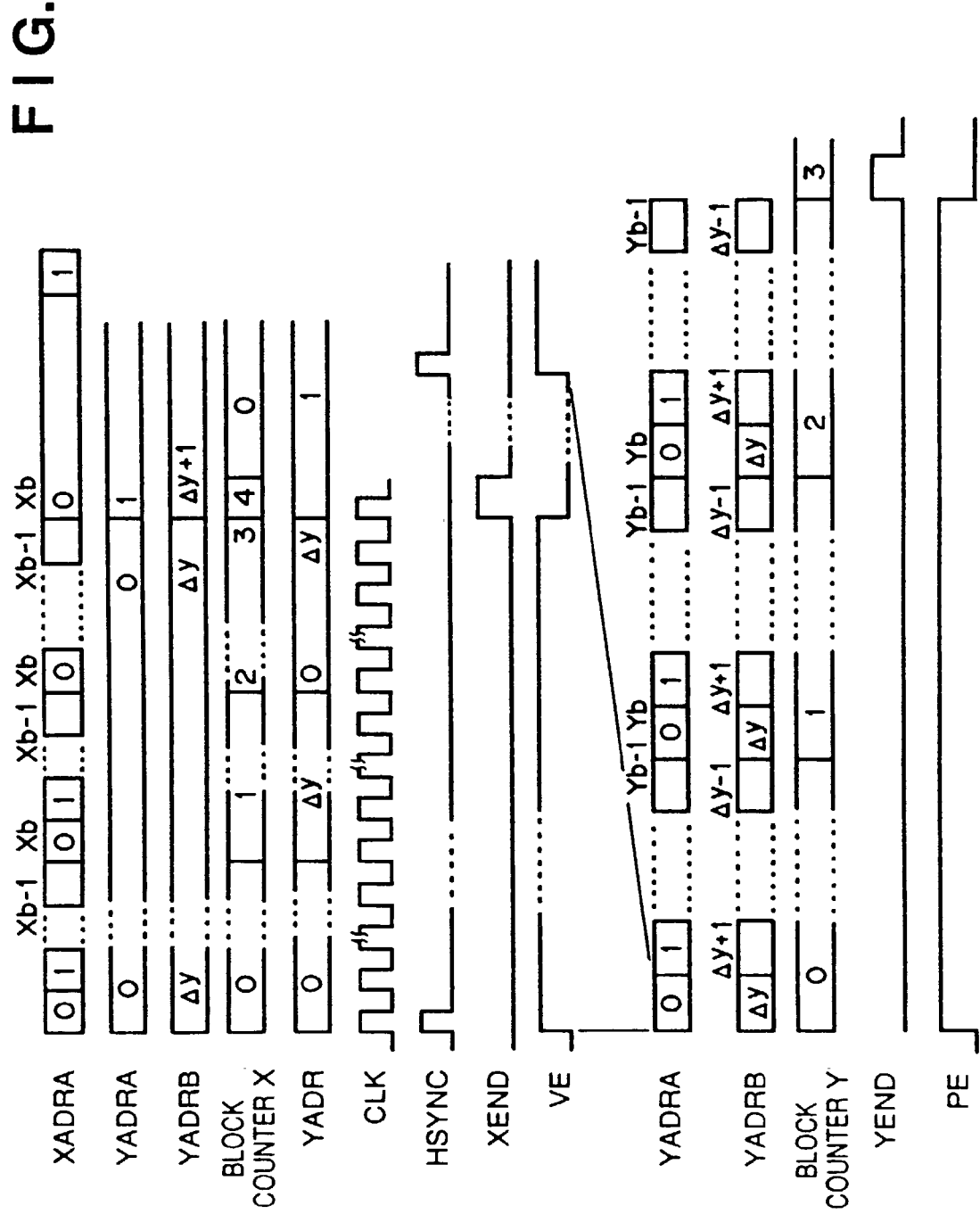
FIG. 27 is a timing chart which illustrates output timing of each signal in a memory control portion when an image output (type 2) is made by the printer according to the embodiment of the present invention.

As for the aforesaid timing signals, IN represents a latch timing signal for a latch circuit for temporarily holding the input image data, OUT represents a latch timing signal for a latch circuit for temporarily holding the output image data, VE represents a video enable signal for indicating an effective image data for each raster, and PE represents a page enable signal for indicating an effective raster of one page (see FIGS. 26 and 27).

The operations of the sections of the address control portion 8 to be performed when an image of type shown in FIG. 24A is transmitted will now be described with reference to FIG. 26.

When start of the printing operation is designated from the host computer H or the operation/display unit 103, the CPU 102A transmits signal START to the address control portion 8 to clear both of an X-address generator 837 and a Y-address generator 838 (both (XADRA) and (YADRA) are made to be "0"). Furthermore, the CPU 102A enables the address generators 837 and 838 to be operated and also enables the timing generator 844 and the block counter 841 to be operated.

When START signal of the level of signal START of the output reference timing signal 500 (including image output clock CLK, raster synchronizing signal HSYNC, start signal START and the like) has been raised (enable) and horizontal synchronizing signal HSYNC rises, the timing generator 44 raises (enables) the levels of signals VE and PE as shown in FIG. 26. As shown in FIG. 26, the signals RAS, CAS, ADR, WE and OUT are transmitted to the image memory 505 in synchronization with clock CLK during a period in which both the levels of signals VE and HSYNC are high. As a result, image data is read from the image memory 505. By controlling the read address of the image memory 505 during a period in which the levels of both signals VE and PE are high, a reading position and an output position of the image data are determined.

The address control operation to be performed by the address control portion 8 will now be described.

The output from the X-address generator 837 is cleared to "0" when the level of horizontal synchronizing signal HSYNC is raised, and the count of the output (XADRA) is increased one by one in synchronization with the transition of CLK. When the value of the XADRA reaches "$X_b$" (the X-directional length of the basic image), the X-address generator 837 transmits a ripple carry signal (XARC) to the block counter 41 to clear its output address (XADRA) to "0" (timing T1 to T3 shown in FIG. 26). That is, carry signal (XARC) is the result of the comparison made by a comparator (omitted from illustration) between the size "$X_b$" of the basic image stored by the basic image size register 831 and the output value of the counter for counting CLK.

During the aforesaid operation, the block counter 841 transmits high level selection signals XSEL and YSEL to cause the selector 842 to select the address signal (XADRA) transmitted from the X-address generator 837 and the selector 843 to select the address signal (YADRA) transmitted from the Y-address generator 838. When the carry signal (XARC) supplied from the X-address generator 837 is received, the X-directional block count X is increased by one. When the count X becomes the same as the X-directional repetition times Nx (timing T3), signal YCNT is transmitted to increase the count of the Y-address generator 838 by one and signal XEND is made to be 1 (enabled) in order to notify the completion of the output of the image data for one raster in the direction X.

During this, the timing generator 844 generates address signal ADR for the image memory 505 and chip select signal CS in accordance with the address signal (XADR) supplied from the selector 842 and the address signal (YADR) supplied from the selector 843, and transmits signals RAS, CAS, WE, ADR, CS and OUT to the image memory 505 in synchronization with the output reference timing signal 500. As a result, image data is read out. When signal XEDN supplied from the block counter 841 becomes "1", the level of signal VE is lowered (disabled) (timing T3) and the output of the aforesaid signal is interrupted to temporarily stop reading the image data from the image memory 505. When the level of signal VE is lowered, the counting operations of the X-address generator 837, the Y-address generator 838 and the block counter 841 are stopped.

When horizontal synchronizing signal HSYNC which is the leading portion of the raster has been first-transmitted, the aforesaid operation is repeated. As a result, the count of the Y-address generator 838 is successively increased. After the raster printing process is thus performed and the value of the Y-address (YADRA) transmitted from the Y-address generator 838 coincides with the Y-directional length "Yb" of the basic image (timing T5 to T7), the carry signal (YARC) supplied from the Y-address generator 838 is transmitted to the block counter 841 and signal (YADRA) is cleared to "0".

When the block counter 841 receives the carry signal (YARC) supplied from the Y-address generator 838, the block counter 41 increases the block count Y in the direction Y by one, and examines whether or not the increased value coincides with the repetition times $N_y$. If they coincide with each other, the block counter 841 raises (enables) the level of signal YEND for notifying the completion of the Y-direction reading operation (timing T7). When signal YEND has become 1, the timing generator 844 lowers the levels of signals VE and PE and interrupts the signal output. Thus, the operation of reading the image data for one unit of the cloth is completed. When the level of signal PE has been lowered, the counting operations of the X-address generator 837, the Y-address generator 838 and the block counter 841 are stopped.

The aforesaid repetitions time NY may be transmitted from the computer H together with the command, or may be calculated in step MS13 (see FIG. 2), or may be set by using the operation/display unit 103.

The operation to be performed by the address control portion 8 when the image of type 2 shown in FIG. 24B is outputted will now be described with reference to a timing chart shown in FIG. 27.

Although the basic operation shown in the timing chart is the same as that to be performed when the image of type 1 shown in FIG. 26 is outputted, the difference lies in that the operation of the Y-address generator 840 is made effective and the selection process performed by the selector 843.

Specifically, the difference lies in that the block counter 841 changes over the level of the selection signal YSEL to the selector 843 in synchronization with the block count of the block counter 841 in the direction X. As a result, the signal (YADRA) supplied from the Y-address generator 838 and the signal (YADRB) supplied from the Y-address generator 840 are changed over to switch the Y-address YADR for each block.

Furthermore, the Y-address generator 840 is not cleared to "0" at the transition of horizontal synchronizing signal HSYNC, but the Y-directional offset quantity Δy is loaded to the Y-address generator 840 at the timing. The Y-address generator 840 compares the Y-directional length "$Y_b$" of the basic image with the output (YADRB) of the Y-address generator 840. When (YADRB) has become the same as "$Y_b$", the Y-address generator 840 is cleared to "0". At this time, carry signal YBRC is not transmitted, and the block counter 841 increases the count of the block counter Y in response to the carry signal (YARC) supplied from the X-address generator 837.

The timing of the aforesaid operations is shown in FIG. 27 in detail. For example, when a portion of the basic image 300 shown in FIG. 24B for first scanning operation is printed, the Y-address (YADR) to be supplied to the timing generator 844 is "0" because the output (YADRA) of the Y-address generator 838 is selected. When the portion for the first operation of scanning the right image region (offset portion) is printed afterwards, the output (YADRB) from the Y-address generator 840 is selected and it is set to "Δy". Similarly, the Y-address (YADR) is returned to "0" at the time of printing the third image region (no offset). The YADR again becomes "Δy" for printing the next offset region.

At the time of the second scanning operation for printing the aforesaid image regions, the output (YADRA) of the Y-address generator 838 is selected and the Y-address (YADR) becomes "1" in the no-offset image region. In the offset region, the output (YADRB) from the Y-address generator 840 is selected and the Y-address (YADR) becomes "Δy+1".

Since the output (YADRB) from the Y-address generator 840 becomes the same as the basic image size "$Y_b$" after the line 301 shown in FIG. 24B has been outputted, the Y-address is cleared to "0".

As contrasted with type 2 which is the Y-directional offset, the type 3 in this embodiment is the X-directional offset. Therefore, the output from the Y-address generator 838 or that form the Y-address generator 840 is selected at the time of printing type 2 to form the Y-address (YADR). The operation of printing type 3 must perform a control in such a manner that the selector 842 selects the output from the X-address generator 837 or that from the X-address generator 839 to transmit it as X-address (XADR).

Specifically, the block counter 841 changes over the level of selection signal XSEL to the selector 842 in synchronization with the Y-count value of the block counter 841. As a result, the address (XADRA) transmitted from the X-address generator 837 or the address (XADRB) transmitted from the X-address generator 839 is changed over for each block to transmit it as (XADR) to the timing generator 844. The X-address generator 839 is not cleared to "0" at the first transition of HSYNC, but offset quantity "Δx" in the direction X is loaded at the timing. The X-address generator 839 compares the X-directional width "$X_b$" of the basic image with the output (XADRB). If (XADRB) exceeds "$X_b$", the ripple carry (XBRC) is not transmitted, but the X-address generator 839 is cleared to "0". The block counter 841 increases the count of the block counter X in response to the carry (XARC) supplied from the X-address generator 837.

If the ratio of the horizontal and longitudinal lengths "$X_b$" and "$Y_b$" of the basic image is an integer, a geometrically beautiful image of type 4 or 5 can be formed resulting a practical effect. If a relationship $X_b=Y_b$ (the basic image is in the form of a square), a beautiful configuration can be realized. Furthermore, the structure can be relatively easily constituted, and XADR and YADR can be exchanged, and the counting direction (upward/downward counting) of the address generators 837 to 840 can be controlled in accordance with the rotation quantity R.

If the basic image is rotated, a portion for the rotation process can be inserted in a pipe line manner as well as performing the address control. By forming and storing an image obtained by rotating the basic image by an angular degree of 90° by a quantity for the basic image before the image data is transmitted, image data including the rotated image can be easily transmitted at high speed.

Although the block counter 841 counts the blocks of the basic image to cause the overall image size ($X_{OUT}$, $Y_{OUT}$) to be transmitted, the present invention is not limited to this. If $X_{OUT}$ and $Y_{OUT}$ respectively are not multiples of $X_b$ and $Y_b$, $X_{OUT}$ and $Y_{OUT}$ cannot be defined only by counting the number of blocks. Accordingly, the following equation is employed: Remainder pixels $Xr=X_{OUT}-N_x \times X_b$ where $N_x$=INT $(X_{OUT}/X_b)-1$ to make a comparison between the repetition times $N_x$, and a comparison the remainder pixels Xr with "0". As a result, whether or not the number of printed pixels has reached $X_{OUT}$ can be discriminated. The aforesaid operation is similarly applied to the direction Y.

If the printing speed with the printing head is slow and the image output clock is slow, the aforesaid address formats may be realized by a software process. In particular, a portion of the structure shown in FIG. 25 may be replaced by the software while making a portion of the memory to be a counter by using software.

Although this embodiment has the arrangement that the arrangement of the image data to be transmitted to the printing head is formed into the raster format and the change of the image data configuration depending upon the printing head is performed by the raster @ BJ conversion controller 506 (see FIG. 17), the present invention is not limited to this. The configuration of the image data stored by the image memory 505 and that of the image data to be transmitted to the printing head may be the same. If they are different from each other, the alignment to the configuration of the printing heads may be performed in a case of the output to the head driver.

Figure 28:
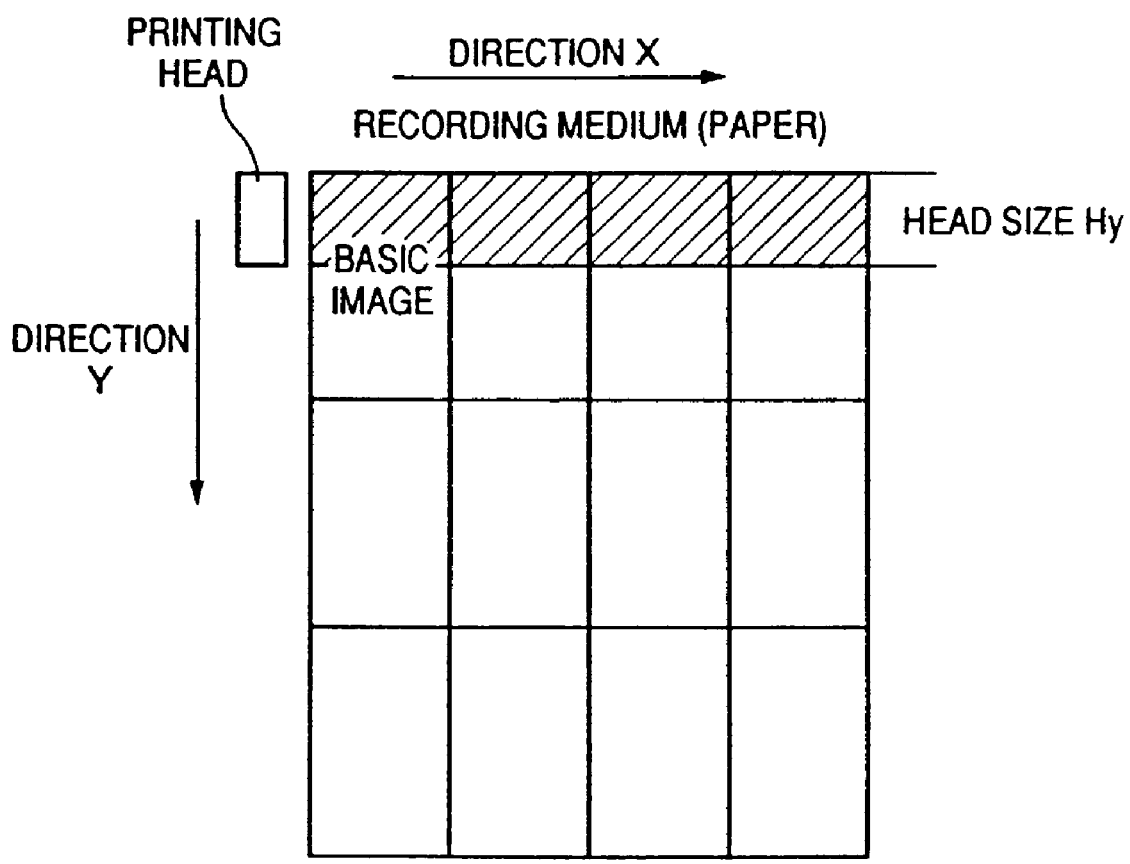
FIG. 28 illustrates an example of an image output made by the printer according to the embodiment of the present invention.

The printer P according to this embodiment has a mechanical arrangement that the printing head covering the printing area having the Y-directional width Hy is scanned in the direction X as shown in FIG. 28.

In the aforesaid case, the Y-address generators 838 and 840 in the direction Y of the address control portion 8 of the FM controller 504 may be constituted by a two stage structure composed of a counter (and a comparator) for counting by a quantity of Hy and a counter (and a comparator) for counting the ripple carry.

Furthermore, the image having a width of Hy in the direction Y and in units (called a "band unit") of $X_{OUT}$ in the direction X can be read and outputted. In this case, the upper digit counter of the Y-address generator 838 and the Y-address generator 840 in the direction Y may be omitted and they may be constituted only by lower digit counters (counters for Hy). Specifically, the CPU 102A may load the Y-direction defining address (the Y-address of image data at the leading portion of the band unit to be then printed) to the Hy counter whenever the image is outputted in units of bands, and the count increasing operation may be started at the position.

(3.4) Loading Down Conversion Data and Parameter

Figure 29:
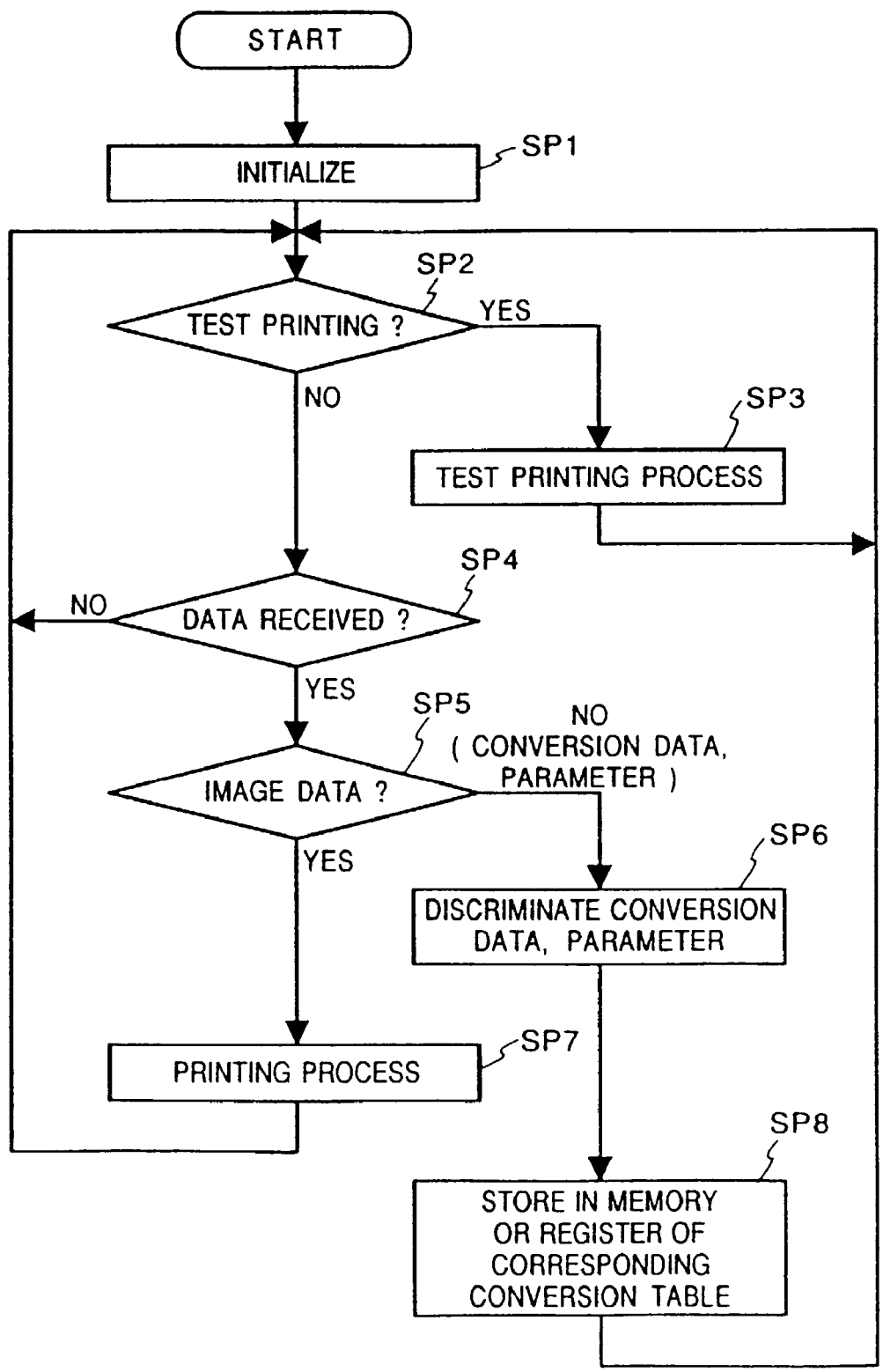
FIG. 29 is a flow chart which illustrates an example of a process for setting conversion data and a parameter to each memory and each register shown in FIG. 18.

The apparatus according to this embodiment performs the operation in accordance with the flow chart shown in FIG. 29 in order to load down the conversion data into the conversion table via each conversion controller or for storing various parameters set by the host computer H or the operation/display unit 103 into the corresponding register. The operation will now be described. The program for performing the aforesaid operation is stored in the ROM 102B included by the control board 102 and is executed by the CPU 102A.

When power is supplied to the system according to this embodiment, the printer P is initialized in step SP1. In this initializing process, the conversion tables 509, 511 and 513 corresponding to the printing colors are also initialized.

In next step SP2, a discrimination is made as to whether or not a designation to perform a test printing operation has been supplied from the host computer H or the operation/display unit 103. If the test printing is designated, the test printing operation is performed in step SP3. In this case, selection signals are transmitted to cause the selector 519 to select data supplied from the binary PG controller 517 as described in FIG. 29, before the printing operation is performed.

If no test printing is designated from the host computer H or the operation/display unit 103, the flow proceeds to step SP4 in which a discrimination is made as to whether or not data has been received via the GPIB interface 501 and the receipt of data is waited for. If data has been received, the flow proceeds to step SP4, it is determined whether or not the received data is the image data or conversion table data or parameter. The discrimination as to whether or not the image data is made by interpreting the control command positioned at the leading position of the received image data. If the received data is the data for the conversion table or the parameter, identifying data is added to indicate the printing color, the conversion table and the control to be performed by using the supplied data.

If a discrimination is made that the received data is the image data, the flow proceeds to step SP7 in which the printing process according to the indicated image quality is executed.

If a discrimination is made that the received data is the data for the conversion table or the parameter, the flow proceeds to step SP6 in which the control command is interpreted to discriminate the recording color, the conversion table and the parameter. In step SP8, the received data is stored in the conversion table of the register via the corresponding conversion controller or the CPU in accordance with the result of the discrimination.

Figure 30:
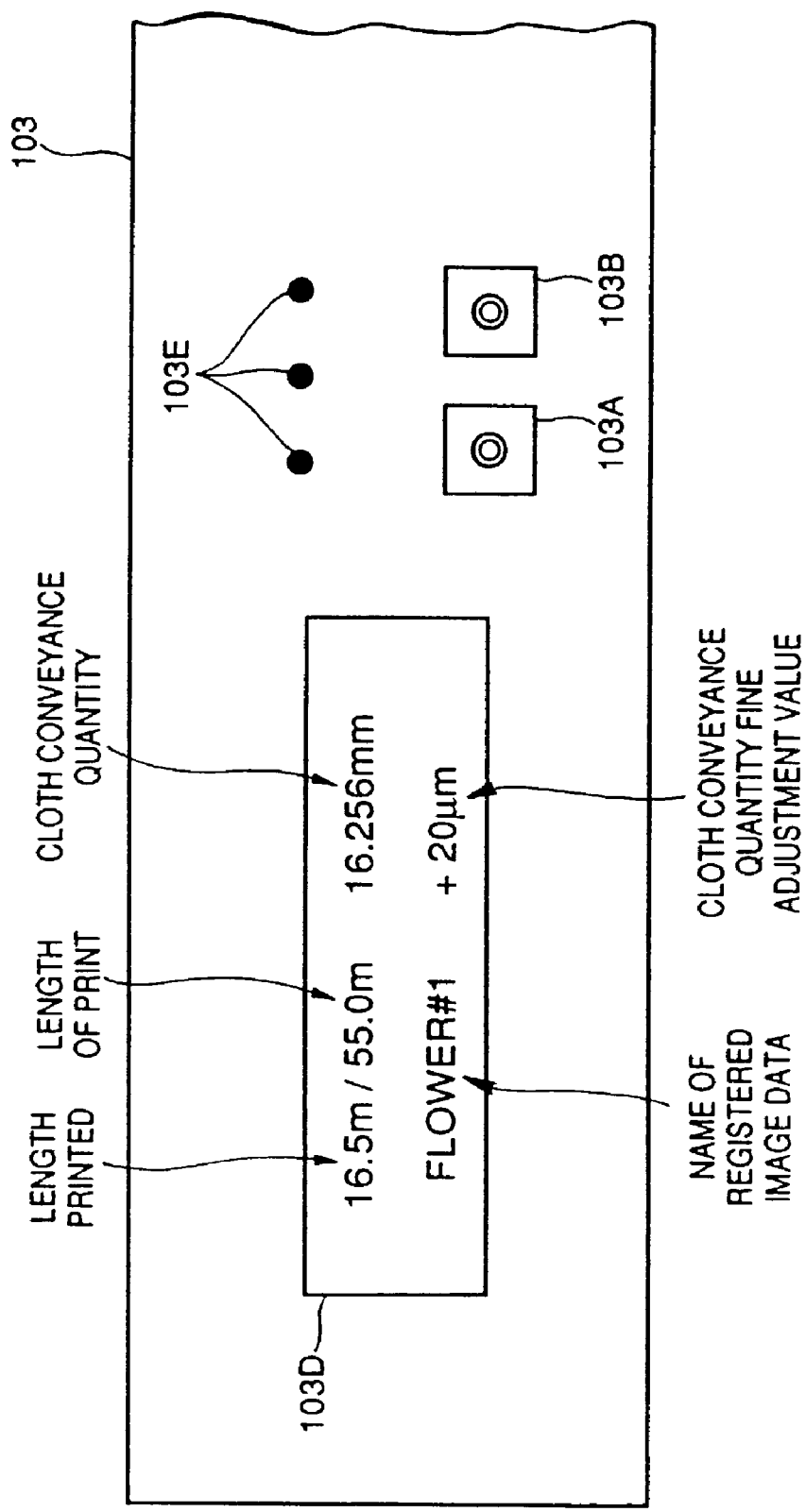
FIG. 30 is a plan view which illustrates an example of the structure of an essential portion of an operation/display unit of the printer.

Information and so forth set by the host computer H or the operation/display unit 103 may be displayed on the display of the operation/display unit 103. FIG. 30 illustrates an example of the display thus made. As shown in FIG. 30, a display 103D displays the length of the printed portion of the cloth 6, the overall length of the cloth 6 and the quantity of feeding. A variety of parameters and a mode set by using the host computer H or the operation button of the operation/display unit 103 may, of course, be displayed. Referring to FIG. 30, reference numeral 103E represents a variety of error lamps. Reference numerals 103A and 103B respectively represent a stop button and an emergency stop button, each of which is used to select either a stop mode in which the printing image is continuous or a stop mode in which the printing image is not continuous.

(4) Other examples of Structure

The aforesaid embodiment has the arrangement that the host computer H supplies image data formed in the color pallet data to the printer P, and the printer P performs the printing operation by using colors C, M, Y, BK and special colors S1 to S4 in accordance with color data converted by using the color pallet conversion table. Another example will now be described in which the host computer H supplies image data as R, G and B brightness data to the printer P.

Although this embodiment has a substantially similar arrangement as that of the aforesaid system, the image memory 505 shown in FIG. 17 does not store the image data formed in the pallet data, but image data expressed by R, G and B brightness data. That is, the structure shown in FIG. 18 is replaced by that shown in FIG. 31.

Figure 31:
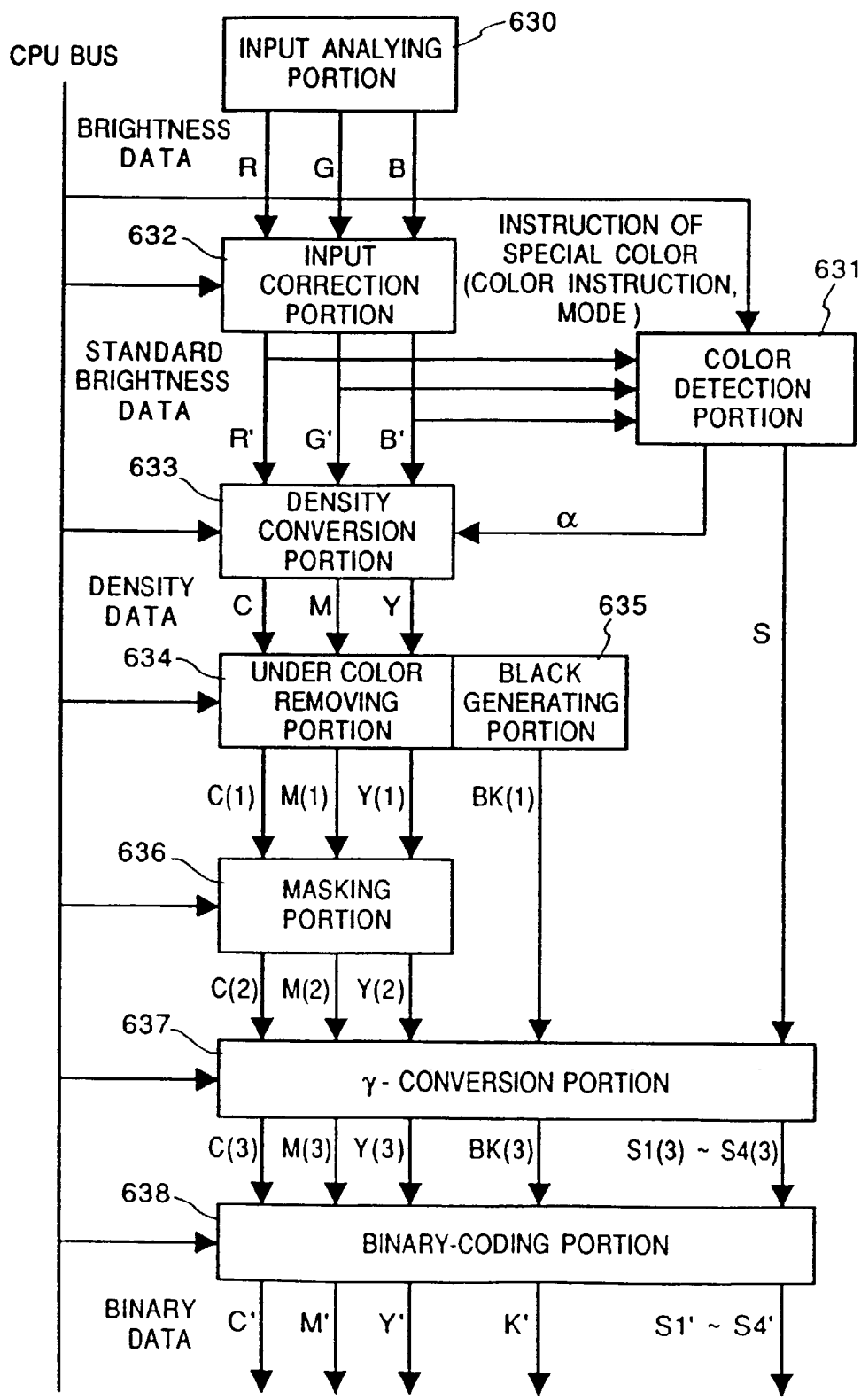
FIG. 31 is a block diagram which illustrates an example of the structure of an essential portion of the control board shown in FIG. 15 while highlighting the flow of data.

FIG. 31 illustrates an image processing portion for converting R, G and B signals into C, M, Y and BK signals or generating special color signals S1 to S4.

This embodiment has an arrangement that the host computer H transmits color image data as R, G and B signals to the printer P. The printer P receives image data R, G and B via the interface. The CPU 102A arranges the timing of each of the image processing portion, the printing head driver 24, the motor driver 23 and the like disposed on the control board 102 to control the aforesaid sections. As a result, cyan C, magenta M, yellow Y, black BK and, if selected, special colors S1 to S4 ink is emitted to the cloth 6. Therefore, a color image is formed and outputted.

Referring to FIG. 31, an input correction portion 632 converts the image data (brightness data) R, G and B supplied from the image memory 505 through the controllers 504, 506 and 507 into standard brightness data R', G' and B' (for example, R, G and B of the NTSC method for color TV) while taking the spectral characteristics and the dynamic range of the supplied image into consideration. A density conversion portion 633 converts the standard brightness data R', G' and B' into density data C, M and Y by means of a nonlinear conversion such as the logarithmic conversion. A under-color removing portion 634 and a black generating portion 635 perform the under color removal and the black generation from density data C, M and Y, the UCR quantity $\beta$ and the ink quantity $\sigma$ in accordance with the following equation:

$$C(1)=C-\beta \times \mathrm{MIN}(C,M,Y)$$

$$M(1)=M-\beta \times \mathrm{MIN}(C,M,Y)$$

$$Y(1)=Y-\beta \times \mathrm{MIN}(C,M,Y)$$

$$K(1)=\sigma \times \mathrm{MIN}(C,M,Y)$$

Then, a masking portion 636 corrects the unnecessary absorption characteristics of the ink of C (1), M (1) and Y (1) from which the under color has been removed in accordance with the following equation:

$$C(2)=A11 \times C(1)+A12 \times M(1)+A13 \times Y(1)$$

$$M(2)=A21 \times C(1)+A22 \times M(1)+A23 \times Y(1)$$

$$Y(2)=A31 \times C(1)+A32 \times M(1)+A33 \times Y(1)$$

where Aij (ij=1 to 3) is a masking coefficient.

Then, a $\gamma$-conversion portion 637 converts C (2), M (2), Y (2) and BK (1) into C (3), M (3), Y (3) and Bk (3) each of which has been subjected to the output $\gamma$ adjustment (the image density printed with ink corresponding to each of the signals C (3), M (3), Y (3) and BK (3) is corrected to be linear).

The printing head according to this embodiment is a binary printing means provided with two states composed of a state in which ink is emitted and a state in which ink is not emitted. Therefore, the binary-coding portion 638 binary-codes the multi-value data C (3), M (3), Y (3) and Bk (3) into C', M', Y' and BK' to each form pseudo gradation. Then, the result of the conversion is transmitted to a circuit shown in FIG. 19.

Furthermore, this embodiment has a color detection portion 631 for generating an instruction to perform printing after a predetermined R, G and B range (R', G' and B' supplied from the input correction portion 632) on a chromaticity diagram has been replaced by special colors S1 to S4 in accordance with the special color designation issued by the CPU 102A. The instruction is supplied to the $\gamma$-conversion portion 637 as signal S. The $\gamma$-conversion portion 637 outputs proper special color signals S1 (3) to S4 (3), which are then binary-coded by a binary-coding portion 638 to generate signals S1' to S4'.

Figure 32:
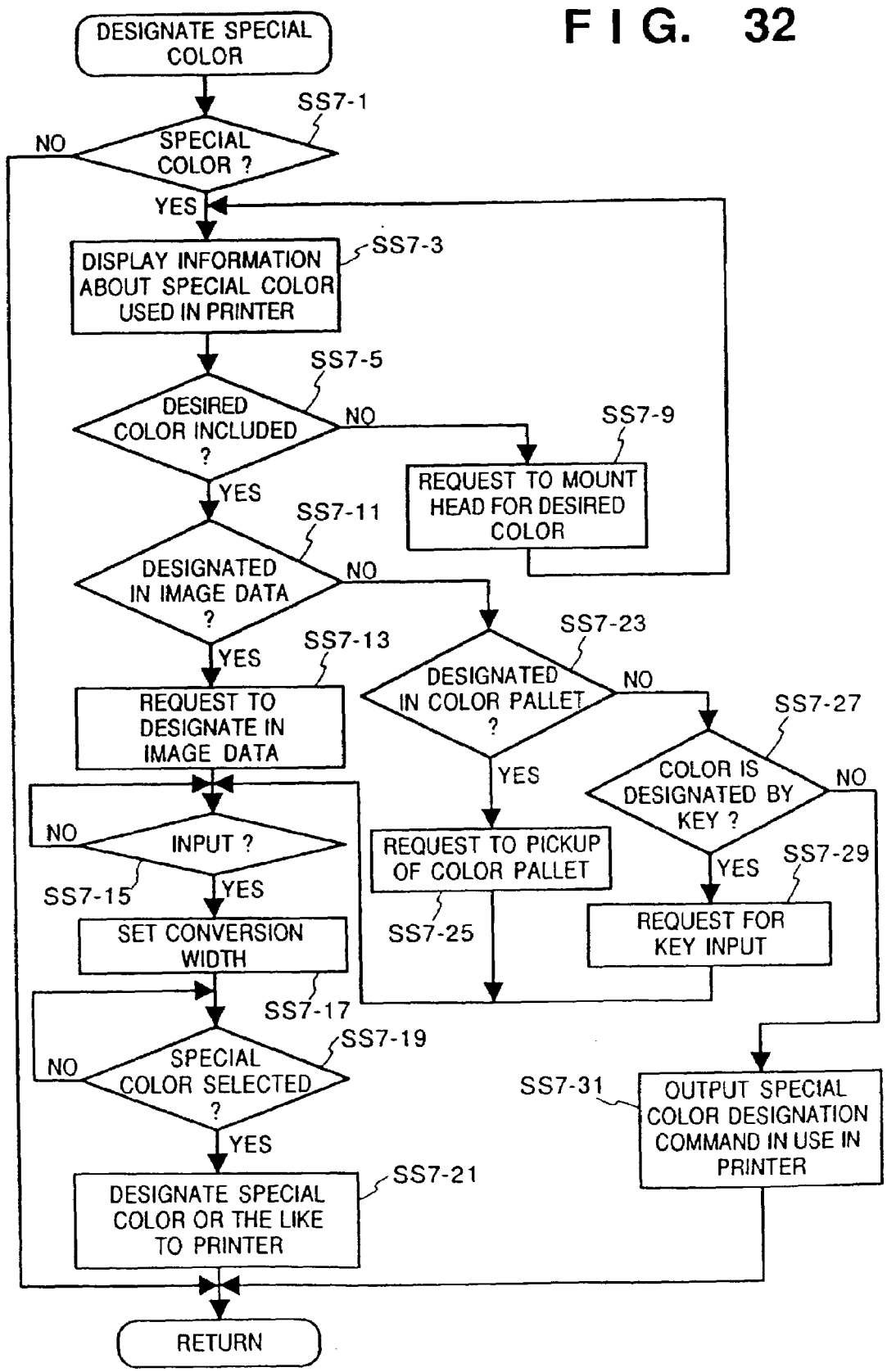
FIG. 32 is a flow chart which illustrates an example of a special color designation process in the host computer to the printer shown in FIG. 31.

FIG. 32 illustrates an example of a special color designation process to be performed by the host computer H. The process according to this embodiment is, in principle, arranged in such a manner that a desired chromaticity range for the colors R, G and B is specified, and a desired range on the chromaticity diagram is determined, and the color included in the aforesaid range is replaced by a desired special color.

Also in this process, the processes in steps SS7-1 to SS7-7 shown in FIG. 4 are previously performed. If a desired color printing head is provided, a discrimination is made in step SS7-11 as to whether or not the color in the original image data displayed on the CRT 1026 is directly specified. If an affirmative discrimination has been made, the designation is inputted in step SS7-13. The process proceeds to step SS7-15, it is determined that the designation has been inputted. Then if the designation has been inputted, designation of the conversion width for each of the colors R, G and B into the special colors is waited for in step SS7-17. At the time of the designation, the minimum conversion width and maximum conversion width for each of the colors R, G and B are designated. In next step SS7-19, a desired special color is selected. If the special colors S1 to S4 are selected, they can be designated by using the figures assigned to the special colors S1 to S4.

When the conversion width and the special color have been designated, a designation to the printer P is performed in step SS7-21. The following command formats may be used to follow the first command <WCOLOR>:

"<Rmin>,<Rmax>,<Gmin>,<Gmax>,<Bmin>,<Bmax> and <byte>"

The commands mean that the special colors designated by "<byte>" are used for the data in the range of the chromaticity diagram defined by the following relationship:

Rmin≦R≦Rmax,Gmin<G<Gmax, and Bmin<B<Bmax

If a negative discrimination has been made in step SS7-11, the flow proceeds to step SS7-23 in which a discrimination is made as to whether or not colors relating to the conversion are designated using a color sample table on a CRT screen employed by a computer having a color graphic function. If an affirmative discrimination has been made, the color table is designated in step SS7-25. In next step SS7-15, the aforesaid operations are performed.

If a negative discrimination has been made in step SS7-23, the flow proceeds to step SS7-27 in which a discrimination is made as to whether or not color information relating to the conversion is designated by using a key. If an affirmative discrimination has been made, the input using key is requested, and the flow proceeds to step SS7-15. If a negative discrimination has been made in SS7-27, it is determined that the special colors which are being used by the printer P are used as it is, and the process is completed here.

Figure 33:
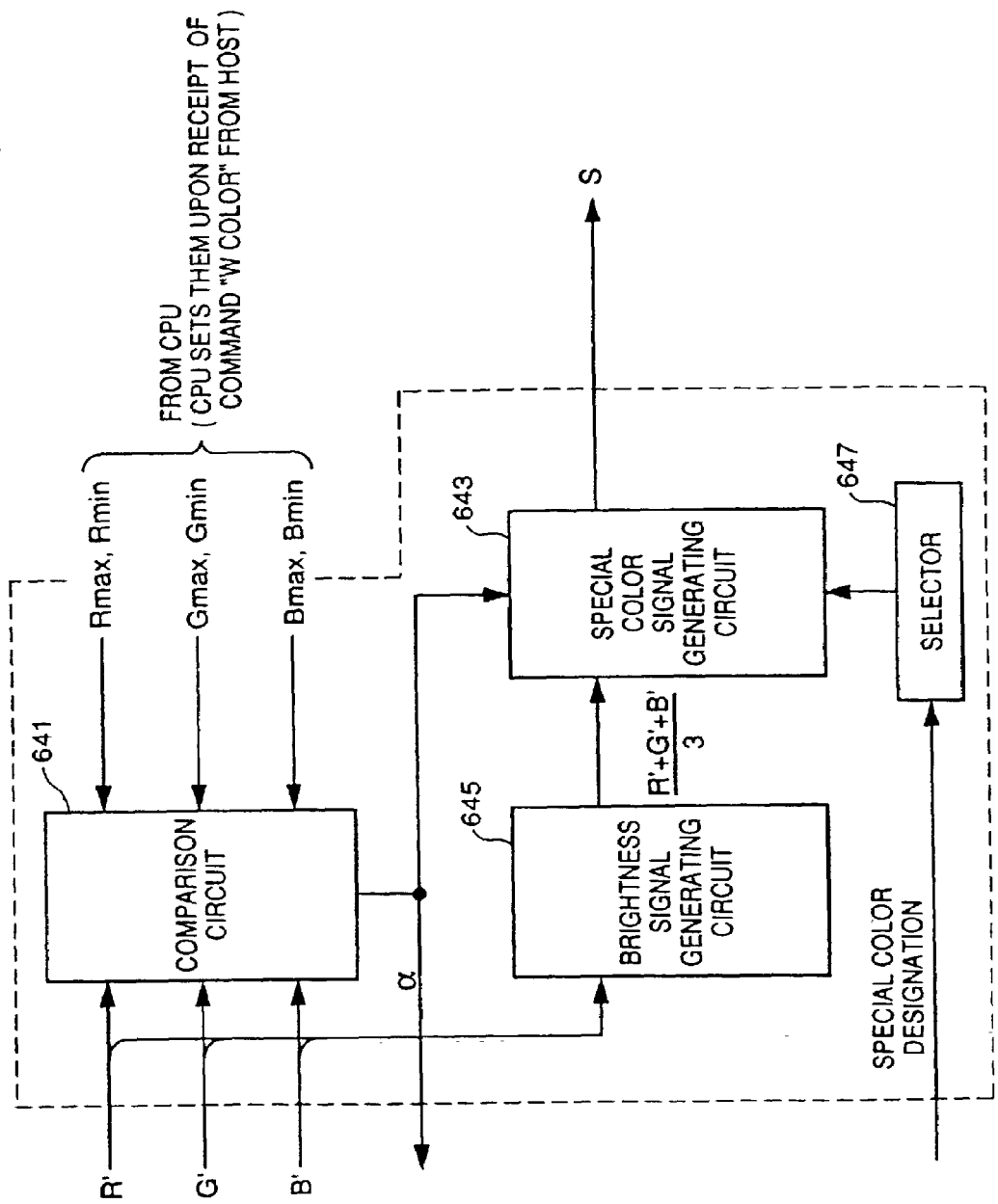
FIG. 33 is a block diagram which illustrates an example of the structure of the color detection unit shown in FIG. 31 and adapted to perform the special color designation process.

The circuit of the color detection portion 631 of the printer P to perform the process designated by the host computer H may have the structure shown in FIG. 33.

Referring to FIG. 33, the data to be transmitted by the host computer H is, by the CPU 102A, set to a comparison circuit 641 which can be constituted by a register and a comparator and the like. When the comparison circuit 641 has received signals R', G' and B' from the input correction portion 632, it compares the signals R', G' and B' with various values which have been previously set. Then, the comparison circuit 641 transmits signal a which is brought to "0" if the result of the comparison is included in a designated range and which is brought to "1" if the result is not included by the designated range. The signal α is supplied to a density conversion portion 633 and a special color generating circuit 643. The density conversion portion 633 does not generate C, M and Y signals with respect to the subject R', G' and B' if α=0.

The R', G' and B' signals are also supplied to a brightness signal generating circuit 645. The brightness signal generating circuit 645 calculates, for example, (R'+G'+B')/3 and transmits the result of the calculation to the special color signal generating circuit 643 to cause the circuit 643 to generate color data of the density to be reproduced satisfactorily even in the range to be replaced to the special colors. A selector 647 is changed over by the CPU 102A in accordance with data designated with the aforesaid command <byte> and designates to the special color signal generating circuit 643 to use the special colors. Therefore, the special color signal generating circuit 643 generates data S for the special color designated by the selector 647 at a density corresponding to the brightness signal supplied from the brightness signal generating circuit 645 when α supplied from the comparison circuit 641 is "0".

If mixing of the special colors and C, M and Y is desired, the data of <byte> according to this embodiment is increased and the comparison circuit 641 generates data for determining the mixture ratio in a range from α=0 with which use of only the special colors is designated to α=1 with which only C, M and Y are used.

Figure 34:
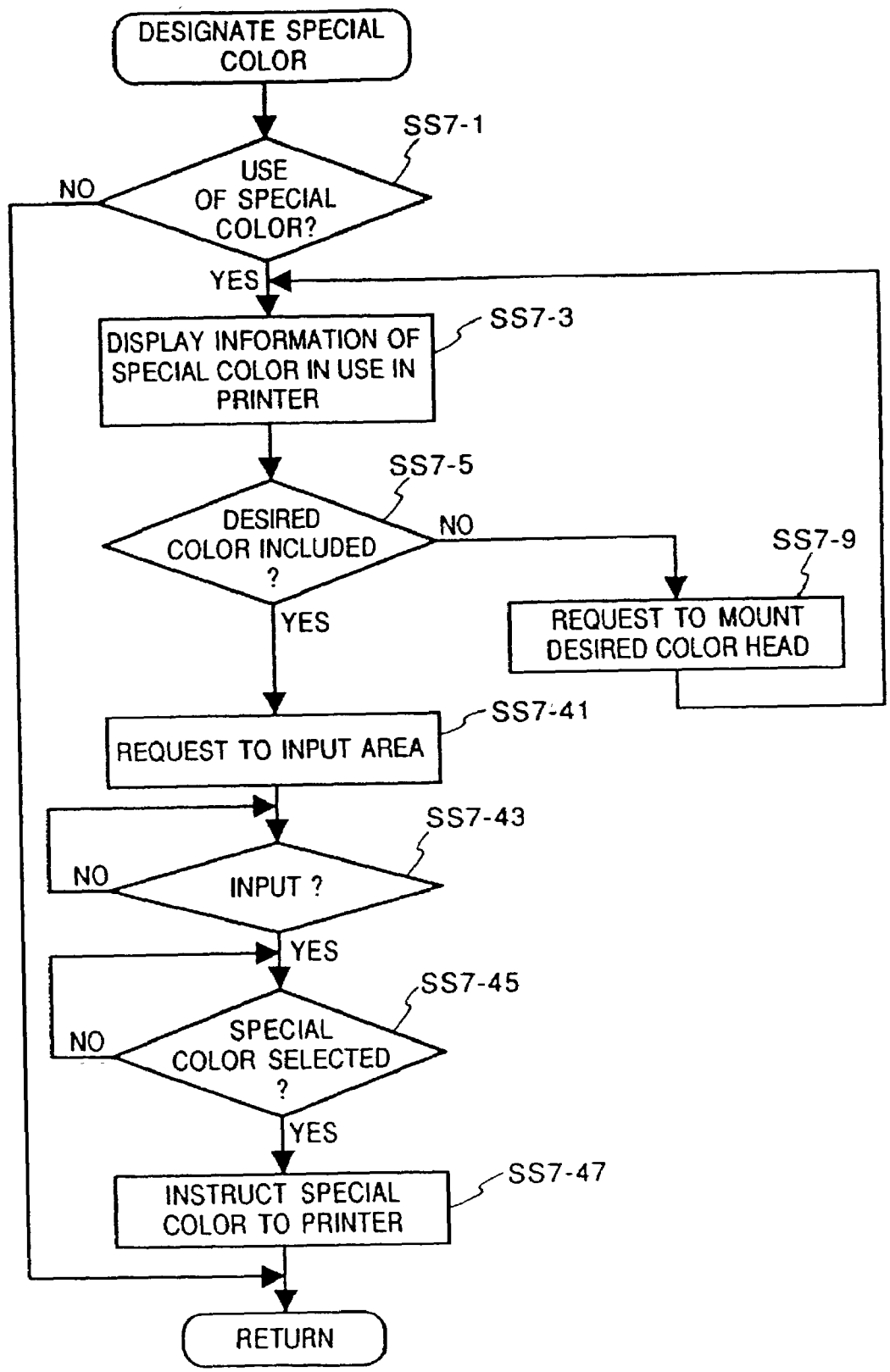
FIG. 34 is a flow chart which illustrates another example of the special color designation process.

FIG. 34 illustrates another example of the special color designation process to be performed by the host computer H. This process has an arrangement that a specific area on the original image data is designated to print the range in a desired special color.

Also this process has an arrangement that the operations in steps SS7-1 to SS7-7 are performed previously. When the printing head of the desired special color is installed, input of the coordinate data indicating a desired area on the original image is requested in step SS7-41. If the input has been confirmed in step SS7-43, the special color is selected in step SS7-45. In step SS7-47, the desired area data and the special color designation data are notified to the printer P. The command format may be arranged in such a manner that, following an identifying code <WAREA>, the following commands in terms of the X and Y coordinates may be used if the desired area is in the form of a triangle:

"<$X_1$>,<$Y_1$>,<$X_2$>, <$Y_2$>, <$X_3$>,<Y3> and <byte>"

where "<byte>" is special color designation data similarly to the aforesaid example.

Figure 35:
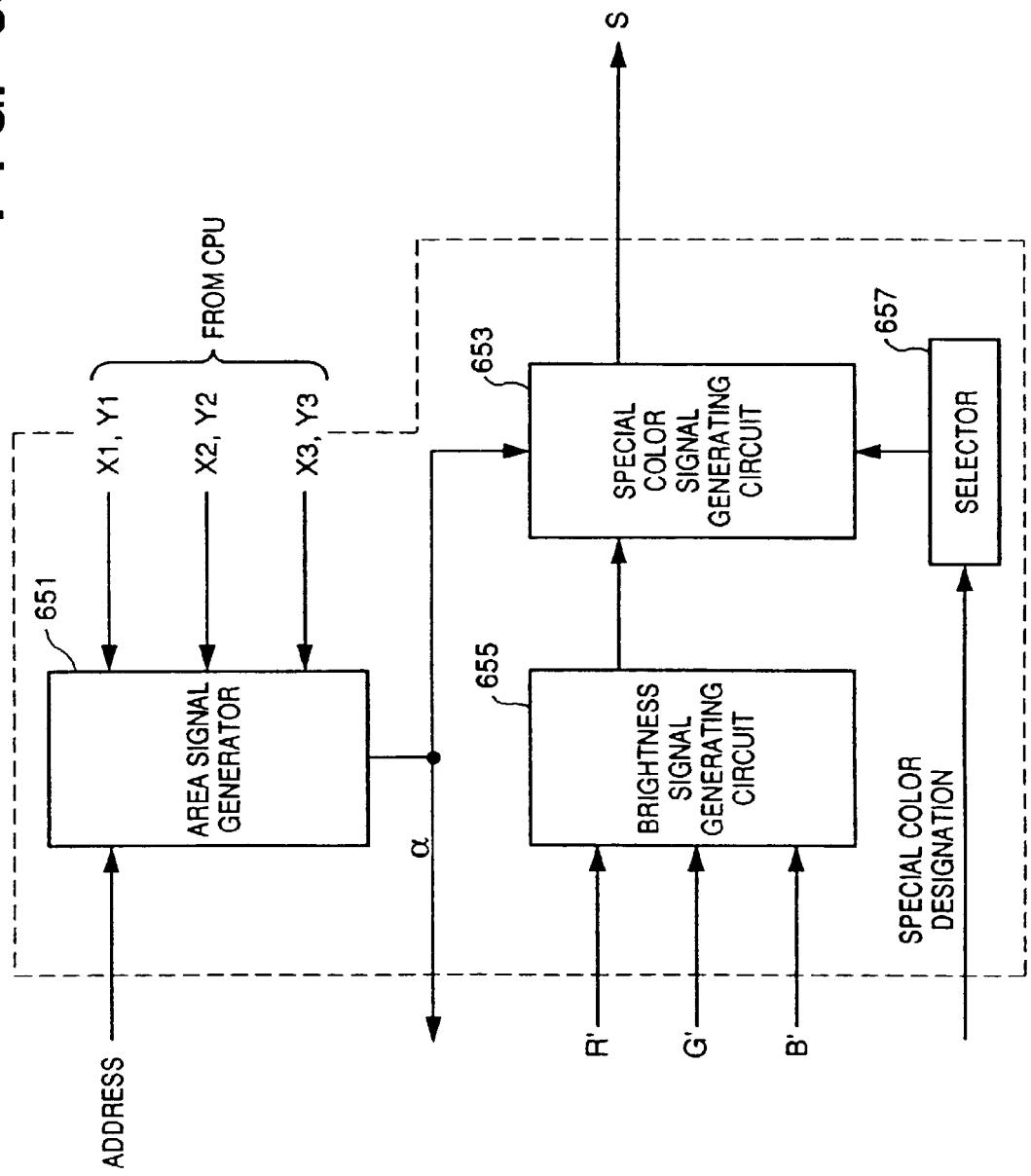
FIG. 35 is a block diagram which illustrates an example of the structure of a region detection unit disposed in place of the color detection unit shown in FIG. 31 for performing the special color designating process.

The processing circuit in the printer P to perform the aforesaid process may comprise the color detection portion 631 shown in FIG. 31 as a region detection portion and the region detection portion may be the structure shown in FIG. 35.

Referring to FIG. 35, data about the desired region transmitted from the host computer H is set to an area signal generator 651 which can be constituted by a register and a comparator and the like. When the area signal generator 651 receives the image address through the CPU bus, the imaged address is compared with a variety of values which have been previously set. The area signal generator 651 generates signal a which becomes "0" if the address is included in designated range and becomes "1" if the address is not included by the range. The signal α is supplied to the density conversion portion 633 and the special color signal generating circuit 643. The density conversion portion 633 does not generate signals C, M and Y if α=0. The area signal generator 651 may be arranged to generate data for determining the mixture ratio of C, M and Y and the special color.

The structures of the special color generating circuit 653, the brightness signal generating circuit 655 and the selector 657 may be same as those of the portions 643, 645 and 647 shown in FIG. 33. The special color signal generating circuit 653 generates special color data S designated by the selector 657 at a density corresponding to the brightness signal supplied from the brightness signal generating circuit 655 when signal a transmitted by the area signal generator 651 is "0".

The special color designating processes respectively described with reference to FIGS. 4, 32 and 34 be arranged in such a manner than any one of the processes is started to be adaptable to the structure of the printer P, that is, in accordance with information represented by the printer P. As an alternative to this, if the printer has a circuit capable of corresponding to any process, any one of the processes may be started in accordance with the desire of the operator.

In each of the aforesaid embodiments, the term "special color" is meant metal color, clear red, green blue, violet, and orange and the like which cannot be reproduced or which cannot easily be reproduced by Y, M and C which are ordinarily employed by a color printer, and the aforesaid colors are expressed by using exclusive heads. The special color according to the present invention may be a color which causes a large quantity of the recording agent to be used in a mixture to be enlarged and which is used to restrict the required quantity because the color is frequently used though the color can be reproduced or can be easily reproduced by mixing Y, M and C and the like.

Furthermore, the special color may be a color which can be expressed by mixing Y, M or C and the special color, or by mixing the special colors.

Although the process for accurately reproducing the color selected by the designer is performed by generating the color pallet data in the embodiments shown in FIGS. 9 and 10, an arrangement may be employed in which R, G and B signals are transmitted with which satisfactory color reproduction can be performed by the correction shown in FIG. 9 or the selection shown in FIG. 10 in the case where the brightness signals of R, G and B are transmitted by the host computer H to the printer P.

(5) Others

The image output apparatus (printer) according to the present invention is not limited to the ink jet printing method and it may employ a variety of printing methods. If the ink jet printing method is employed, an excellent effect to be obtained from a printing head or a printing apparatus of a type comprising a means (such as an electrothermal conversion member or a laser beam emitter) for generating heat energy as the energy to be used to emit ink and adapted to a method for causing the state change of ink to occur by the heat energy. The aforesaid method enables high density and precise images to be recorded.

As for the typical structure and the principle, it is preferable that the basic structure disclosed in, for example, U.S. Pat. No. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which nucleate boiling takes place are applied to the electricity-to-heat converter so as to generate heat energy in the electricity-to-heat converter and to cause the heat effecting surface of the printing head to effect film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsiveness. It is preferable that a pulse drive signal disclosed in U.S. Pat. No. 4,463,359 or 4,345,262 is employed. If conditions disclosed in U.S. Pat. No. 4,313,124 which is an invention relating to the temperature rising ratio at the heat effecting surface are employed, a satisfactory recording result can be obtained.

As an alternative to the structure (linear fluid passage or perpendicular fluid passage) of the printing head disclosed in each of the aforesaid inventions and having an arrangement that discharge ports, fluid passages and electricity-to-heat converters are combined, a structure having an arrangement that the heat effecting surface is disposed in a bent region and disclosed in U.S. Pat. No. 4,558,333 or 4,459,600 may be employed. In addition, the following structures may be employed: a structure having an arrangement that a common slit is formed to serve as a discharge section of a plurality of electricity-to-heat converters and disclosed in Japanese Patent Laid-Open No. 59-123670; and a structure disclosed in Japanese Patent Laid-Open No. 59-138461 in which an opening for absorbing pressure waves of heat energy is disposed to correspond to the discharge section. That is, recording can be assuredly and effectively performed according to the present invention regardless of the type of the printing head.

The present invention may be effectively adapted to a full-line type printing head having a length capable of covering the width of the largest recording medium which can be recorded by the recording apparatus. As the printing head of the aforesaid type, a structure enabled to have the length by combining a plurality of printing heads or a structure having a sole integrated printing head and disclosed in any of the aforesaid specifications may be employed.

Furthermore, the present invention may be effectively adapted to the aforesaid serial type printing head, a chip type printing head which can be electrically connected to the body of the apparatus or to which ink can be supplied from the body of the apparatus when it is fastened to the body of the apparatus may be employed and a cartridge printing head having an ink tank integrally formed with the printing head may be employed.

It is preferred to additionally employ the printing head restoring means and the auxiliary means provided as the component of the present invention because the effect of the present invention can be further stabilized. Specifically, it is preferable to employ a printing head capping means, a cleaning means, a pressurizing or suction means, an electricity-to-heat converter, another heating element or a sub-heating means constituted by combining them and a sub-discharge mode in which a discharge is performed independently from the recording discharge in order to stably perform the recording operation.

Although a fluid ink is employed in each of the aforesaid embodiments of the present invention, ink which is solidified at the room temperature or lower as well as softened at the room temperature, or ink in the form of a fluid at the room temperature, fluid at the room temperature, or ink which is formed into a fluid when the recording signal is supplied may be employed because the aforesaid ink jet recording method is ordinarily arranged in such a manner that the temperature of ink is controlled in a range from 30° C. or higher and 70° C. or lower so as to make the viscosity of the ink to be included in a stable discharge range.

Furthermore, ink of the following types can be adapted to the present invention: ink which is liquified when heat energy is supplied in response to the recording signal so as to be discharged in the form of fluid ink, the aforesaid ink being exemplified by ink, the temperature rise of which due to supply of the heat energy is positively prevented by utilizing the temperature rise as energy of state change from the solid state to the liquid state; and ink which is solidified when it is allowed to stand for the purpose of preventing the ink evaporation. Furthermore, ink which is first liquified when supplied with heat energy may be adapted to the present invention. In the aforesaid case, the ink may be of a type which is held as fluid or solid material in a recess of a porous sheet or a through hole at a position to face the electricity-to-heat converter as disclosed in Japanese Patent Laid-Open No. 54-56847 or Japanese Patent Laid-Open No. 60-71260. It is the most preferred way for the ink to be adapted to the aforesaid film boiling method.

The ink jet recording apparatus according to the present invention may be in the form of a copying apparatus combined with a reader or the like, or a facsimile apparatus having a transmission/receiving function as well as the apparatus for use as image output terminative equipment of the computer or the like.

The cloth for use in the ink jet printing operation must meet the following requirements:

(1) The cloth enables a satisfactory thick color to be attained from the ink.

(2) The cloth enables ink to display a high dyeing capability.

(3) The cloth enables ink to be quickly dried thereon.

(4) With the cloth, irregular bleeding of ink can be prevented satisfactorily.

(5) The cloth can be easily conveyed in the apparatus.

In order to meet the aforesaid requirements, the cloth must be subjected to a pre-treatment if necessary. For example, U.S. Pat. No. 4,725,849 has disclosed cloths of a type having an ink receiving layer. Japanese Patent Publication No. 3-46589 has disclosed cloths of a type containing a reduction inhibitor or an alkali substance. The pre-treatment is exemplified by a process in which the cloth contains a substance selected from a group consisting of an alkali substance, a water soluble polymer, a synthetic polymer, water soluble metal salt, and urea and thiourea.

The alkali substance is exemplified by alkali hydroxide metal such as sodium hydroxide and potassium hydroxide; amines such as mono, di- and triethanol amine; carbonic or bicarbonic alkali metal such as sodium carbonate, potassium carbonate, and sodium bicarbonate; ammonia; and ammonia compound. Furthermore, trichloroacetic sodium may be employed with steaming and under dry condition. As the alkali substance, it is preferable to employ sodium carbonate or sodium bicarbonate for use in a reactive dye drying method.

The water soluble polymer is exemplified by starch such as corn and wheat flour; cellulose such as carboxymethyl cellulose, methylcellulose, and hydroxyethyl cellulose; polysaccharide such as sodium alginate, gum arabic, sweet bean gum, tragacanth gum, gua-gum, and tamarind seed; protein such as gelatin and casein; and natural water-soluble polymer such as tannin, and lignin.

The synthetic polymer is exemplified by polyvinyl alcohol compound, polyethylene oxide compound, acrylic acid type water soluble polymer, and maleic anhydride type water soluble polymer. It is preferable that a polysaccharide polymer or cellulose type polymer is employed.

The water-soluble metal salt is exemplified by a compound such as a halide of alkali metal and alkali earth metal which forms a typical ion crystal and having a pH value of 4 to 10. The alkali metal is exemplified by NaCl, $Na_2SO_4$, KCl and $CH_3COONa$, and the alkali earth metal is exemplified by $CaCl_2$ and $MgCl_2$. It is preferable to employ a salt of Na, K or Ca.

There is no particular limit in a method of causing the aforesaid substance to be contained by the cloth, the method being exemplified by a dipping method, a vat method, a coating method and a spraying method.

Since ink to be printed on the ink jet printing cloth simply adheres to the cloth when it is supplied to the same, it is preferable to be subjected to an ensuing reaction fixing process (a dyeing method) in which the dye is fixed to the fiber. The reaction fixing process may be a known method exemplified by a steaming method, a HT steaming method, and a thermofixing method. If a cloth which is not previously subjected to the alkali process is used, an alkali pad steam method, an alkali blotch steam method, an alkali shock method or an alkali cold fixing method is employed.

The substances for use to remove the un-reacted dye and in the pre-treatment can be removed by a known cleaning method after the aforesaid reaction fixing process has been completed. It is preferable that the conventional fixing process is performed when the aforesaid cleaning process is performed.

Second Embodiment

A second embodiment of the present invention will now be described in detail with reference to the drawings.

Figure 36:
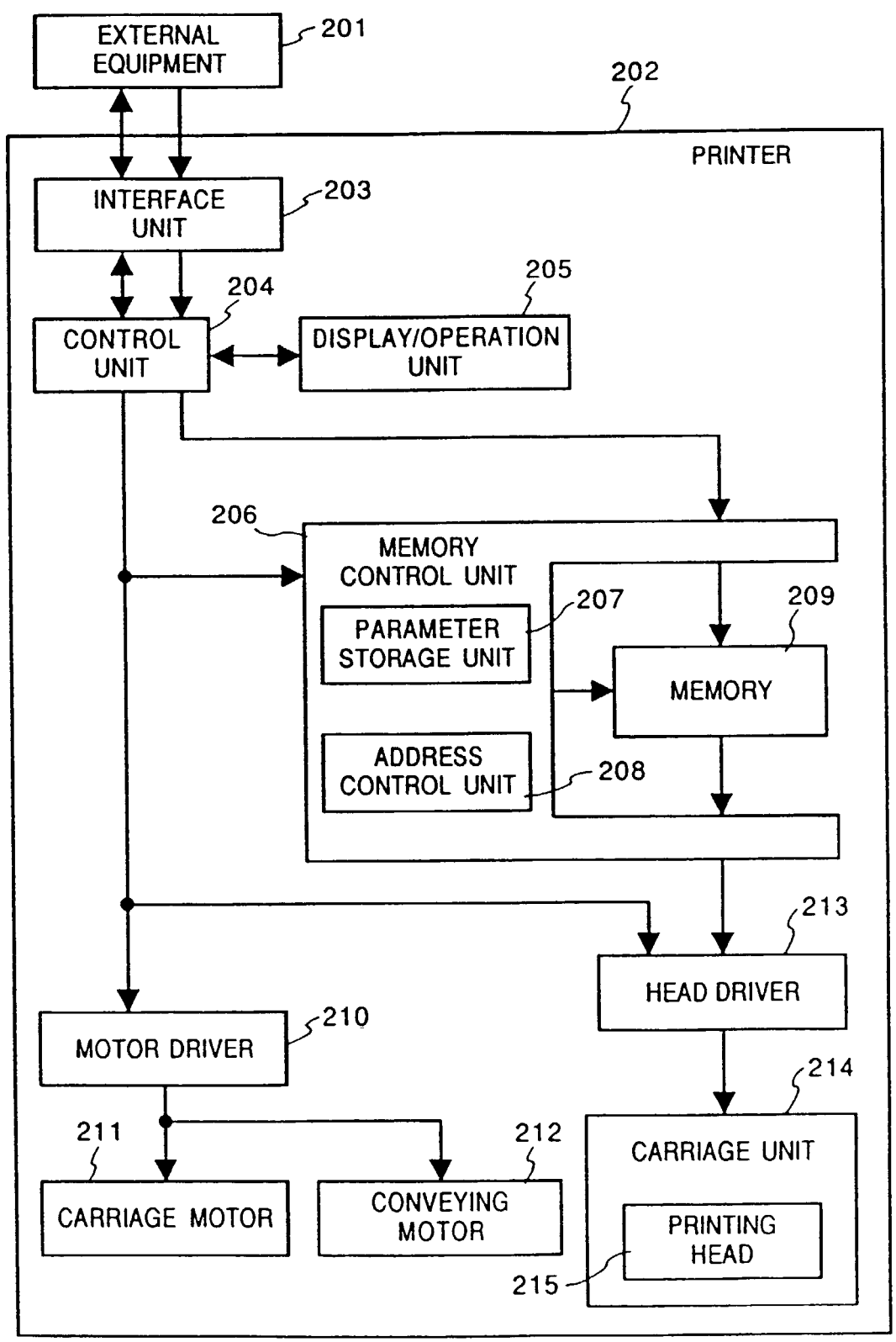
FIG. 36 is a block diagram which illustrates the essentially structure of a printer apparatus according to a second embodiment of the present invention.

FIG. 36 is a block diagram which illustrates an essential and basic structure of a printer which is an embodiment of the image output apparatus according to the present invention.

Referring to FIG. 36, reference numeral 201 represents external equipment such as a host computer for transmitting image data and various commands and the like to a printer 202 according to this embodiment. The printer 202 mainly comprises an interface unit 203 for controlling communication of data and command and the like with the external equipment 201; a control unit 204 (mainly constituted by a CPU, a ROM for a program, a RAM for working, and peripheral equipment such as I/O port) for totally controlling the operation of the printer 202; a display/control unit 205 (including a display unit such as LCD and an operation unit such as a key switch) for establishing an interface with an operator; a memory 209 (including a semiconductor memory such as a D-RAM and an S-RAM) for storing image data; a memory control unit 206 (including a parameter storage unit 207 for storing a parameter form the display/control unit 205 and an address control unit 208 for generating reading and writing address of a memory 209) for controlling reading/writing operation to and from the memory 209; a motor driver 210 for controlling the rotation of various motors; a carriage motor 211 serving as a power source for moving a carriage unit 214; a conveyance motor 212 serving as a power source for moving a recording medium 228 such as paper; a printing head 215 for emitting recording ink; and a head driver 213 for operating the printing head 215 in response to an image signal.

Figure 37:
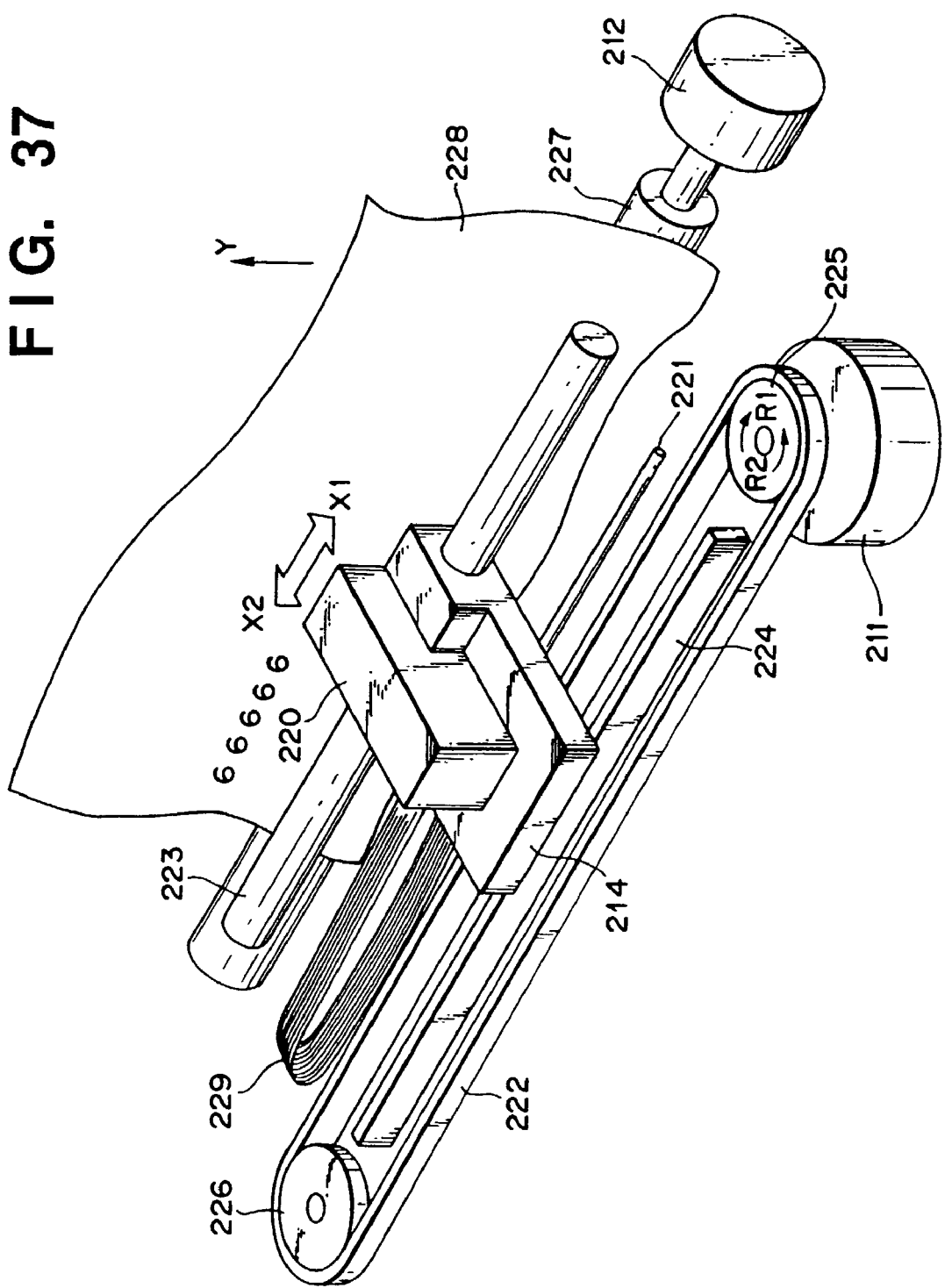
FIG. 37 is a perspective view which illustrates an essential portion of the structure of the recording unit of the printer according to the second embodiment.

FIG. 37 is a perspective view which illustrates the recording portion of the printer 202 according to this embodiment.

A carriage unit 214 detachably has a cartridge 202 including the printing head 215 and is reciprocated in directions designated by arrows X1 (to the right) and X2 (to the left) when the carriage motor 211 is rotated. The carriage unit 214 is supported and its sliding direction (X1 and X2) is restricted by a columnar carriage shaft 223 and a carriage supporting frame 224. The carriage motor 211 is rotated forwards/reversely in directions designated by arrows R1 and R2 to move the carriage unit 214 in the two directions. A timing belt 222 is arranged between two pulleys 225 and 226 and its portion is fixed to the carriage unit 214. Since the pulley 225 of the two pulleys 225 and 226 is fastened to the rotational shaft of the carriage motor 211, the carriage unit 214 is conveyed when the carriage motor 211 is rotated.

Reference numeral 221 represents an encoder for detecting the position of the carriage unit 214. A sensor for the encoder 221 (omitted from illustration) included by the carriage unit 214 reads the encoder 221, so that the current position of the carriage unit 214 can be detected. A home position (hereinafter called a "HP") at which the carriage unit 214 waits is disposed at a terminative end in the direction X2 (in the left direction). An HP sensor (omitted for illustration) is disposed adjacent to the HP, the HP sensor being composed of a sensor such as a photo-interrupter to detect whether or not the carriage unit 214 is positioned at the HP. Reference numeral 227 represents a conveyance roller for conveying paper such as a recording medium, the conveyance roller 227 being fastened to the rotational shaft of the conveyance motor 212 while being in contact with the paper 228 which is the recording medium. A cable 229 acts to transmit an image signal to the printing head 215 included by the cartridge 220 via the carriage unit 214. Furthermore, the printer 202 has an apparatus (omitted from illustration) for supplying the recording medium.

The operation of the printer 202 according to this embodiment will now be described with reference to FIGS. 36 and 37.

When power is supplied to the printer 202, the control unit 204 checks the initialization or initializes a RAM and an I/O portion (omitted from illustration), the memory control unit 206, the memory 209, the display/control unit 205, the interface unit 203 and various hardware. As a result, the mechanism portion is initialized. Specifically, the conveyance motor 212, the carriage motor 211 and a recovery motor (omitted from illustration) are operated to discharge the paper 228 stopped due to paper jamming or the like or to move the carriage unit 214 to the HP. Furthermore, a recovery mechanism (a peripheral mechanism of the printing head 215 for preventing clogging of the printing head 215) is operated to forcible discharge and suck ink.

The control unit 204 makes (enables) the interface of the interface unit 203 with the external equipment 201 to be effective and displays a message such as "READY" that the preparation of the operation has been completed on the display/operation unit 205. In this state, the control unit 204 waits for the input from the external equipment 201 and that from the display/control unit 205 and monitors generation of various errors.

When an input is made by using a key from the display/control unit 205, the control unit 204 instructs the display/operation unit 205 to form a display or to set (to store parameters in the working RAM or store the same in the parameter storage unit 207) various parameters. As a result, data input made by the operation unit is processed. When an input is made from the external equipment 201 via the interface unit 203, the control unit 204 discriminates that the input is a command or image data. If a command has been inputted, the control unit 204 sets various factors to correspond to the command. If it is the image data, the control unit 204 sets the memory control unit 206 to an input mode and instructs the input image data to be stored in the memory 209.

For example, the image data supplied from the external equipment 201 is repeatedly outputted or the overall body of the image data to be printed is outputted as it can be designated in accordance with the command supplied from the external equipment 201.

Specifically, when image data is inputted, the external equipment 201 transmits the input image size ($X_{in}$, $Y_{in}$) in the form of a command and a parameter to the printer 202. As a result, the printer 202 keeps an input region in the memory 209 and stores the input image size in the working RAM and the parameter storage area 207 of the control unit 204. When the external equipment 201 sequentially transmits image data to the printer 202, the printer 202 receives the image data to store it in the memory 209 via the memory control unit 206. When the input of the image data of a predetermined size has been completed, the external equipment 201 transmits the image data output format to the printer 202. As a result, the printer 202 stores the image output format in the working RAM and the parameter storage area 207 of the control unit 204. In this embodiment, the image output format shown in FIG. 24 is used similarly to the first embodiment.

Since the printing pattern of the basic image is the same as that according to the first embodiment, its description is omitted here. Furthermore, the internal structure of the memory control unit 206 is the same as that according to the first embodiment shown in FIG. 25.

Third Embodiment

Figure 38:
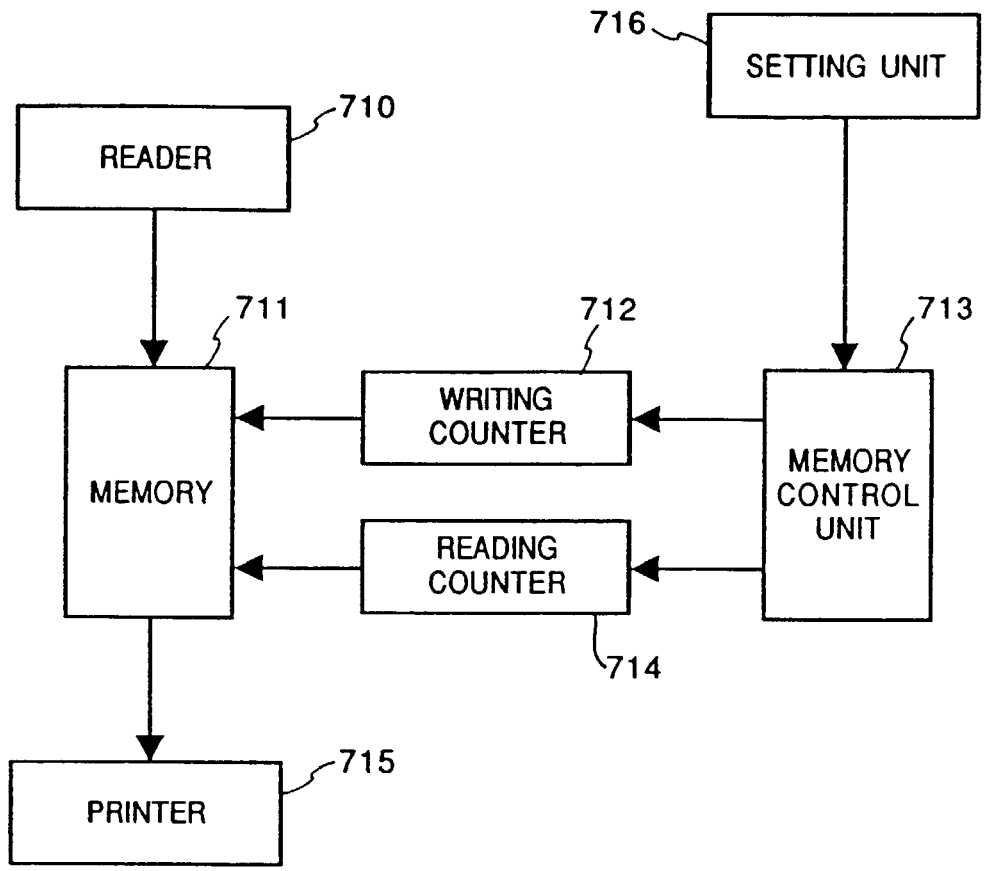
FIG. 38 is a block diagram which illustrates the schematic structure of an image forming apparatus according to a third embodiment.

FIG. 38 is a block diagram which illustrates the functional structure of an image forming apparatus according to a third embodiment. Reference numeral 710 represents a reader for reading the image of an original document and converts it into image data. Reference numeral 711 represents a memory for storing the original document image data read by the reader 710. Reference numeral 712 represents a writing counter for determining the storage address at the time of storing the image data in the memory 711. Reference numeral 713 represents a memory control unit for controlling the writing counter 712 and a reading counter 714. Reference numeral 714 represents the reading counter for determining the data reading address at the time of transmitting the image data from the memory 711 to a printer 715. Reference numeral 715 represents the printer for recording the image data read from the memory 711 on the recording medium. Reference numeral 716 represents a setting unit for instructing the image area to be image-repeated and for setting the recording position of the image to be image-repeated on the recording paper and the way of the repetition (rotation and mirror image or the like).

Figure 39:
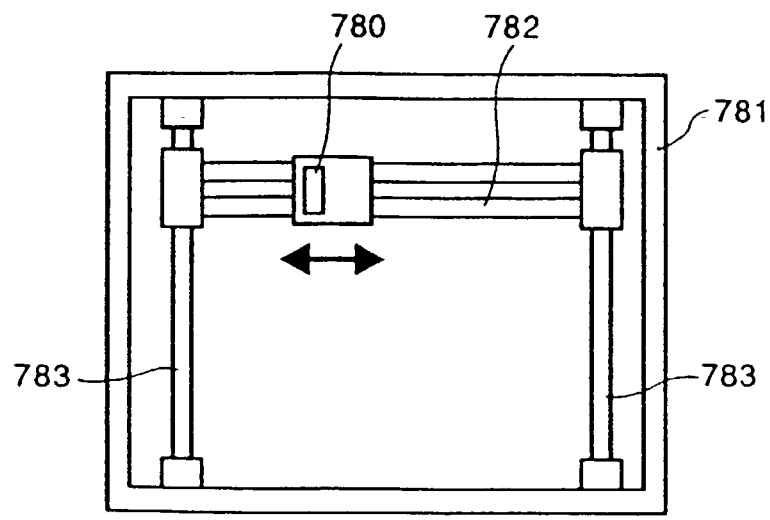
FIG. 39 illustrates a reader according to the third embodiment.

FIG. 39 schematically illustrates the structure of the reader 710 according to the present invention. Reference numeral 780 represents a CCD unit constituted by a CCD, which is a reading element, and a light source lens and the like. The CCD unit 780 scans the surface of a reader main scanning rail 782 to move on a reader sub-scanning rail by a distance for one line after it has read the original document for one line. Then, the CCD unit 780 reads the next line. By repeating the aforesaid operations, the original document is read by the CCD unit 780.

Figure 40:
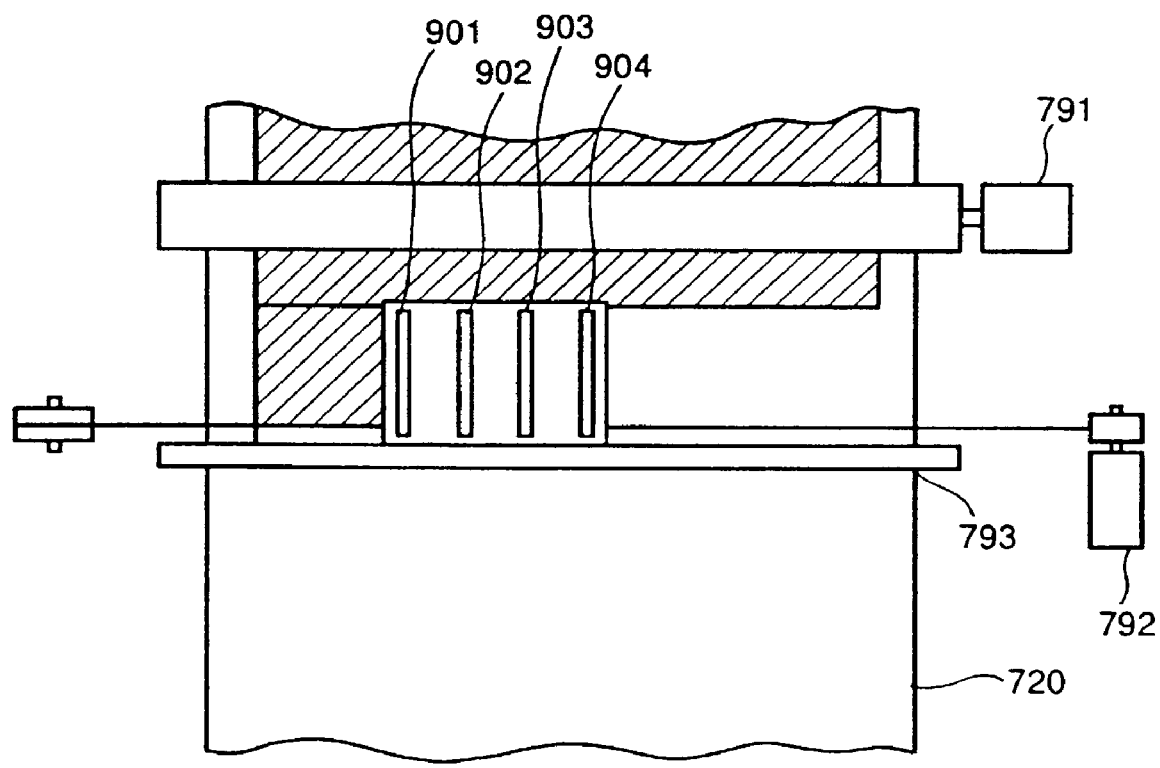
FIG. 40 illustrates the structure of a printing unit according to the third embodiment.

FIG. 40 is a schematic structural view which illustrates the printer 715 according to this embodiment. The printer 715 of the image forming apparatus according to this embodiment has an ink jet printing head. Printing heads 901 to 904 corresponding to cyan, magenta, yellow and black (hereinafter abbreviated to "C", "M", "Y" and "Bk") are caused to scan on a printer main scanning rail 793 by a main scanning motor 792 to print the image for one line read by the reader 781 on the recording paper 720. After printing for one line has been completed, the recording paper 720 is conveyed by a distance for one line in the sub-scanning direction by a paper conveying motor 791. By repeating the aforesaid operations, the image is printed.

Figure 41A:
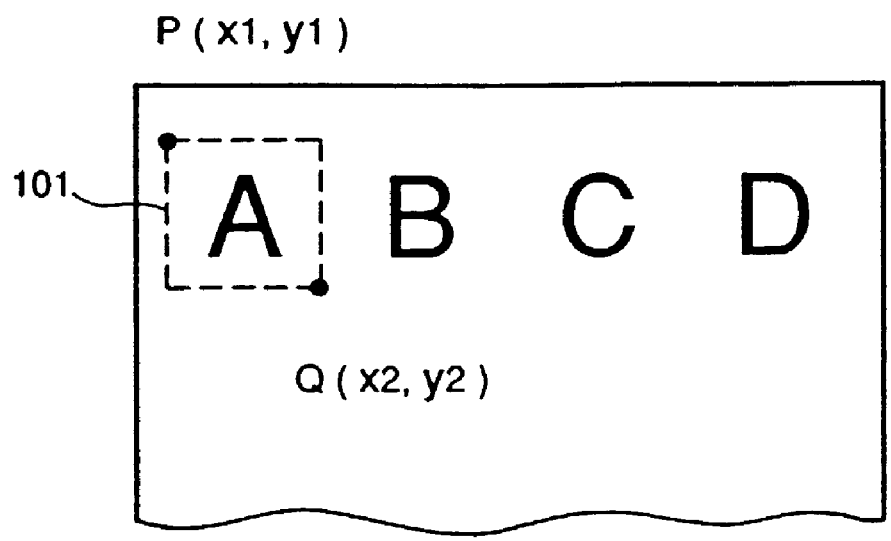
FIGS. 41A and 41B illustrate setting methods in a setting unit for performing the image repetition.
Figure 41B:
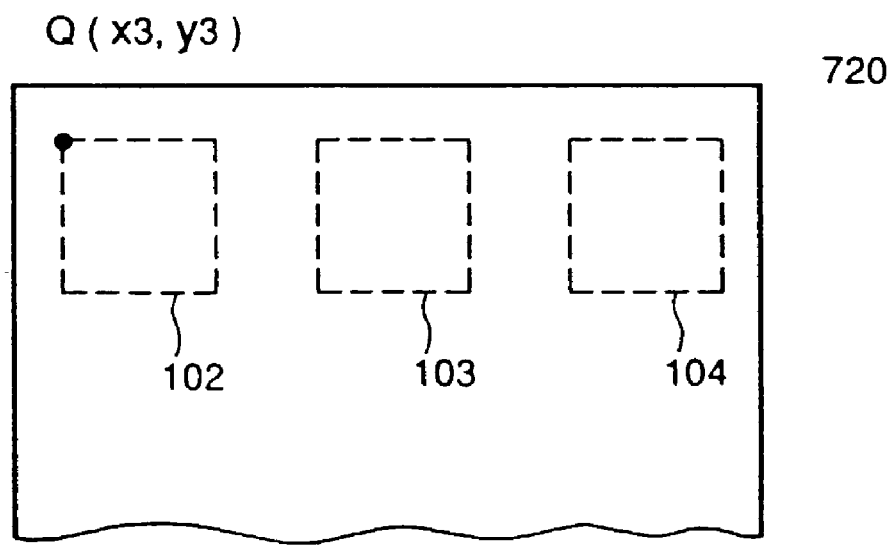

With the thus arranged structure, the following instructions are made by the setting unit 716. As shown in FIG. 41B, point Q ($x_3$, $y_3$) is instructed so that image repeating is commenced at the point Q. Furthermore, the number of the image repetitions is instructed in such a manner that the number of times in the main scanning direction and that in the sub-scanning direction are instructed. For example, the repetition position of area 1 is designated by dashed-line boxes 102, 103 and 104 in the case where the instruction has been made as three times in the main scanning direction and one time in the sub-scanning direction.

Finally, the method of the image repetition is designated. According to this embodiment, the instruction of rotation by 90° and that of the mirror image and the like are designated by using, for example, a menu frame and a select button and the like. The aforesaid information, which has been set, is stored in the memory control unit 713.

After setting has been effected as described above, the image forming apparatus according to this embodiment is started. As a result, original image data is read by the read 710 to be stored by the memory 711. The writing counter 712 stores data in the serial form and supplied from the reader 710 in the memory 711 while converting it into data formed into a raster form.

When image data in the memory 711 is read, the memory control unit 713 controls to cause addressing of the reading counter 714 to be image-repeated. Image data read by the addressing is printed by the printer 715. At the instructed execution position of the image repetition, the address of the image data reading counter is set to the address of the image area to be image-repeated. The reading counter 711 comprises an x-counter and a y-counter to instruct the address by the current x and y-coordinates. Therefore, by operating the x and y counters, the reading address is generated to rotate the image by 90° or read as a mirror image. For example, by exchanging the x-counter and the y-counter and by setting the x-counter to the down-counter, an image rotated by 90° can be obtained. By making only the x-counter to be the down-counter, a mirror image can be obtained.

Figure 42A:
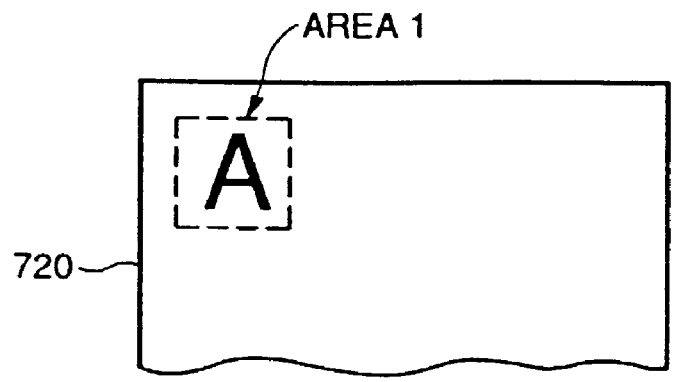
FIGS. 42A–42C illustrate a state where the image repetition is executed by each rotating 900.
Figure 42B:
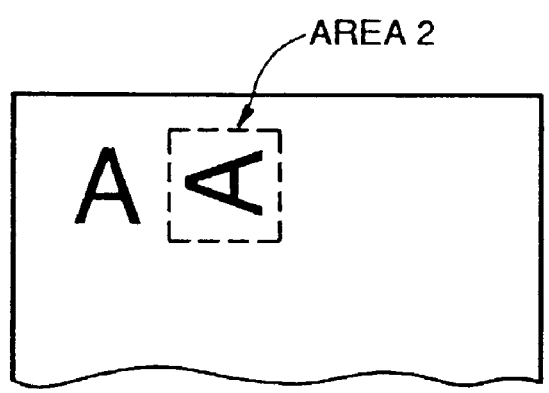
Figure 42C:
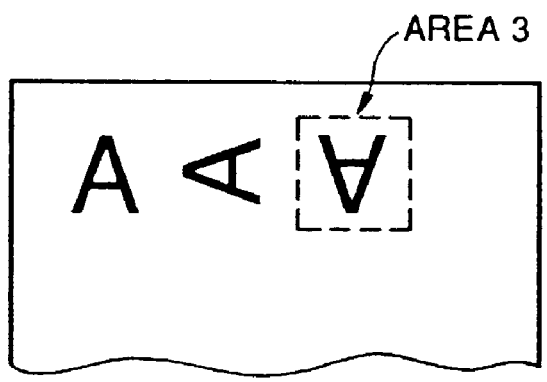

FIG. 42 illustrates an example of printing performed in such a manner that an image is image-repeated while being rotated by 90°. Area 1 shown in FIG. 42A is an image which is not rotated. Area 2 shown in FIG. 42B illustrates a state where image of the area 1 read from the memory 711 by addressing to rotate it by 90° is printed. Area 3 shown in FIG. 42C illustrates a state where the image of the area 1 is read and printed by addressing to rotate it by 180°.

Figure 43A:
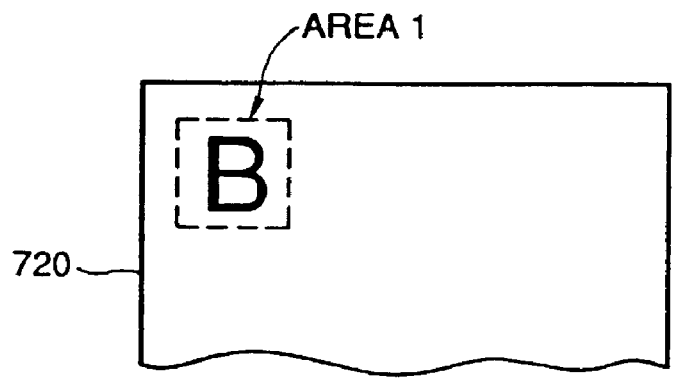
FIGS. 43A–43C illustrate a state where the image repetition is executed by performing conversion into a mirror image.
Figure 43B:
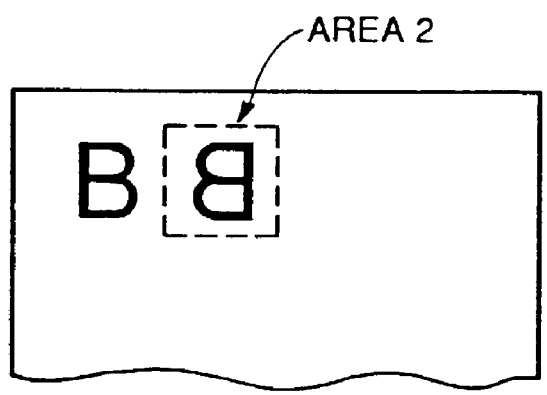
Figure 43C:
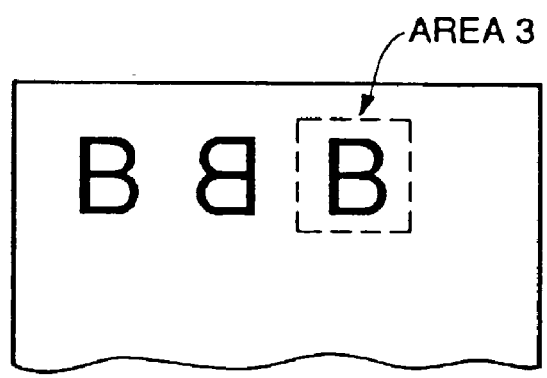

FIG. 43 illustrates an example of printing in which an image is image-repeated in the form of a mirror image. Area 1 shown in FIG. 43A is an original image. Area 2 shown in FIG. 43B illustrates a state where image of area 1 is read from the memory 711 by addressing to make a mirror image. Area 3 shown in FIG. 43C illustrates a state where an image is read from the memory 711 and it is printed similarly to area 1.

As shown in FIGS. 42 and 43, the reading addressing from the memory 711 at the time of the image repetition is changed at each repetition so that an image repetition function revealing satisfactory variation can be realized.

Although the third embodiment comprises the image forming apparatus incorporating the ink jet printing head, the present invention is not limited to this. For example, the present invention can be adapted to a page printer such as a laser beam printer.

Fourth Embodiment

Figure 44:
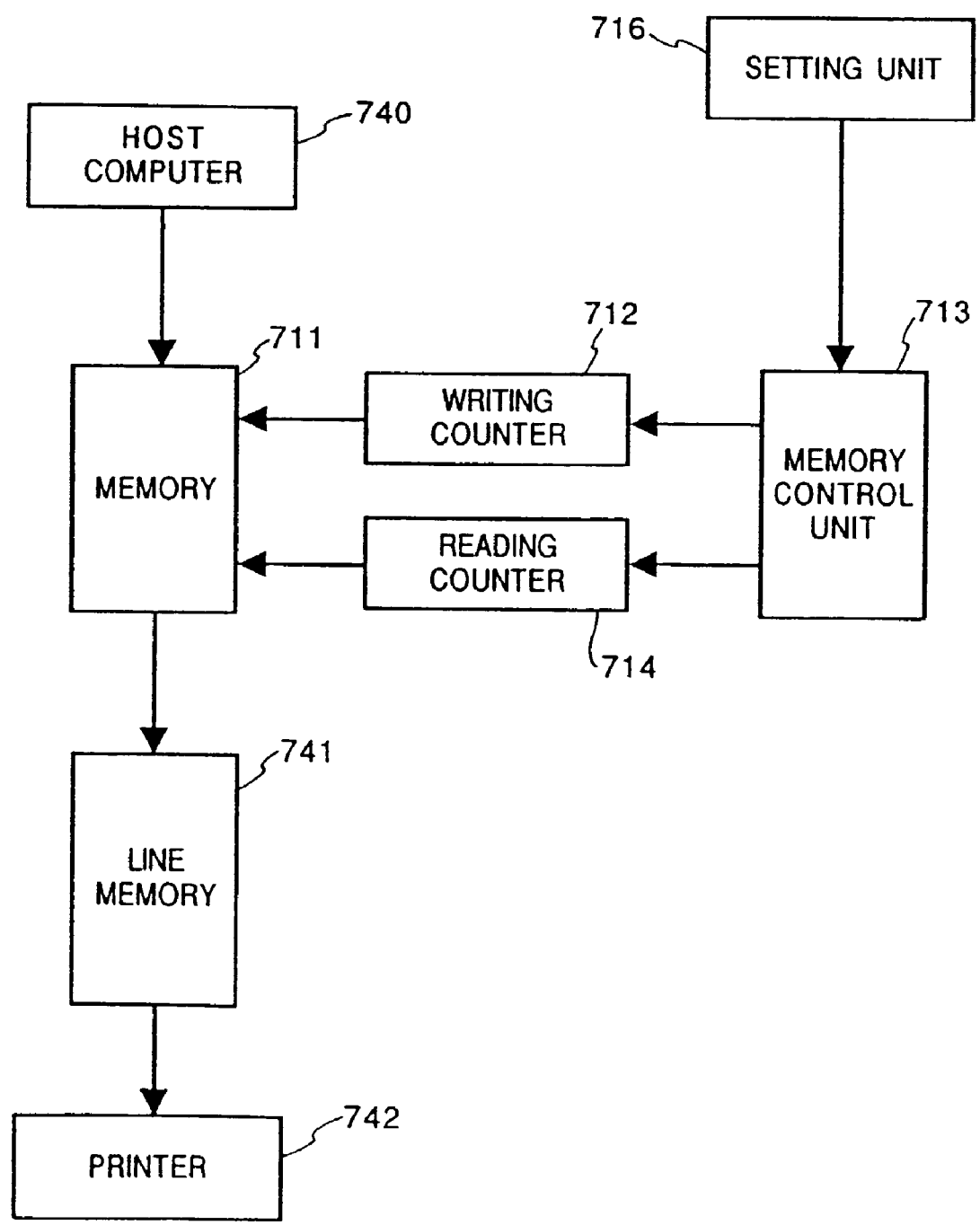
FIG. 44 is a block diagram which illustrates the schematic structure of an image forming apparatus according to a fourth embodiment.

FIG. 44 is a block diagram which illustrates the structure of an image forming apparatus according to a fourth embodiment. The image forming apparatus according to the fourth embodiment is arranged to image-repeat an image supplied from a computer. Reference numeral 711 represents a memory for storing image data supplied from a host computer 740. Reference numeral 742 represents a printer which is a serial scan printer according to this embodiment, the printer 742 having, for example, an ink jet printing head like the third embodiment. A line memory 741 represents a memory for one line for causing the printer 742 to print an image by one scanning operation. Image data in the memory 711 is read out to the line memory 741 due to the control performed by the reading counter 714. After image data for one line has been stored in the line memory 741, data is transferred to the printer 742. As a result, the printer 742 starts the recording operation.

By the operations similar to that according to the third embodiment, the image area to be image-repeated, the position at which development of the image repetition is commenced, the number of repetitions and the repeating method are set to be stored by the memory control unit 713.

If the image repetition as shown in FIG. 42C (repetition is performed by rotating by each 90°) is performed, the image of area 1 is transferred to the line memory 741. Then, the reading counter 714 is so controlled as to make the image to be an image rotated by 90° and it is transferred to the line memory 741. The control of the reading counter 714 is executed by operating the x and y counter as described in the third embodiment. As described above, the image is rotated by each 90° to be transferred to the line memory 741. When data for one line has been accumulated, the printing operation is commenced. By arranging the structure in such a manner that the writing and reading to and from the line memory 741 can be independently performed, image data for the next line can be written on the line memory 741 during an operation of reading data from the line memory 741 and its being printed. Therefore, the printer 742 is caused to be always performing the printing operation. Hence, the printing speed can be raised.

Fifth Embodiment

Figure 45:
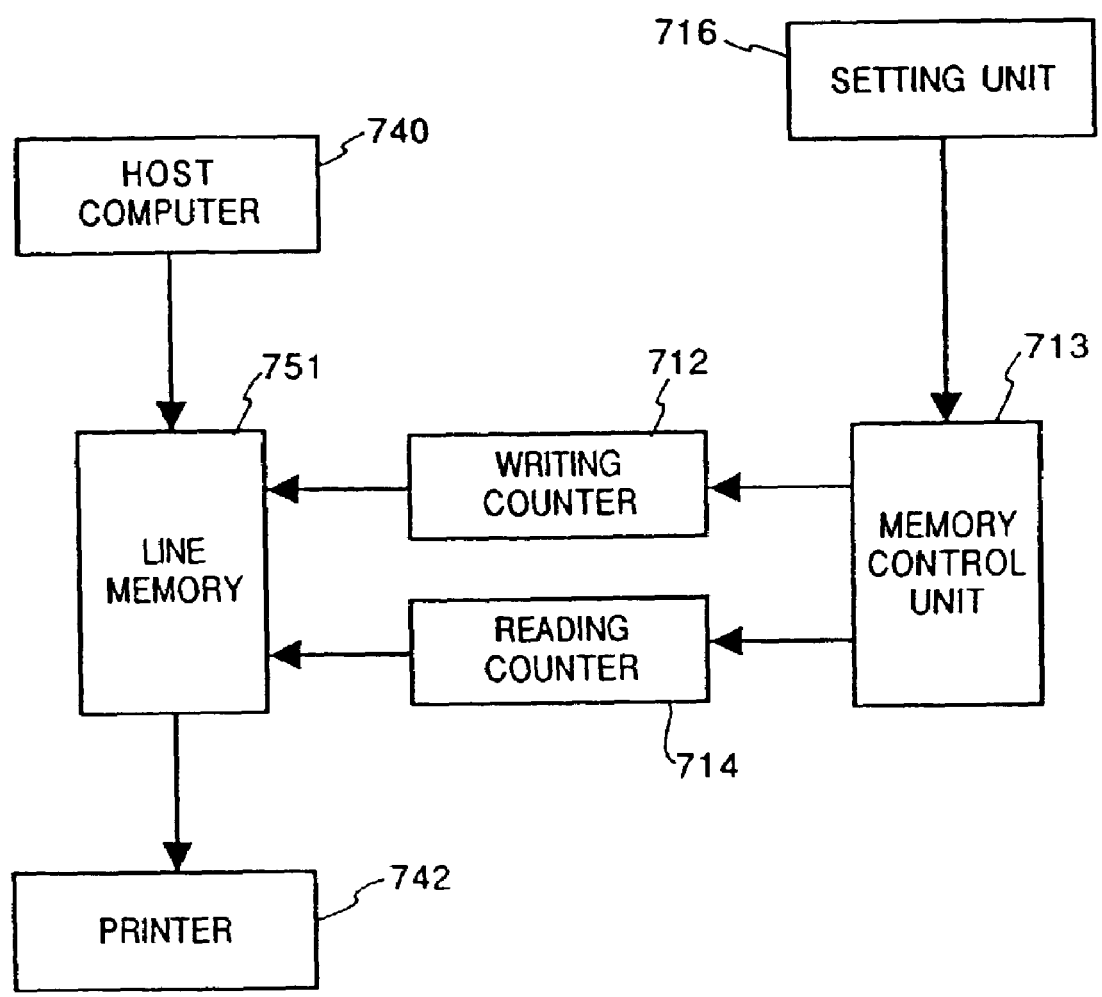
FIG. 45 is a block diagram which illustrates the schematic structure of an image forming apparatus according to a fifth embodiment.

FIG. 45 is a block diagram which illustrates an image forming apparatus according to a fifth embodiment. The fifth embodiment has an arrangement that only a line memory 751 for storing image data for one line is provided and image supplied from the host computer 740 is image-repeated. If an image as shown in FIG. 42C is printed, the image of area 1 shown in FIG. 42A from the host computer 740 is written on the line memory 751. The same image is transferred from the host computer 740, and the image is, while being rotated by 90°, written on the line memory 751 due to the address control operation performed by the writing counter 712. Then, image data for one line is, while being rotated by 90°, written on the line memory. When image data for one line has been accumulated, the printing operation is commenced. Therefore, if the image repetition is repeated three times on one line as shown in FIG. 42C, the image to be repeated must be transmitted three times.

Since the image data communication speed from the host computer is sufficiently slow as compared with the writing speed to the line memory 751, one pixel data item due to one transmission operation can be stored in a plurality of addresses of the line memory. Therefore, writing to a plurality of portions of the line memory 751 can be performed in accordance with the pattern of the image repetition by the address control performed by the writing counter 712 during one time transmission of the image to be repeated from the host computer 740. As a result of the aforesaid method, image data for one line can be accumulated on the line memory by only one time image data transmission.

Among the ink jet printing methods, the second to fifth embodiments of the present invention will cause an excellent effect to be obtained when adapted to a printing head or a printing apparatus of a type having an arrangement that heat energy is utilized to form a flying fluid droplet so as to perform the recording operation.

Although each of the aforesaid embodiments has the arrangement that image data, the size of which corresponds to one scanning operation, is repeated, the present invention is not limited to this. A graphic image or the like which must be scanned plural times can be image-repeated by the structure of each of the embodiments. However, the fifth embodiment must cause image data for plural times to be transmitted from the host computer.

The present invention may be adapted to a system comprising a plurality of apparatuses or an apparatus including one apparatus. The present invention may, of course, be adapted to the case where a program for executing the present invention is supplied.

The third to the fifth embodiments can be applied to the printing operation similarly to that performed according to the first embodiment.

As described above, according to the present invention, the image supply apparatus has the means for designating the pattern, size, recording position, the color relating second image data such as a logotype mark. On the other hand, the control apparatus of the image output apparatus has a second control means for receiving the designation and controlling the operation of recording the first image data individually from the first control means for controlling the operation of recording the first image data. That is, since the second image data is independently controlled from the first image data, the second image data can be inserted as desired at a repetition cycle desired by an operator regardless of the repetition cycle and the type of the repetition pattern of the first image. Furthermore, the second image data is inserted to a designated area while making the area to be blank immediately before the first image is transmitted to the head, that is, after a desired image process has been completed. Therefore, the second image data can be printed as desired (for example, clearly) while being freed from influences of various conversions.

As described above, according to the present invention, an effect can be obtained in that a geometrical repeated image data can be efficiently outputted.

Furthermore, image data of a large capacity can be outputted while necessitating a small memory capacity. In addition, the required image data process to be performed by the external equipment, which generates the image data, can be reduced.

In addition, the image forming apparatus according to the present invention enables an image repetition function for repeating the same image to be improved to have variation characteristics.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An ink jet printer for forming an ink jet printed long strip of cloth, comprising:
   design image generation means for generating design image data representing a design image repeatedly using a basic pattern;
   receiving means for receiving first designation data regarding a logotype mark;
   generating means for generating logotype mark image data representing a series of the logotype mark at a repetition cycle corresponding to the size of the logotype mark, repeatedly using the logotype mark independently from the repeated using of the basic pattern, in accordance with the first designation data received by said receiving means; and
   synthesizing means for repeatedly synthesizing the design image data and the logotype mark image data in a fixed repetitive pattern and for supplying the synthesized design and logotype mark image data to an ink jet head, so that an image including the design image and plural logotype marks is printed onto the long strip of cloth along an elongated direction thereof by using the ink jet head.

2. The ink jet printer according to claim 1, further comprising:
   color conversion means for converting a color of the design image data and not converting a color of the logotype mark image data; and
   reception means for receiving second designation data for designating color conversion by said color conversion means.

3. The ink jet printer according to claim 1, wherein the first designation data includes data for designating at least one of a pattern, size, printing position and color of the logotype mark.

4. The ink jet printer according to claim 1, further comprising a memory for storing the design image data, wherein the design image data is repeatedly read out from the memory and is supplied to the ink jet head.

5. The ink jet printer according to claim 4, further comprising:
   mask means for masking the design image data in correspondence to a printing position of the logotype mark.

6. The ink jet printer according to claim 1, further comprising:
   fixing means for fixing ink to the long strip of cloth after printing by supplying ink to the long strip of cloth has been performed.

7. The ink jet printer according to claim 6, further comprising:
   washing means for washing the long strip of cloth on which the image has been printed after the ink has been fixed to the long strip of cloth by said fixing means.

8. The ink jet printer according to claim 1, further comprising:
   pre-treating means for filtrating a pre-treatment agent into the long strip of cloth before printing by jetting ink from the ink jet head is performed.

9. The ink jet printer according to claim 1, wherein said ink jet head is a printing head for emitting the ink by utilizing heat energy, said ink jet head having a heat energy conversion member for generating the heat energy to be supplied to the ink.

10. The ink jet printer according to claim 1, wherein said ink jet head causes a change of state of the ink by heat energy applied by a heat energy conversion member to emit the ink through an outlet port due to the change of state.

11. An ink jet printing method for forming an ink jet printed product, comprising the steps of:
   generating design image data representing a design image repeatedly using a basic pattern;
   receiving first designation data regarding a logotype mark;
   generating logotype mark image data representing a series of the logotype mark at a repetition cycle corresponding to the size of the logotype mark, repeatedly using the logotype mark independently from the repeated using of the basic pattern, in accordance with the received first designation data;
   repeatedly synthesizing the design image data and the logotype mark image data in a fixed repetitive pattern; and
   supplying ink to a long strip of cloth in accordance with the design and logotype mark image data synthesized in said synthesizing step, so that an image including the design image and plural logotype marks is printed onto the long strip of cloth along an elongated direction thereof by using an ink jet head.

12. The method according to claim 11, further comprising the steps of:
   receiving second designation data for designating color conversion; and
   converting a color of the design image and not converting a color of the logotype mark.

13. The method according to claim 11, wherein the first designation data includes data for designating at least one of a pattern, size, printing position and color of the logotype mark.

14. The method according to claim 11, further comprising a step of storing the design image data into a memory, wherein the design image data is repeatedly read out from the memory and is supplied to the ink jet head.

15. The method according to claim 14, further comprising a step of masking the design image data in correspondence to a printing position of the logotype mark.

16. The method according to claim 11, further comprising a step of fixing ink to the long strip of cloth after printing by supplying ink to the long strip of cloth has been performed.

17. The method according to claim 16, further comprising a step of washing the long strip of cloth on which an image has been printed after the ink has been fixed to the long strip of cloth in said fixing step.

18. The method according to claim 11, further comprising a step of filtrating a pre-treatment agent into the long strip of cloth before printing by jetting ink from the ink jet head is performed.

19. The method according to claim 11, wherein the ink jet head is a printing head for emitting ink by utilizing heat energy, the ink jet head having a heat energy conversion member for generating the heat energy to be supplied to the ink.

20. The method according to claim 11, wherein the ink jet head causes a change of state of the ink by heat energy applied by a heat energy conversion member to emit ink through an outlet port due to the change of state.

21. An apparatus for controlling an ink jet printer for forming an ink jet printed product of a long strip of cloth, comprising:
   design image generation means for generating design image data representing a design image repeatedly using a basic pattern;
   first receiving means for receiving first designation data regarding a logotype mark;
   generating means for generating logotype mark image data representing a series of the logotype mark at a repetition cycle corresponding to the size of the logotype mark, repeatedly using the logotype mark independently from the repeated using of the basic pattern, in accordance with the first designation data;
   synthesizing means for repeatedly synthesizing the design image data and the logotype mark image data in a fixed repetitive pattern; and
   supply means for supplying the synthesized image data to an ink jet head of said ink jet printer,
   wherein an image including the design image and plural logotype marks is printed onto the long strip of cloth along an elongated direction thereof by using the ink jet head.

22. The apparatus according to claim 21, further comprising:
   color conversion means for converting a color of the design image and not converting a color of the logotype mark; and
   second receiving means for receiving second designation data for designating color conversion by said color conversion means.

23. The apparatus according to claim 21, wherein the first designation data includes data for designating at least one of a pattern, size, printing position and color of the logotype mark.

24. The apparatus according to claim 21, further comprising:
   a memory for storing the design image data, wherein the design image data is repeatedly read out from the memory and is supplied to the ink jet head.

25. The apparatus according to claim 24, further comprising:
   mask means for masking the design image data in correspondence to a printing position of the logotype mark.

26. An ink jet printer for forming an ink jet printed long strip of cloth, comprising:
   a design image generation unit configured to generate design image data representing a design image repeatedly using a basic pattern;
   a receiving unit configured to receive first designation data regarding a logotype mark;
   a generating unit configured to generate logotype mark image data representing a series of the logotype mark at a repetition cycle corresponding to the size of the logotype mark, repeatedly using the logotype mark independently from the repeated using of the basic pattern, in accordance with the first designation data received by said receiving unit; and
   a synthesizing unit configured to repeatedly synthesize the design image data and the logotype mark image data in a fixed repetitive pattern and supply the synthesized design and logotype mark image data to an ink jet head, so that an image including the design image and plural logotype marks is printed onto the long strip of cloth along an elongated direction thereof by using the ink jet head.

* * * * *

UNITED STATES PATENT AND TRADEMARK OFFICE
CERTIFICATE OF CORRECTION

PATENT NO. : 7,187,467 B2
APPLICATION NO. : 10/244570
DATED : March 6, 2007
INVENTOR(S) : Takahashi et al.

It is certified that error appears in the above-identified patent and that said Letters Patent is hereby corrected as shown below:

IN THE DRAWINGS:
Sheet No. 2, Figure 2, "PALLET" should read --PALETTE--.
Sheet No. 4, Figure 4, "PALLET" (both occurrences) should read --PALETTE--.
Sheet No. 5, Figure 5, "PALLET" should read --PALETTE--.
Sheet No. 6, Figure 6, "PALLET" should read --PALETTE--.
Sheet No. 7, Figure 7, "PALLET" should read --PALETTE--.
Sheet No. 8, Figure 8, "PALLET" should read --PALETTE--.
Sheet No. 9, Figure 9, "PALLET" (both occurrences) should read --PALETTE--.
Sheet No. 10, Figure 10, "PALLET" (both occurrences) should read --PALETTE--.
Sheet No. 18, Figure 18, "PALLET" (all six occurrences) should read --PALETTE--.
Sheet No. 20, Figure 20, "PALLET" should read --PALETTE--.
Sheet No. 32, Figure 31, "ANALYING" should read --ANALYZING--.
Sheet No. 33, Figure 32, "PALLET" (both occurrences) should read --PALETTE--.

COLUMN 3:
Line 16, "anyone" should read --any one--.
Line 19, "be" should read --be a--.

COLUMN 4:
Line 7, "(for)" should read --(for--.
Line 53, "reading" should read --reading a--.

COLUMN 5:
Line 2, "be" should be deleted.
Line 17, "pallet" should read --palette--.
Line 19, "pallet" should read --palette--.
Line 21, "pallet" should read --palette--.
Line 23, "pallet" should read --palette--.
Line 26, "pallet" should read --palette--.

COLUMN 6:
Line 27, "tially" should read --tial--.
Line 42, "rotating 900;" should read --rotating 90°;--.

UNITED STATES PATENT AND TRADEMARK OFFICE
CERTIFICATE OF CORRECTION

PATENT NO.        : 7,187,467 B2
APPLICATION NO.   : 10/244570
DATED             : March 6, 2007
INVENTOR(S)       : Takahashi et al.

It is certified that error appears in the above-identified patent and that said Letters Patent is hereby corrected as shown below:

COLUMN 7:
Line 31, "Down load" should read --Download--.

COLUMN 8:
Line 35, "Pallet" should read --Palette--.
Line 67, "in" should read --in the--.

COLUMN 9:
Line 50, "numeral loll" should read --numeral 1011--.

COLUMN 10:
Line 37, "pallet" should read --palette--.

COLUMN 11:
Line 6, "pallet" should read --palette--.
Line 14, ""3", 4", "6" or "8"." should read --3, 4, 6 or 8.--.
Line 15, "pallet" should read --palette--.
Line 18, "or 1109)" should read --or 1019)--.
Line 21, "pallet" should read --palette--.
Line 22, "pallet" should read --palette--.
Line 28, "pallet" should read --palette--.
Line 34, "pallet" should read --palette--.
Line 35, "pallet" should read --palette--.
Line 45, "pallet" should read --palette--.
Line 48, "pallet" should read --palette--.
Line 49, "in" (second occurrence) should be deleted.
Line 53, "pallet" should read --palette--.
Line 62, "pallet" should read --palette--.
Line 65, "pallet" should read --palette--.

COLUMN 12:
Line 1, "pallet" should read --palette--.
Line 7, "pallet" should read --palette--.
Line 9, "pallet" should read --palette--.
Line 18, "pallet" should read --palette--.
Line 37, "the" (first occurrence) should be deleted.
Line 64, "be" should read --be a--.

UNITED STATES PATENT AND TRADEMARK OFFICE
CERTIFICATE OF CORRECTION

PATENT NO. : 7,187,467 B2
APPLICATION NO. : 10/244570
DATED : March 6, 2007
INVENTOR(S) : Takahashi et al.

It is certified that error appears in the above-identified patent and that said Letters Patent is hereby corrected as shown below:

COLUMN 13:
Line 12, "300b" should read --300B--.
Line 55, "step SS5-15" should read --step SS5-13--.

COLUMN 15:
Line 27, "pixel" should read --pixels--.
Line 37, "type" should read --type of--.

COLUMN 16:
Line 54, "value" should read --valve--.

COLUMN 17:
Line 8, "pallet" should read --palette--.
Line 11, "pallet" should read --palette--.
Line 13, "pallet." should read --palette.--.
Line 23, "head has" should read --heads have--.
Line 29, "selected" should read --selectively--.

COLUMN 18:
Line 15, "relating" should read --relating to each--.
Line 17, "of" should read --of an--.
Line 22, "is" should read --and is--.
Line 23, "pallet" should read --palette--.
Line 38, "pallet" should read --palette--.
Line 43, "pallet" should read --palette--.
Line 44, "pallet" should read --palette--.
Line 50, "pallet" (both occurrences) should read --palette--.
Line 54, "pallet" should read --palette--.
Line 59, "pallet" should read --palette--.
Line 61, "pallet" (both occurrences) should read --palette--.
Line 63, "pallet" should read --palette--.
Line 64, "pallet" should read --palette--.
Line 66, "pallet" should read --palette--.

COLUMN 19:
Line 2, "pallet" should read --palette--.
Line 32, "anyone" should read --any one--, and "method." should read --methods.--.

UNITED STATES PATENT AND TRADEMARK OFFICE
CERTIFICATE OF CORRECTION

PATENT NO. : 7,187,467 B2
APPLICATION NO. : 10/244570
DATED : March 6, 2007
INVENTOR(S) : Takahashi et al.

It is certified that error appears in the above-identified patent and that said Letters Patent is hereby corrected as shown below:

COLUMN 20:
Line 9, "pallet" should read --palette--.
Line 18, "pallet" should read --palette--.
Line 22, "pallet" should read --palette--.
Line 66, "type" should read --types--.

COLUMN 21:
Line 50, "PAM" should read --RAM--.
Line 54, "stores" should read --stores it in--.

COLUMN 22:
Line 32, "illustrate" should read --illustrates--.
Line 42, "(by 900" should read --(by 90°--.
Line 65, "$X_b \leq Y_{in}$" should read --$Y_b \leq Y_{in}$--.

COLUMN 23:
Line 14, "cloth 28" should read --cloth 6--.
Line 55, "$(X_b, X_b)$" should read --$(X_b, Y_b)$--.
Line 63, "$(X_{out}/X_B)$" should read --$(X_{out}/X_B)$,--.

COLUMN 24:
Line 15, "likely" should read --like--.
Line 56, "type" should read --type 1--.

COLUMN 25:
Line 52, "XEDN" should read --XEND--.

COLUMN 26:
Line 19, "repetitions time NY" should read --repetition times $N_Y$--.

COLUMN 27:
Line 12, "form" should read --from--.
Line 31, "carry" should read --carry signal--.
Line 34, "carry" should read --carry signal--.
Line 37, "resulting" should read --resulting in--.
Line 60, "comparison the" should read --comparison between the--.

UNITED STATES PATENT AND TRADEMARK OFFICE
CERTIFICATE OF CORRECTION

PATENT NO. : 7,187,467 B2
APPLICATION NO. : 10/244570
DATED : March 6, 2007
INVENTOR(S) : Takahashi et al.

It is certified that error appears in the above-identified patent and that said Letters Patent is hereby corrected as shown below:

COLUMN 28:
Line 39, "Loading Down" should read --Downloading--.
Line 42, "load down" should read --download--.

COLUMN 29:
Line 3, "the" should read --the received data is--.
Line 40, "pallet" should read --palette--.
Line 43, "pallet" should read --palette--.
Line 49, "pallet" should read --palette--.

COLUMN 30:
Line 9, "A" should read --An--.
Line 13, "equation:" should read --equations:--.
Line 24, "equation:" should read --equations:--.

COLUMN 31:
Line 51, "set" should read --sent--.
Line 57, "a" should read --$\alpha$--.
Line 63, "B'" should read --B' signals--.

COLUMN 32:
Line 4, "to" (second occurrence) should read --by--.
Line 37, "<Y3>" should read --<$Y_3$>--.
Line 51, "imaged" should read --image--.
Line 54, "a" should read --$\alpha$--, and "in" should read --in a--.

COLUMN 33:
Line 2, "a" should read --$\alpha$--.
Line 5, "34 be" should read --34 can be--.
Line 13, "is meant" should read --means--.
Lines 23 and 24, should be merged in the same paragraph.
Line 29, "pallet" should read --palette--.
Line 41, "to" should read --can--.

COLUMN 36:
Line 54, "form" should read --from--.

UNITED STATES PATENT AND TRADEMARK OFFICE
CERTIFICATE OF CORRECTION

PATENT NO. : 7,187,467 B2
APPLICATION NO. : 10/244570
DATED : March 6, 2007
INVENTOR(S) : Takahashi et al.

It is certified that error appears in the above-identified patent and that said Letters Patent is hereby corrected as shown below:

COLUMN 37:
Line 50, "forcible" should read --forcibly--.

COLUMN 39:
Line 31, "read" (second occurrence) should read --reader--.
Line 54, "where" should read --where the--.
Line 61, "where" should read --where the--.

COLUMN 41:
Line 65, "particularly," should read --particularity,--.

Signed and Sealed this

Tenth Day of February, 2009

JOHN DOLL
*Acting Director of the United States Patent and Trademark Office*